(12) United States Patent
Tang et al.

(10) Patent No.: US 12,298,595 B2
(45) Date of Patent: May 13, 2025

(54) IMAGING LENS ASSEMBLY, CAMERA MODULE AND ELECTRONIC DEVICE

(71) Applicant: LARGAN PRECISION CO., LTD., Taichung (TW)

(72) Inventors: Hsiang-Chi Tang, Taichung (TW); Lin-An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 1113 days.

(21) Appl. No.: 16/924,496

(22) Filed: Jul. 9, 2020

(65) Prior Publication Data
US 2021/0088752 A1    Mar. 25, 2021

(30) Foreign Application Priority Data
Sep. 25, 2019   (TW) ................. 108134707

(51) Int. Cl.
| | | |
|---|---|---|
| *G02B 7/02* | (2021.01) | |
| *G02B 1/04* | (2006.01) | |
| *G02B 5/00* | (2006.01) | |
| *G02B 9/34* | (2006.01) | |
| *G03B 17/12* | (2021.01) | |

(52) U.S. Cl.
CPC ................. *G02B 9/34* (2013.01); *G02B 1/04* (2013.01); *G02B 5/003* (2013.01); *G03B 17/12* (2013.01)

(58) Field of Classification Search
CPC . G02B 9/34; G02B 1/04; G02B 5/003; G02B 7/021; G02B 7/022; G02B 7/026; G02B 9/60; G02B 9/62; G02B 27/646; G02B 13/0055; G02B 13/0015; G02B 13/006; G02B 5/00; G03B 17/12; G03B 3/10; G03B 5/00; G03B 30/00; G03B 9/02
See application file for complete search history.

(56) References Cited

U.S. PATENT DOCUMENTS

| | | |
|---|---|---|
| 6,870,693 B2 | 3/2005 | Ito |
| 7,151,640 B2 | 12/2006 | Sawagami et al. |
| 7,391,457 B2 | 6/2008 | Fujimoto et al. |

(Continued)

FOREIGN PATENT DOCUMENTS

| | | |
|---|---|---|
| CN | 103842876 A | 6/2014 |
| CN | 104280793 A | 1/2015 |

(Continued)

*Primary Examiner* — Balram T Parbadia
(74) *Attorney, Agent, or Firm* — McClure, Qualey & Rodack, LLP

(57) ABSTRACT

An imaging lens assembly includes a plastic lens barrel, an optical lens element set and a light-absorbing layer. The plastic lens barrel includes a minimum opening. The optical lens element set includes a plurality of optical lens elements, wherein the optical lens elements includes a first optical lens element closest to an object side of the optical lens element set, and the first optical lens element includes an effective optical surface, a peripheral surface and an annular step structure. At least one portion of the light-absorbing layer is coated on the annular step structure, and at least another one portion of the light-absorbing layer is connected to the minimum opening of the plastic lens barrel. The light-absorbing layer is for retaining the first optical lens element on the plastic lens barrel.

37 Claims, 37 Drawing Sheets

(56) References Cited

U.S. PATENT DOCUMENTS

| | | |
|---|---|---|
| 8,031,412 B2 | 10/2011 | Shintani |
| 8,102,609 B2 | 1/2012 | Tsuchiya et al. |
| 9,069,119 B2 | 6/2015 | Takase et al. |
| 9,095,868 B2 | 8/2015 | Wang |
| 9,207,364 B2 | 12/2015 | Yang et al. |
| 9,746,634 B2 * | 8/2017 | Wei ................. G02B 7/021 |
| 9,746,635 B2 * | 8/2017 | Wei ................. G02B 7/003 |
| 9,952,359 B2 | 4/2018 | Chang |
| 10,048,410 B2 | 8/2018 | Kubota |
| 10,114,152 B2 | 10/2018 | Chou |
| 2005/0190460 A1 * | 9/2005 | Sawagami ........... G11B 7/1372 |
| | | 359/811 |
| 2007/0183058 A1 * | 8/2007 | Bito ................. G02B 15/142 |
| | | 359/676 |
| 2008/0218861 A1 * | 9/2008 | Tanaka ........... G02B 15/144113 |
| | | 359/557 |
| 2009/0086339 A1 * | 4/2009 | Oh ................. G02B 9/28 |
| | | 359/764 |
| 2009/0310232 A1 * | 12/2009 | Kudou ............. G02B 9/38 |
| | | 359/786 |
| 2013/0050843 A1 * | 2/2013 | Nakamura ..... G02B 15/144113 |
| | | 359/687 |
| 2014/0204476 A1 * | 7/2014 | Takase ............. G02B 7/021 |
| | | 29/428 |
| 2015/0241656 A1 * | 8/2015 | Choi ............... G02B 7/021 |
| | | 359/819 |
| 2016/0139359 A1 * | 5/2016 | Lin ................. G02B 5/005 |
| | | 359/793 |
| 2017/0139172 A1 * | 5/2017 | Wei ................. H04N 23/55 |
| 2017/0139177 A1 * | 5/2017 | Wei ................. G02B 9/04 |
| 2017/0176649 A1 * | 6/2017 | Chang ............. G02B 9/34 |
| 2017/0219745 A1 * | 8/2017 | Chou .............. G02B 27/00 |
| 2018/0045918 A1 | 2/2018 | Seo et al. |
| 2019/0025600 A1 | 1/2019 | Tang et al. |
| 2019/0064399 A1 * | 2/2019 | Wang .............. H04N 23/55 |
| 2021/0018715 A1 * | 1/2021 | Fujii ............... G02B 13/18 |

FOREIGN PATENT DOCUMENTS

| | | |
|---|---|---|
| CN | 206523680 U | 9/2017 |
| CN | 208432776 U | 1/2019 |
| CN | 208609068 U | 3/2019 |
| CN | 208737073 U | 4/2019 |

\* cited by examiner

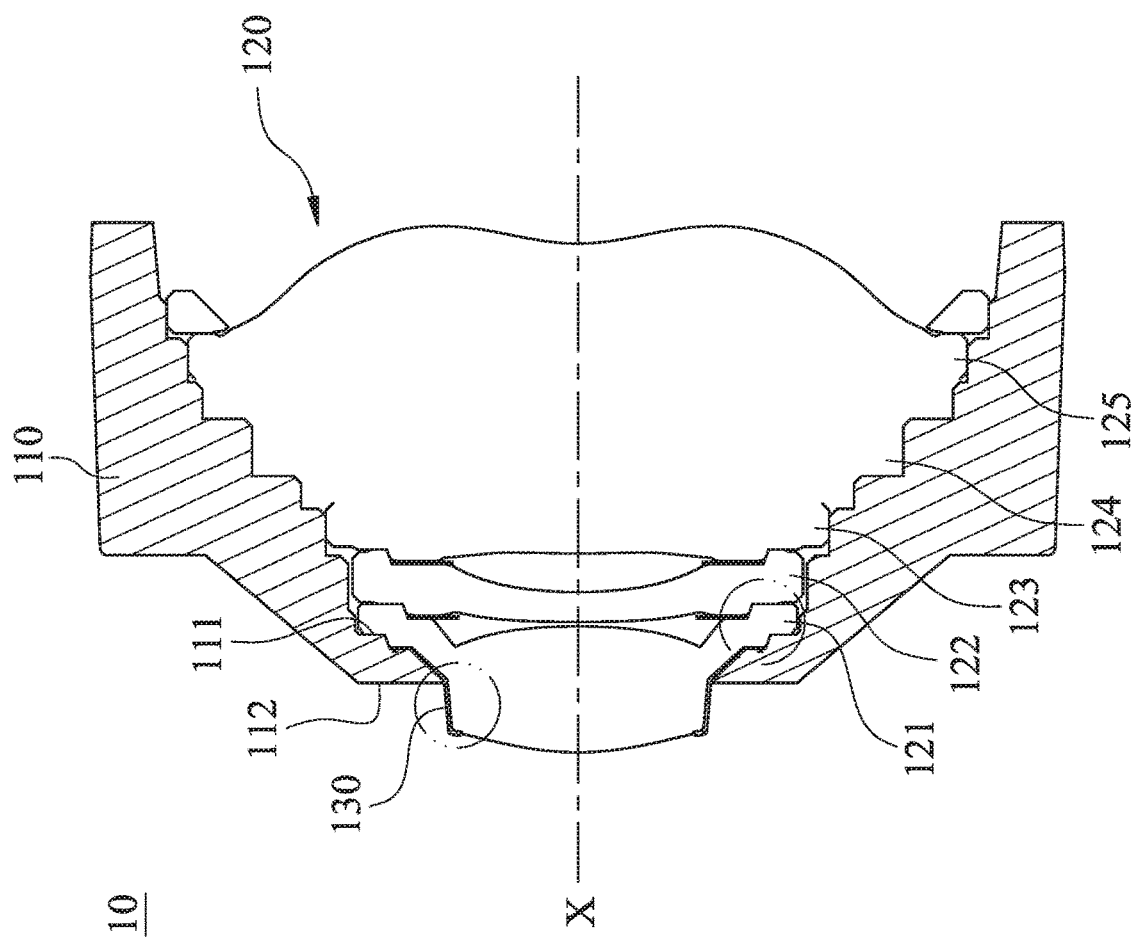

IMAGING LENS ASSEMBLY, CAMERA MODULE AND ELECTRONIC DEVICE

RELATED APPLICATIONS

This application claims priority to Taiwan Application Serial Number 108134707, filed Sep. 25, 2019, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have developed rapidly. For example, intelligent electronic devices and tablets have been filled in the lives of modern people, and camera modules and imaging lens assemblies thereof mounted on portable electronic devices have also prospered. However, as technology advances, the quality requirements of imaging lens assembly are becoming higher and higher. Therefore, in addition to the achievement of the miniaturization, an imaging lens assembly with an ability of effectively capturing the non-imaging light needs to be developed.

SUMMARY

According to one aspect of the present disclosure, an imaging lens assembly includes a plastic lens barrel, an optical lens element set and a light-absorbing layer. The plastic lens barrel includes a minimum opening. The optical lens element set includes a plurality of optical lens elements, wherein the optical lens elements includes a first optical lens element closest to an object side of the optical lens element set, and the first optical lens element includes an effective optical surface, a peripheral surface and an annular step structure. The peripheral surface surrounds the effective optical surface. The annular step structure is connected to the effective optical surface and the peripheral surface, and for defining an entrance pupil diameter of the imaging lens assembly. At least one portion of the light-absorbing layer is coated on the annular step structure, and at least another one portion of the light-absorbing layer is connected to the minimum opening of the plastic lens barrel. The light-absorbing layer is for retaining the first optical lens element on the plastic lens barrel. When a diameter of the entrance pupil diameter is EPD, and a diameter of the minimum opening of the plastic lens barrel is $\psi b$, the following condition is satisfied: $0.4 < EPD/\psi b < 1.0$.

According to another aspect of the present disclosure, a camera module includes the imaging lens assembly of the aforementioned aspect and an image sensor. The image sensor is disposed on an image surface of the imaging lens assembly.

According to another aspect of the present disclosure, an electronic device includes the camera module of the aforementioned aspect.

According to one aspect of the present disclosure, an imaging lens assembly includes a plastic lens barrel, an optical lens element set and a light-absorbing layer. The optical lens element set includes a plurality of optical lens elements, wherein the optical lens elements includes a first optical lens element closest to an object side of the optical lens element set, and the first optical lens element includes an effective optical surface, a peripheral surface and an annular step structure. The effective optical surface faces towards the object side. The peripheral surface surrounds the effective optical surface. The annular step structure is connected to the effective optical surface and the peripheral surface, and for defining an entrance pupil diameter of the imaging lens assembly. At least one portion of the light-absorbing layer is coated on the annular step structure, and at least another one portion of the light-absorbing layer is connected to the plastic lens barrel. The light-absorbing layer is for retaining the first optical lens element on the plastic lens barrel. The peripheral surface includes at least one inclined surface, and the light-absorbing layer is coated on the inclined surface. When an angle between the inclined surface and an optical axis is $\alpha$, and a total length of the light-absorbing layer along a direction parallel to the optical axis is L, the following conditions are satisfied: 1 degree$<\alpha<$50 degrees; and 0.2 mm$<$L$<$1.5 mm.

According to one aspect of the present disclosure, an imaging lens assembly includes a plastic lens barrel, an optical lens element set and a light-absorbing layer. The optical lens element set includes a plurality of optical lens elements, wherein at least one of the optical lens elements includes an effective optical surface, a peripheral surface and an annular step structure. The peripheral surface surrounds the effective optical surface. The annular step structure is connected to the effective optical surface and the peripheral surface, for defining a diaphragm of the imaging lens assembly, and for determining a bundle of incident light. At least one portion of the light-absorbing layer is coated on the annular step structure, and at least another one portion of the light-absorbing layer is connected to the plastic lens barrel. The light-absorbing layer is for retaining the at least one of the optical lens elements on the plastic lens barrel. The light-absorbing layer has an uneven thickness, and includes at least one annular arc surface. When an outer diameter of the effective optical surface is $\psi Y$, and a maximum outer diameter of the at least one of the optical lens elements is $\psi L$, the following condition is satisfied: $0.5 < \psi Y/\psi L < 0.95$.

According to one aspect of the present disclosure, an imaging lens assembly has an optical axis and includes an optical lens element set, a plastic lens barrel and a light-absorbing portion. The optical lens element set includes a plurality of optical lens elements, wherein at least one of the optical lens elements includes an effective optical surface and a peripheral surface. The effective optical surface faces towards the object side. The peripheral surface surrounds the effective optical surface. The plastic lens barrel includes an object-side receiving surface and an object-side outer surface. The object-side receiving surface receives to a portion of the peripheral surface, and the object-side receiving surface overlaps the peripheral surface at a direction parallel to the optical axis. The object-side outer surface and the object-side receiving surface are relatively disposed, and the object-side receiving surface overlaps the object-side outer surface at the direction parallel to the optical axis. The light-absorbing portion is disposed on an object side of the object-side outer surface of the plastic lens barrel and connected to the plastic lens barrel, the light-absorbing portion overlaps the peripheral surface of the at least one of the optical lens elements along a direction perpendicular to the optical axis, and the light-absorbing portion surrounds the effective optical surface. When a maximum diameter of the at least one portion of the light-absorbing portion not overlapping the plastic lens barrel and close to an image side of the imaging lens assembly is ψA, and a diameter of an entrance pupil diameter is EPD, the following condition is satisfied: $0.75 < \text{EPD}/\psi A \leq 1$.

BRIEF DESCRIPTION OF THE DRAWINGS

FIG. 10 is another partially enlarged view of the imaging lens assembly according to the 1st example in FIG. 1A.

DETAILED DESCRIPTION

Figure 1C:
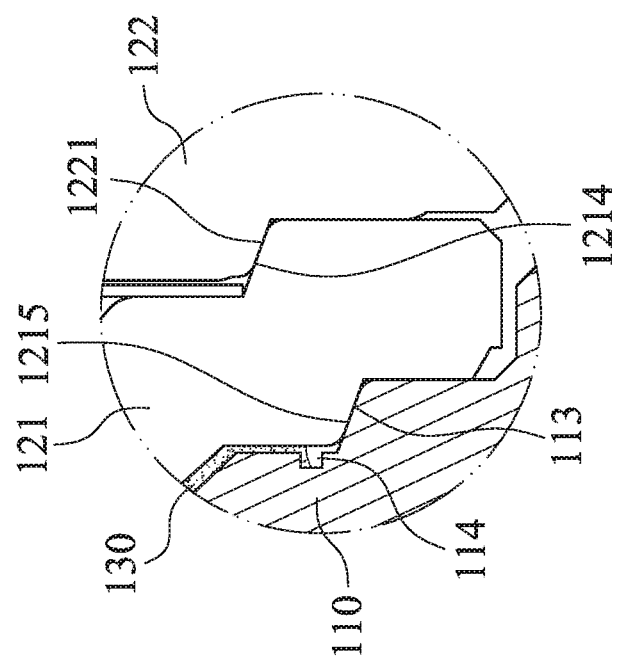
FIG. 1A is a schematic view of an imaging lens assembly according to the 1st example of the present disclosure.
FIG. 1B is a partially enlarged view of the imaging lens assembly according to the 1st example in FIG. 1A.
FIG. 1D is a partially enlarged view of the plastic lens barrel, the first optical lens element and the light-absorbing portion according to the 1st example in FIG. 1A.
FIG. 1E is a partially exploded view of the imaging lens assembly according to the 1st example in FIG. 1A.
FIG. 1F is a schematic view of parameters according to the 1st example in FIG. 1A.

The present disclosure provides an imaging lens assembly. The imaging lens assembly includes a plastic lens barrel, an optical lens element set and a light-absorbing portion. The optical lens element set includes a plurality of optical lens elements, wherein at least one of the optical lens elements includes an effective optical surface and a peripheral surface, wherein the peripheral surface surrounds the effective optical surface. At least one portion of the light-absorbing portion is connected to the plastic lens barrel. Therefore, it is favorable for enhancing an effective of blocking the non-imaging light.

The imaging lens assembly has an optical axis. The plastic lens barrel can include a minimum opening, an object-side receiving surface and an object-side outer surface. The object-side receiving surface receives to a portion of the peripheral surface, and the object-side receiving surface overlaps the peripheral surface at a direction parallel to the optical axis. The object-side outer surface and the object-side receiving surface are relatively disposed, and the object-side receiving surface overlaps the object-side outer surface at the direction parallel to the optical axis.

At least one of the optical lens elements is a first optical lens element; that is, the optical lens element includes a first optical lens element, and the first optical lens element is closest to an object side of the optical lens element set, wherein the effective optical surface of the first optical lens element faces towards an object side of the imaging lens assembly. The first optical lens element can further include an annular step structure, wherein the annular step structure is connected to the effective optical surface and the peripheral surface. Via a structure of the annular step structure, the light-absorbing portion can be accumulated to promote the optical density. In detail, the peripheral surface is a surface from the annular step structure to an outermost surface of the first optical lens element. There is a height difference between the peripheral surface and the effective optical surface, and the height difference is connected to the peripheral surface and the effective optical surface via the annular step structure.

The annular step structure is for defining an entrance pupil diameter of the imaging lens assembly. In detail, the effective optical surface is a smooth surface, and the annular step structure can have a matte surface. Hence, the effective optical surface and the annular step structure are for determining an area of the effective optical surface, and for defining the entrance pupil diameter. Or, the annular step structure is for defining a diaphragm of the imaging lens assembly, and for determining a bundle of incident light. Therefore, it is favorable for enhancing an imaging quality of the imaging lens assembly.

The light-absorbing portion can be a light-absorbing layer or a blackening plastic surface structure. Therefore, it is favorable for flexibly applying to the different types of imaging lens assemblies.

Furthermore, the at least one portion of the light-absorbing portion can be coated on the annular step structure, and at least another one portion of the light-absorbing portion can be connected to the minimum opening of the plastic lens barrel. Hence, an amount of light of the imaging lens assembly can be controlled via the light-absorbing portion. Therefore, a design of the light-absorbing portion as a through aperture is favorable for the compact size of the imaging lens assembly. Or, the light-absorbing portion can be disposed on an object side of the object-side outer surface of the plastic lens barrel, the light-absorbing portion can overlap the peripheral surface of the at least one of the optical lens elements along a direction perpendicular to the optical axis, and the light-absorbing portion can surround the effective optical surface. Therefore, the light-absorbing portion can be directly observed from an appearance of the imaging lens assembly without extra disassembling the imaging lens assembly.

The light-absorbing layer can be for retaining the at least one of the optical lens elements on the plastic lens barrel, wherein the at least one of the optical lens elements is the first optical lens element. In detail, the light-absorbing portion is originally liquid, and the curing light-absorbing portion has the adhesion to be a retaining element. Therefore, a light blocking element can be conserved, a manufacturing process of the plastic lens barrel can be simplified, and it is simultaneously favorable for blocking the non-imaging light from a periphery of the first optical lens element.

The peripheral surface can include at least one inclined surface, and the light-absorbing portion is coated on the inclined surface. In detail, every surface satisfied a range of oblique angle from the annular step structure to the outermost periphery of the first optical lens element can be the inclined surface. Therefore, a mold design of the inclined surface is favorable for releasing and demolding, and the feasibility of the light-absorbing portion coated on the first optical lens element can be simultaneously provided.

The light-absorbing portion can have an uneven thickness, and include at least one annular arc surface. In detail, because a few deviations will be occurred during a coating process, errors in the roundness or the concentricity of the light-absorbing layer will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion is a little different from the ideal shape of the proper circle.

The light-absorbing portion can be a diaphragm of the imaging lens assembly and for determining the bundle of incident light. Therefore, it is favorable for enhancing the imaging quality.

The light-absorbing portion along the direction perpendicular to the optical axis can include at least one portion not contacted with the plastic lens barrel. Via a forward disposition of the first optical lens element, the laterally incident non-imaging light can be blocked, and a space of the imaging lens assembly is not limited to a structure of the plastic lens barrel.

The optical lens element set can further include a second optical lens element disposed on an image side of the first optical lens element, and the first optical lens element can include a first axial assembling structure, and the second optical lens element can include a second axial assembling structure corresponding to the first axial assembling structure, wherein the first axial assembling structure and the second axial assembling structure are connected to each other. Furthermore, the first axial assembling structure and the second axial assembling structure are for supporting two adjacent optical lens elements to promote the concentricity between the optical lens elements. Therefore, it is favorable for enhancing the resolution and the assembling yield.

At least one of the optical lens elements of the optical lens element set can include a third axial assembling structure, and the plastic lens barrel can include a fourth axial assembling structure corresponding to the third axial assembling structure, wherein the third axial assembling structure and the fourth axial assembling structure are connected to each other. Therefore, it is favorable for promoting the coaxiality of the optical lens element and the plastic lens barrel, and increasing the structural stability.

The light-absorbing portion extends to the second optical lens element, and the light-absorbing portion is for retaining the first optical lens element to the second optical lens element and the plastic lens barrel. Therefore, the complicated blocking structure and the receiving structure of the plastic lens barrel can be replaced.

The first optical lens element and the second optical lens element can be cemented into a cemented lens element. In detail, a cement material is included between the first optical lens element and the second optical lens element. Therefore, the aberration of the imaging lens assembly can be reduced, and the stability can be promoted.

A surface of the light-absorbing portion is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly of the present disclosure has the higher efficiency of blocking the stray light.

An object side of the light-absorbing portion coated on the inclined surface and the plastic lens barrel can be connected to each other. In detail, the light-absorbing portion is interposed between the inclined surface and the plastic lens barrel, and the plastic lens barrel, the light-absorbing portion and the inclined surface are arranged in order along the direction parallel to the optical axis and overlap to each other. Therefore, it is favorable for sustaining the harder environmental test.

The peripheral surface of the first optical lens element can further include at least one reduction structure reduced from an outermost periphery of the first optical lens element to the effective optical surface. In detail, the first optical lens element with the reduction structure is an I-cut lens element structure, and the outermost periphery of the first optical lens element is composed of two corresponding surfaces and two corresponding arc surfaces. Therefore, it is favorable for reducing a volume of the imaging lens assembly.

The peripheral surface has any two areas with different distances from the optical axis, and the any two areas do not face to each other at a direction perpendicular to the optical axis. Therefore, the light-absorbing portion can be determined without a groove structure.

The at least one of the optical lens elements can be a plastic lens element, and the peripheral surface of the at least one of the optical lens elements and a portion of the light-absorbing portion overlapping the peripheral surface of the at least one of the optical lens elements along the direction perpendicular to the optical axis are without a gate trace. Therefore, a coating area of the light-absorbing portion can be more easily controlled.

When a diameter of the entrance pupil diameter is EPD, and a diameter of the minimum opening of the plastic lens barrel is $\psi b$, the following condition is satisfied: $0.4<\text{EPD}/\psi b<1.0$. Therefore, it is favorable for the compact size of the imaging lens assembly. Furthermore, the following condition can be satisfied: $0.45<\text{EPD}/\psi b<0.98$. Therefore, a proper range of a design of the imaging lens assembly with the compact size can be provided. Furthermore, the following condition can be satisfied: $0.55<\text{EPD}/\psi b<0.98$. Therefore, the optical quality of the higher specification can be further provided.

When an angle between the inclined surface and an optical axis is $\alpha$, the following condition is satisfied: 1 degree$<\alpha<50$ degrees. Therefore, it is favorable for the compact size of the imaging lens assembly. Furthermore, the following condition can be satisfied: 3 degrees $\alpha<35$ degrees. Therefore, the first optical lens element can be forward disposed via the inclined surface, and the compact size of the imaging lens assembly can be more easily obtained.

When a total length of the light-absorbing layer along the direction parallel to the optical axis is L, the following condition is satisfied: $0.2 \text{ mm}<L<1.5 \text{ mm}$. Therefore, the non-imaging light can be effectively blocked. Furthermore, the following condition can be satisfied: $0.4 \text{ mm}<L<1.4 \text{ mm}$. Therefore, the laterally incident non-imaging light can be blocked at a large range, and the light leak can be prevented.

When an outer diameter of the effective optical surface is $\psi Y$, and a maximum outer diameter of the at least one of the optical lens elements is $\psi L$, the following condition is satisfied: $0.5<\psi Y/\psi L<0.95$. Therefore, it is favorable for the compact size of the imaging lens assembly.

When a maximum diameter of the at least one portion of the light-absorbing layer not overlapping the plastic lens barrel and close to an image side of the imaging lens assembly is $\psi A$, the diameter of the entrance pupil diameter is EPD, the following condition is satisfied: $0.75<\text{EPD}/\psi A\leq 1$. Therefore, it is favorable for enhancing the effect of blocking the non-imaging light. Furthermore, the following condition can be satisfied: $0.6<\text{EPD}/\psi A\leq 1$. Furthermore, the following condition can be satisfied: $0.85<\text{EPD}/\psi A\leq 1$.

When the maximum outer diameter of the at least one of the optical lens elements is $\psi L$, and a diameter of a minimum opening of the plastic lens barrel is $\psi b$, the following condition can be satisfied: $0.7<\psi L/\psi b<2.0$. Therefore, the higher assembling yield and the higher manufacturing yield can be obtained.

When the outer diameter of the effective optical surface is $\psi Y$, and a thickness of the at least one of the optical lens elements at an optical axis is CT, the following condition can be satisfied: $1.0<\psi Y/CT<3.6$. Therefore, a formation of the optical lens elements is more stable, and a quality of the diaphragm can be more precisely controlled.

Each of the aforementioned features of the imaging lens assembly can be utilized in various combinations for achieving the corresponding effects.

The present disclosure provides a camera module, which includes the aforementioned imaging lens assembly and an image sensor. The image sensor is disposed on an image surface of the imaging lens assembly.

The present disclosure provides an electronic device, which includes the aforementioned camera module. Therefore, the imaging quality can be enhanced.

According to the aforementioned embodiment, specific examples are provided, and illustrated via figures.

1st Example

FIG. 1A is a schematic view of an imaging lens assembly 10 according to the 1st example of the present disclosure. In FIG. 1A, the imaging lens assembly 10 has an optical axis X, and includes a plastic lens barrel 110, an optical lens element set 120 and a light-absorbing portion 130, wherein the optical lens element set 120 is disposed in the plastic lens barrel 110. In detail, the light-absorbing portion 130 is a light-absorbing layer, and can also be a blackening plastic surface structure. The light-absorbing portion 130 can be directly observed from an appearance of the imaging lens assembly 10 without extra disassembling the imaging lens assembly 10.

The optical lens element set 120 includes a plurality of optical lens elements. In detail, according to the 1st example, the optical lens element set 120, in order from an object side to an image side, includes a first optical lens element 121, a second optical lens element 122, a third optical lens element 123, a fourth optical lens element 124 and a fifth optical lens element 125, wherein the first optical lens element 121 is closest to the object side of the optical lens element set 120, the second optical lens element 122 is disposed on an image side of the first optical lens element 121, and optical features such as structures, surface shapes and so on of the third optical lens element 123, the fourth optical lens element 124 and the fifth optical lens element 125 can be disposed according to different imaging demand, and the optical features are not important to the present disclosure, and will not disclose details thereof herein.

Figure 1B:
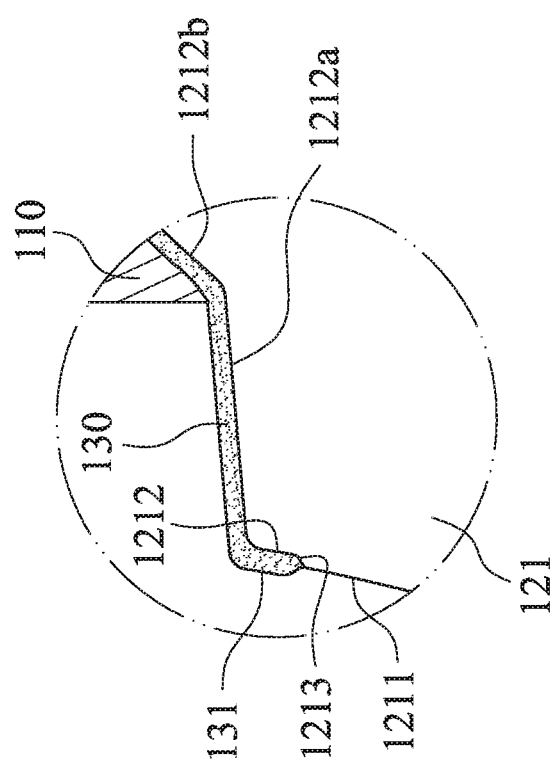

FIG. 1B is a partially enlarged view of the imaging lens assembly 10 according to the 1st example in FIG. 1A. In FIG. 1B, at least one of the optical lens elements (in detail, according to the 1st example, which is the first optical lens element 121) includes an effective optical surface 1211, a peripheral surface 1212 and an annular step structure 1213, wherein the effective optical surface 1211 faces towards an object side of the imaging lens assembly 10, the peripheral surface 1212 surrounds the effective optical surface 1211, and the annular step structure 1213 is connected to the effective optical surface 1211 and the peripheral surface 1212. There is a height difference between the peripheral surface 1212 and the effective optical surface 1211, and the height difference is connected to the peripheral surface 1212 and the effective optical surface 1211 via the annular step structure 1213.

The peripheral surface 1212 includes at least one inclined surface; in detail, according to the 1st example, the peripheral surface 1212 includes two inclined surfaces 1212a, 1212b, and the light-absorbing portion 130 is coated on the inclined surfaces 1212a, 1212b. In detail, the peripheral surface 1212 is a surface from the annular step structure 1213 to an outermost surface of the first optical lens element 121, and every surface satisfied a range of oblique angle from the annular step structure 1213 to the outermost periphery of the first optical lens element 121 can be the inclined surface. The inclined surfaces 1212a, 1212b both face towards the object side of the imaging lens assembly 10, a mold design of the inclined surfaces 1212a, 1212b is favorable for releasing and demolding, and the feasibility of the light-absorbing portion 130 coated on the first optical lens element 121 can be simultaneously provided.

The peripheral surface 1212 has any two areas with different distances from the optical axis X, and the any two areas do not face to each other at a direction perpendicular to the optical axis X. Therefore, the light-absorbing portion 130 can be determined without a groove structure.

The annular step structure 1213 is for defining an entrance pupil diameter of the imaging lens assembly 10. In detail, the effective optical surface 1211 is a smooth surface, and the annular step structure 1213 can have a matte surface. Therefore, the effective optical surface 1211 and the annular step structure 1213 can be for determining an area of the effective optical surface 1211, and for defining the entrance pupil diameter.

The plastic lens barrel 110 can include a minimum opening (not shown), an object-side receiving surface 111 and an object-side outer surface 112. The object-side receiving surface 111 receives to a portion of the peripheral surface 1212, and the object-side receiving surface 111 overlaps the peripheral surface 1212 at a direction parallel to the optical axis X. The object-side outer surface 112 and the object-side receiving surface 111 are relatively disposed, and the object-side receiving surface 111 overlaps the object-side outer surface 112 at the direction parallel to the optical axis X.

Figure 1D:
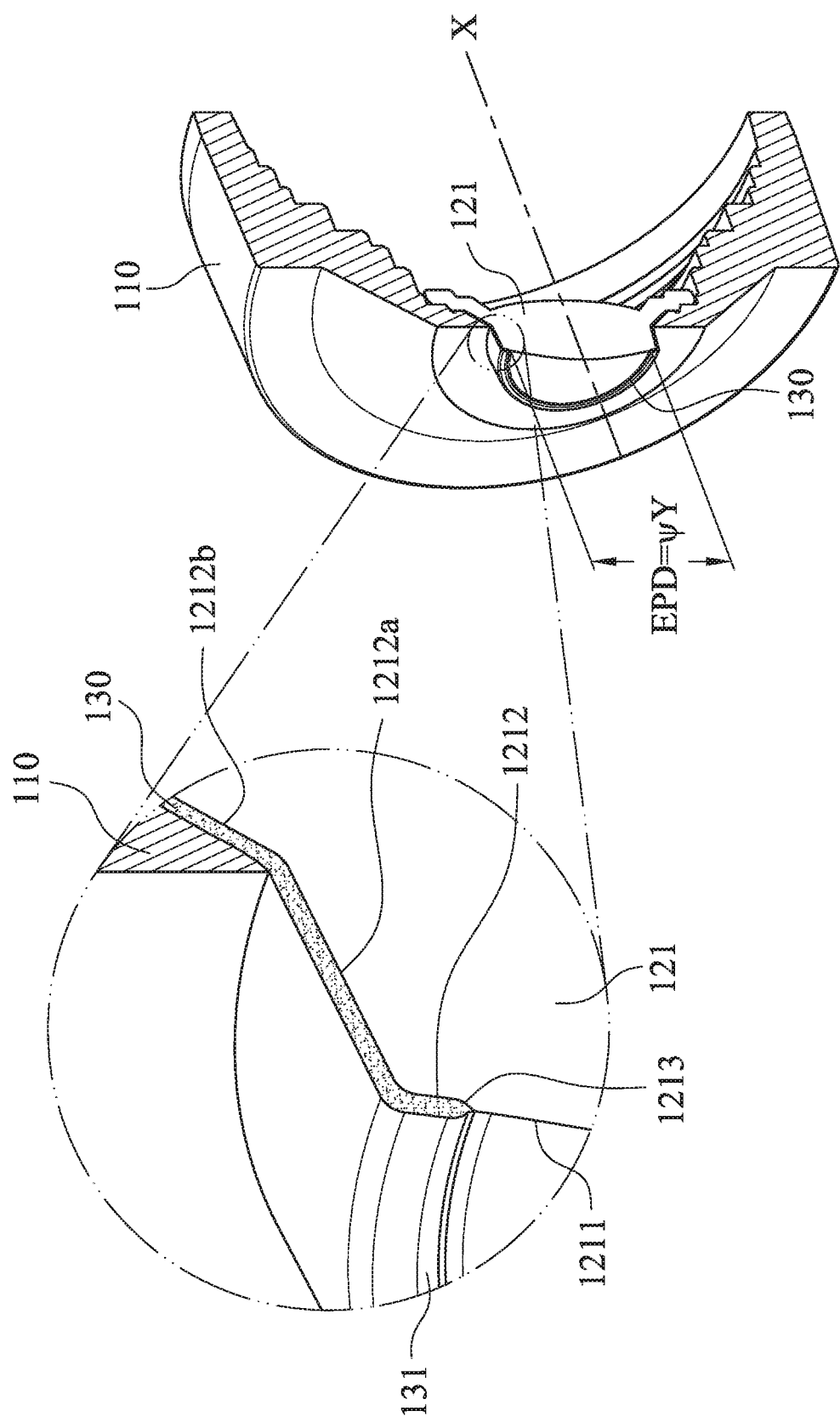

FIG. 10 is another partially enlarged view of the imaging lens assembly 10 according to the 1st example in FIG. 1A. FIG. 1D is a partially enlarged view of the plastic lens barrel 110, the first optical lens element 121 and the light-absorbing portion 130 according to the 1st example in FIG. 1A. In FIGS. 1B to 1D, the light-absorbing portion 130 has an uneven thickness, and includes at least one annular arc surface; in detail, according to the 1st example, which is an annular arc surface 131. In detail, because a few deviations will be occurred during a coating process, errors in the roundness or the concentricity of the light-absorbing portion 130 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 130 is a little different from the ideal shape of the proper circle.

At least one portion of the light-absorbing portion 130 can be coated on the annular step structure 1213, and at least another one portion of the light-absorbing portion 130 can be connected to the minimum opening of the plastic lens barrel 110, wherein the light-absorbing portion 130 can be accumulated via a structure of the annular step structure 1213 to promote the optical density. Moreover, the light-absorbing portion 130 is disposed on an object side of the object-side outer surface 112 of the plastic lens barrel 110, and is connected to the plastic lens barrel 110. The light-absorbing portion 130 overlaps the peripheral surface of the at least one of the optical lens elements along the direction perpendicular to the optical axis X, and the light-absorbing portion 130 surrounds the effective optical surface. In detail, according to the 1st example, the light-absorbing portion 130 overlaps the effective optical surface 1211 and the peripheral surface 1212 of the first optical lens element 121.

A diaphragm of the imaging lens assembly 10 is defined via the annular step structure 1213, or the light-absorbing portion 130 can be the diaphragm of the imaging lens assembly 10, and the bundle of incident light is determined via the annular step structure 1213 or the light-absorbing portion 130. In detail, according to the 1st example, the diaphragm of the imaging lens assembly 10 is determined via the annular step structure 1213, and the light-absorbing portion 130 is the diaphragm of the imaging lens assembly 10. Therefore, it is favorable for enhancing the imaging quality.

The light-absorbing portion 130 along the direction perpendicular to the optical axis X can include at least one portion not contacted with the plastic lens barrel 110. Via a forward disposition of the first optical lens element 121, the laterally incident non-imaging light can be blocked, and a space of the imaging lens assembly 10 is not limited to a structure of the plastic lens barrel 110.

A surface of the light-absorbing portion 130 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 10 according to the 1st example has the higher efficiency of blocking the stray light.

An object side of the light-absorbing portion 130 coated on the inclined surface 1212b and the plastic lens barrel 110 can be connected to each other. In detail, the light-absorbing portion 130 is interposed between the inclined surface 1212b and the plastic lens barrel 110, and the plastic lens barrel 110, the light-absorbing portion 130 and the inclined surface 1212b are arranged in order along the direction parallel to the optical axis X and overlap to each other. Therefore, it is favorable for sustaining the harder environmental test.

In detail, the light-absorbing portion 130 is originally liquid, and the curing light-absorbing portion 130 has the adhesion to be a retaining element. Also, an amount of light of the imaging lens assembly 10 can be controlled via the light-absorbing portion 130. Therefore, a design of the light-absorbing portion 130 as a through aperture is favorable for the compact size of the imaging lens assembly 10. Furthermore, a light blocking element can be conserved, a manufacturing process of the plastic lens barrel 110 can be simplified, and it is simultaneously favorable for blocking the non-imaging light from a periphery of the first optical lens element 121.

In FIG. 10, the first optical lens element 121 can include a first axial assembling structure 1214, and the second optical lens element 122 can include a second axial assembling structure 1221 corresponding to the first axial assembling structure 1214, wherein the first axial assembling structure 1214 and the second axial assembling structure 1221 are connected to each other. Furthermore, the first axial assembling structure 1214 and the second axial assembling structure 1221 are for supporting two adjacent optical lens elements to promote the concentricity between the optical lens elements. In detail, according to the 1st example, the two adjacent optical lens elements are the first optical lens element 121 and the second optical lens element 122. Therefore, it is favorable for enhancing the resolution and the assembling yield.

At least one of the optical lens elements of the optical lens element set 120 can include a third axial assembling structure 1215. In detail, according to the 1st example, the first optical lens element 121 includes the third axial assembling structure 1215, and the plastic lens barrel 110 can include a fourth axial assembling structure 113 corresponding to the third axial assembling structure 1215, wherein the third axial assembling structure 1215 and the fourth axial assembling structure 113 are connected to each other. Therefore, it is favorable for promoting the coaxiality of the optical lens element and the plastic lens barrel 110, and increasing the structural stability.

In detail, a glue-accommodating space 114 is included between the plastic lens barrel 110 and the first optical lens element 121. Therefore, an overflowing condition can be prevented.

Figure 1E:
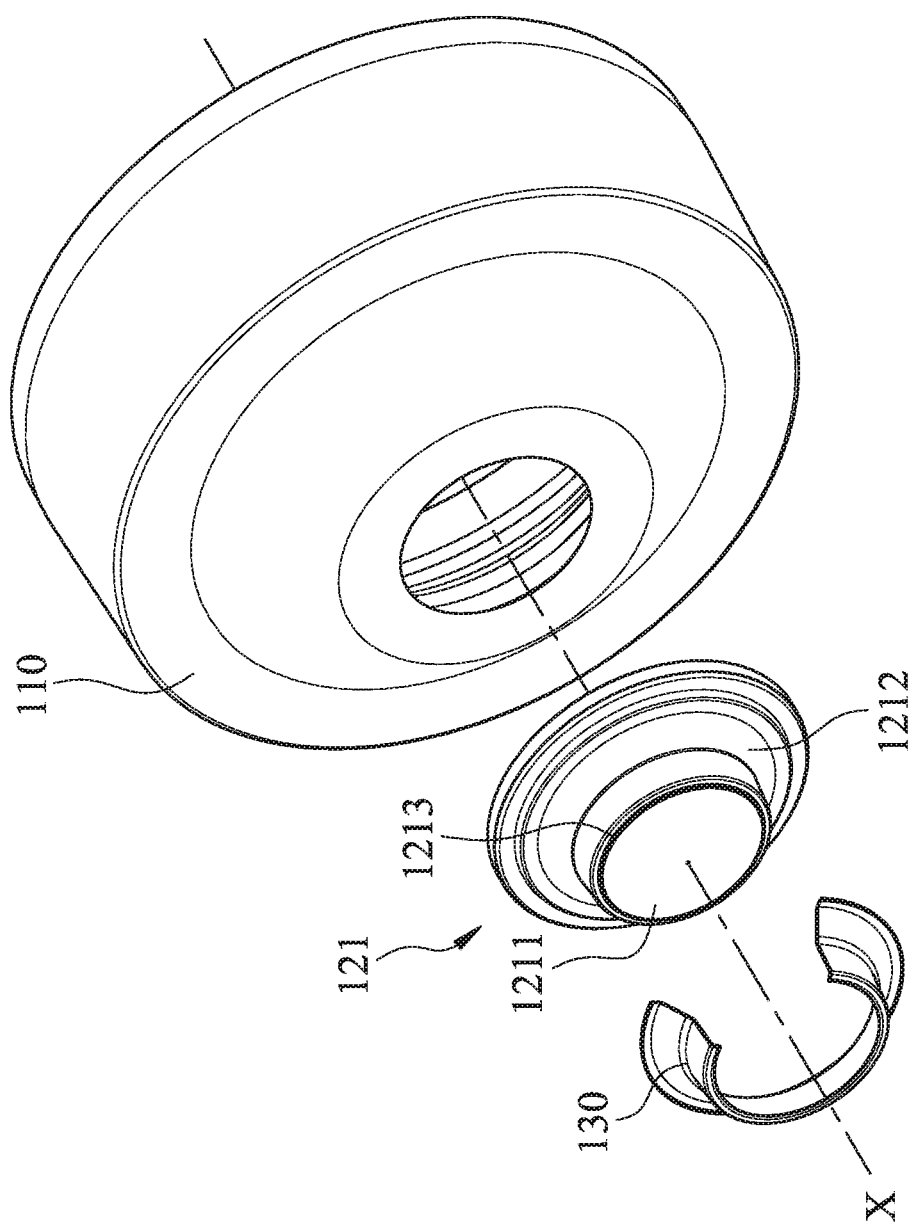

FIG. 1E is a partially exploded view of the imaging lens assembly 10 according to the 1st example in FIG. 1A. In FIG. 1E, the at least one of the optical lens elements (in detail, according to the 1st example, which is the first optical lens element 121) can be a plastic lens element, and the peripheral surface 1212 of the at least one of the optical lens elements (in detail, according to the 1st example, which is the first optical lens element 121) and a portion of the light-absorbing portion 130 overlapping the peripheral surface 1212 of the at least one of the optical lens elements (in detail, according to the 1st example, which is the first optical lens element 121) along the direction perpendicular to the optical axis X are without a gate trace.

Figure 1F:
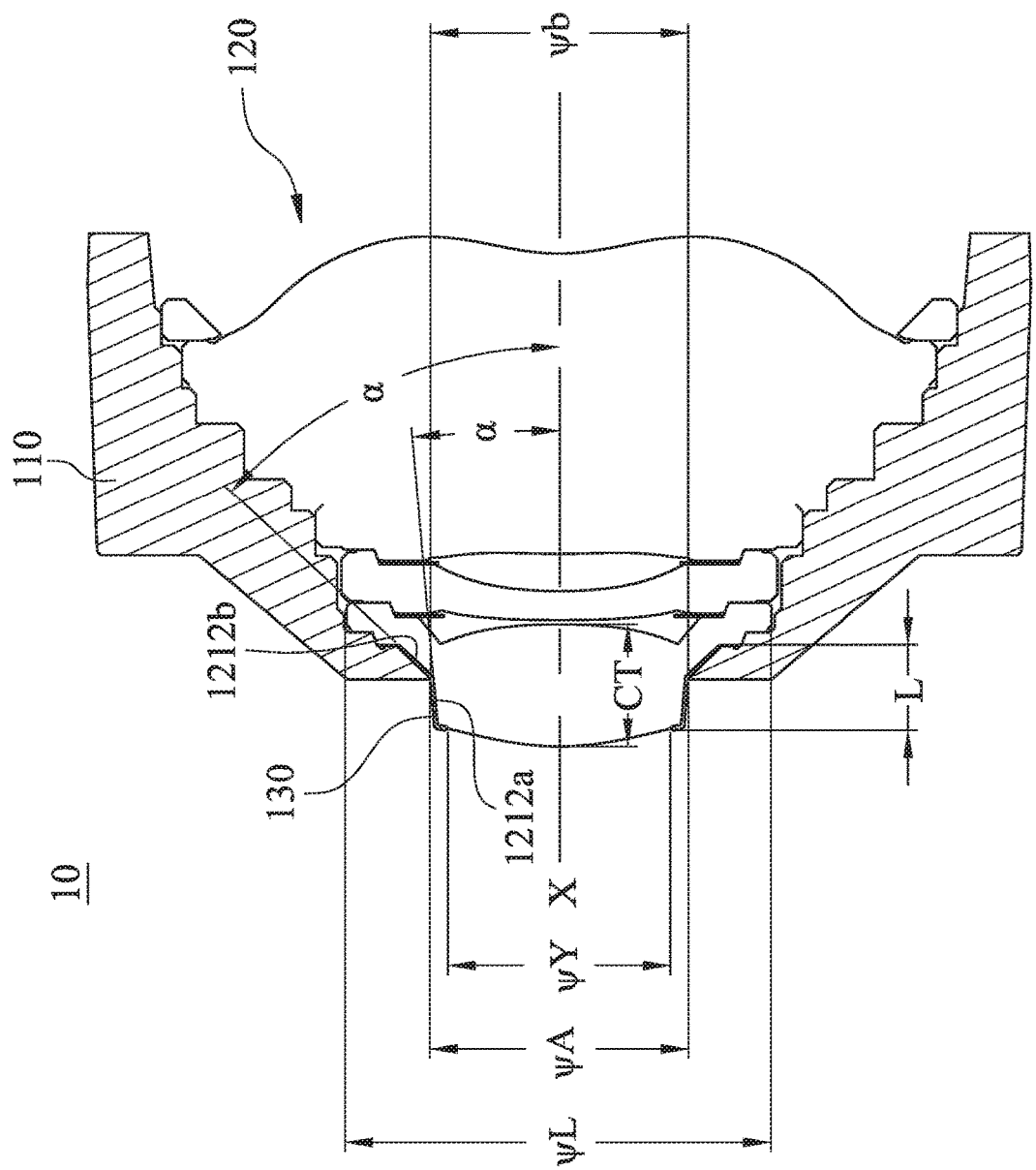

FIG. 1F is a schematic view of parameters according to the 1st example in FIG. 1A. In FIG. 1F, an angle α between the inclined surface 1212a and the optical axis X is 5 degrees, and the angle α between the inclined surface 1212b and the optical axis X is 48 degrees.

In FIGS. 1D and 1F, according to the 1st example, when a diameter of the entrance pupil diameter is EPD, a diameter of the minimum opening of the plastic lens barrel 110 is ψb, a maximum diameter of the at least one portion of the light-absorbing portion 130 not overlapping the plastic lens barrel 110 and close to an image side of the imaging lens assembly 10 is ψA, a total length of the light-absorbing portion 130 along the direction parallel to the optical axis X is L, an outer diameter of the effective optical surface 1211 is ψY, a maximum outer diameter of the at least one of the optical lens elements (in detail, according to the 1st example, which is the first optical lens element 121) is ψL, a thickness of the at least one of the optical lens elements (in detail, according to the 1st example, which is the first optical lens element 121) at the optical axis X is CT, the following conditions of the Table 1 are satisfied.

TABLE 1

| 1st example | | | |
|---|---|---|---|
| EPD (mm) | 1.62 | ψY (mm) | 1.62 |
| ψb (mm) | 1.881 | ψL (mm) | 3.098 |

TABLE 1-continued

| 1st example | | | |
|---|---|---|---|
| EPD/ψb | 0.861 | ψY/ψL | 0.523 |
| ψA (mm) | 1.884 | ψL/ψb | 1.647 |
| EPD/ψA | 0.860 | CT (mm) | 0.89 |
| L (mm) | 0.622 | ψY/CT | 1.820 |

According to the 1st example, it should be mentioned that ψY=EPD.

2nd Example

Figure 2A:
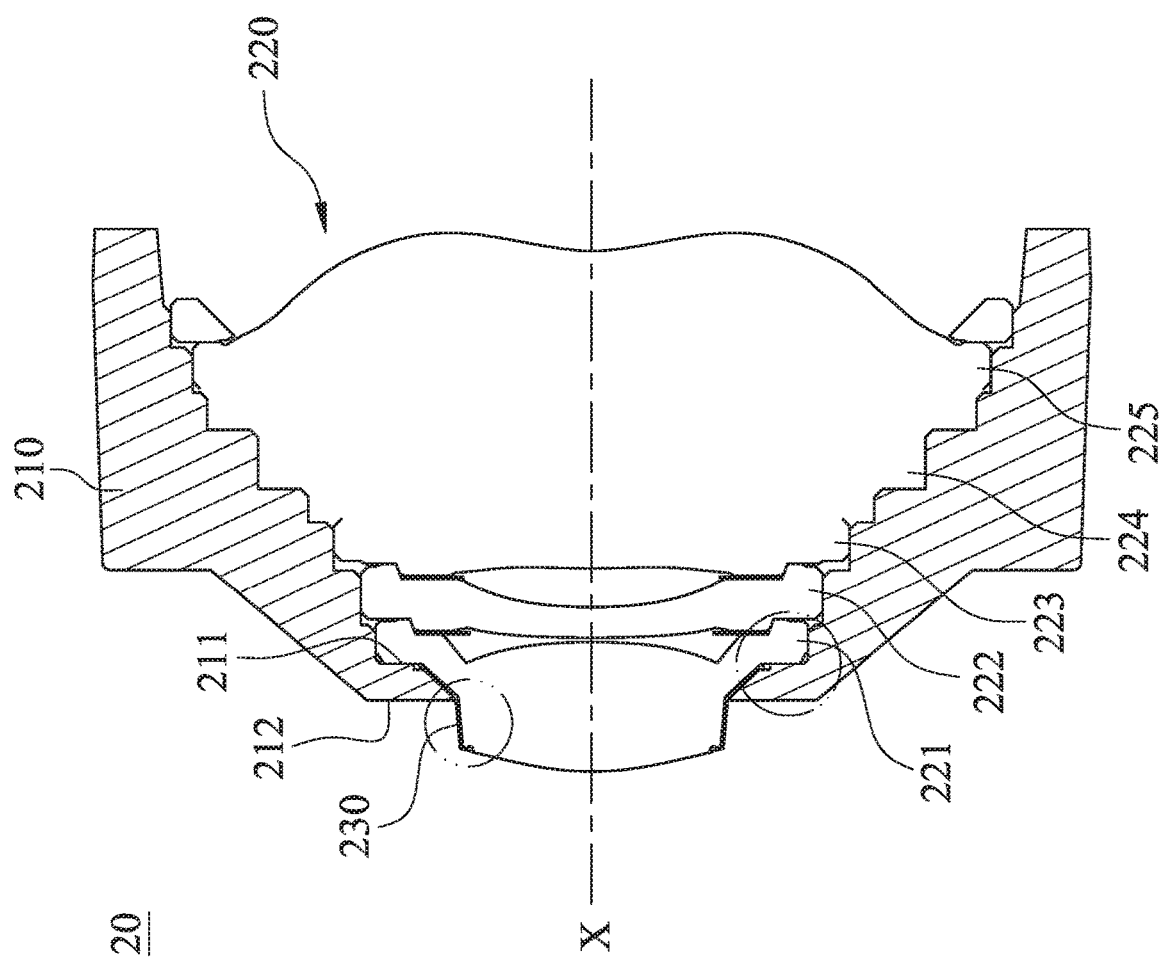
FIG. 2A is a schematic view of an imaging lens assembly according to the 2nd example of the present disclosure.

FIG. 2A is a schematic view of an imaging lens assembly 20 according to the 2nd example of the present disclosure. In FIG. 2A, the imaging lens assembly 20 has an optical axis X, and includes a plastic lens barrel 210, an optical lens element set 220 and a light-absorbing portion 230, wherein the optical lens element set 220 is disposed in the plastic lens barrel 210. In detail, the light-absorbing portion 230 is a light-absorbing layer, and can also be a blackening plastic surface structure. The light-absorbing portion 230 can be directly observed from an appearance of the imaging lens assembly 20 without extra disassembling the imaging lens assembly 20.

The optical lens element set 220 includes a plurality of optical lens elements. In detail, according to the 2nd example, the optical lens element set 220, in order from an object side to an image side, includes a first optical lens element 221, a second optical lens element 222, a third optical lens element 223, a fourth optical lens element 224 and a fifth optical lens element 225, wherein the first optical lens element 221 is closest to the object side of the optical lens element set 220, the second optical lens element 222 is disposed on an image side of the first optical lens element 221, and optical features such as structures, surface shapes and so on of the third optical lens element 223, the fourth optical lens element 224 and the fifth optical lens element 225 can be disposed according to different imaging demand, and the optical features are not important to the present disclosure, and will not disclose details thereof herein.

Figure 2C:
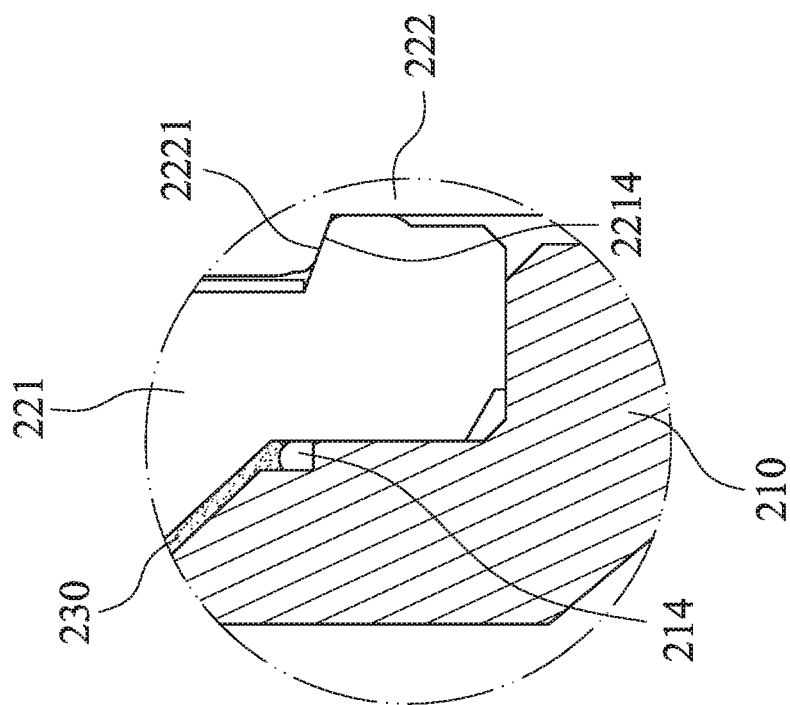
FIG. 2C is another partially enlarged view of the imaging lens assembly according to the 2nd example in FIG. 2A.
Figure 2B:
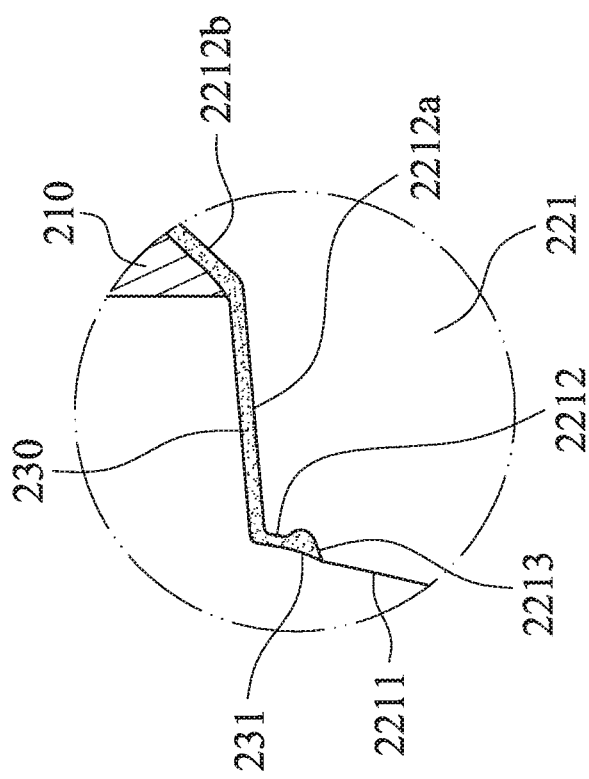
FIG. 2B is a partially enlarged view of the imaging lens assembly according to the 2nd example in FIG. 2A.

FIG. 2B is a partially enlarged view of the imaging lens assembly 20 according to the 2nd example in FIG. 2A. In FIG. 2B, at least one of the optical lens elements (in detail, according to the 2nd example, which is the first optical lens element 221) includes an effective optical surface 2211, a peripheral surface 2212 and an annular step structure 2213, wherein the effective optical surface 2211 faces towards an object side of the imaging lens assembly 20, the peripheral surface 2212 surrounds the effective optical surface 2211, and the annular step structure 2213 is connected to the effective optical surface 2211 and the peripheral surface 2212. There is a height difference between the peripheral surface 2212 and the effective optical surface 2211, and the height difference is connected to the peripheral surface 2212 and the effective optical surface 2211 via the annular step structure 2213.

The peripheral surface 2212 includes at least one inclined surface; in detail, according to the 2nd example, the peripheral surface 2212 includes two inclined surfaces 2212a, 2212b, and the light-absorbing portion 230 is coated on the inclined surfaces 2212a, 2212b. In detail, the peripheral surface 2212 is a surface from the annular step structure 2213 to an outermost surface of the first optical lens element 221, and every surface satisfied a range of oblique angle from the annular step structure 2213 to the outermost periphery of the first optical lens element 221 can be the inclined surface. The inclined surfaces 2212a, 2212b both face towards the object side of the imaging lens assembly 20, a mold design of the inclined surfaces 2212a, 2212b is favorable for releasing and demolding, and the feasibility of the light-absorbing portion 230 coated on the first optical lens element 221 can be simultaneously provided.

The peripheral surface 2212 has any two areas with different distances from the optical axis X, and the any two areas do not face to each other at a direction perpendicular to the optical axis X. Therefore, the light-absorbing portion 230 can be determined without a groove structure.

The annular step structure 2213 is for defining an entrance pupil diameter of the imaging lens assembly 20. In detail, the effective optical surface 2211 is a smooth surface, and the annular step structure 2213 can have a matte surface. Therefore, the effective optical surface 2211 and the annular step structure 2213 can be for determining an area of the effective optical surface 2211, and for defining the entrance pupil diameter.

The plastic lens barrel 210 can include a minimum opening (not shown), an object-side receiving surface 211 and an object-side outer surface 212. The object-side receiving surface 211 receives to a portion of the peripheral surface 2212, and the object-side receiving surface 211 overlaps the peripheral surface 2212 at a direction parallel to the optical axis X. The object-side outer surface 212 and the object-side receiving surface 211 are relatively disposed, and the object-side receiving surface 211 overlaps the object-side outer surface 212 at the direction parallel to the optical axis X.

Figure 2D:
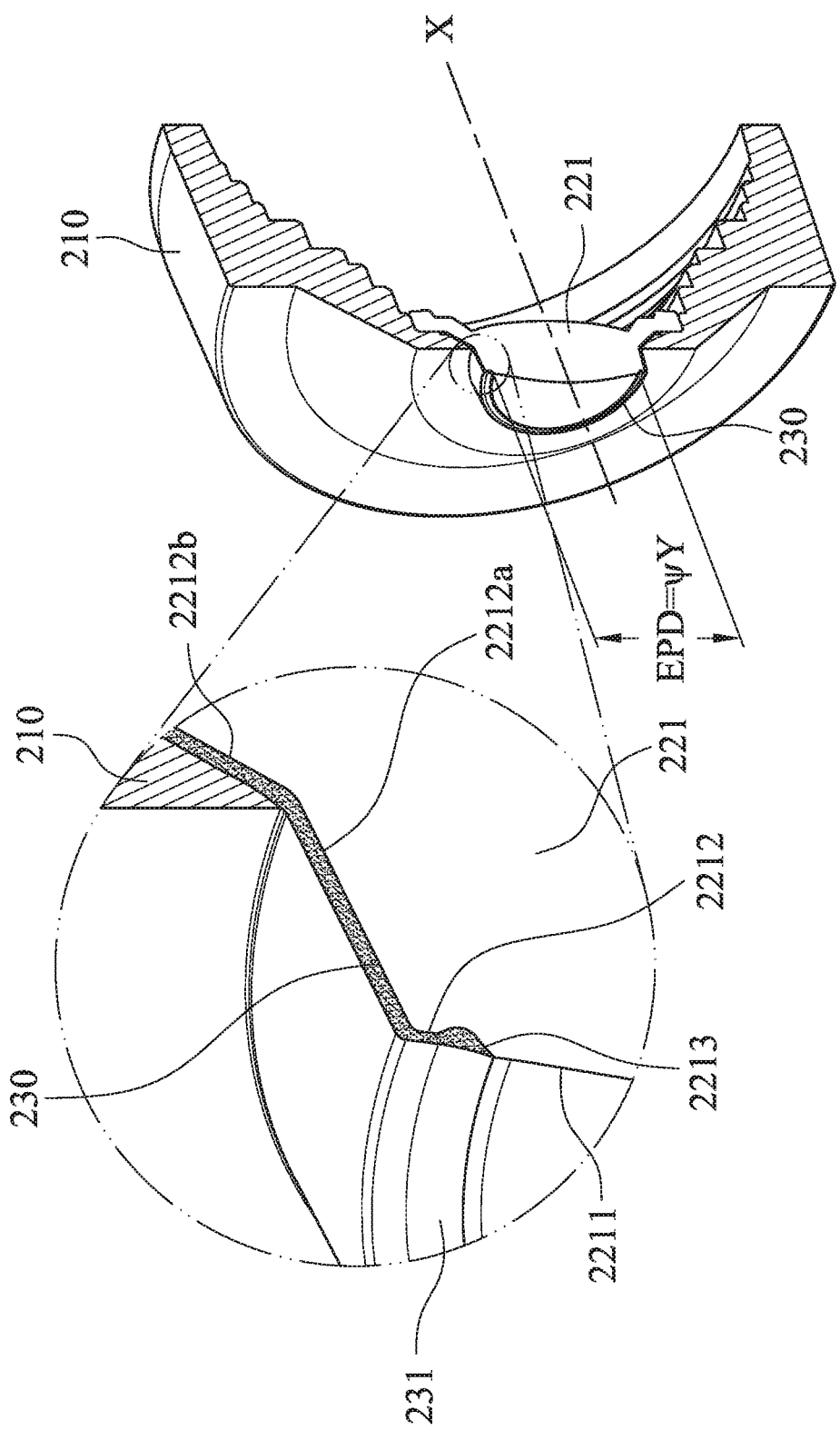
FIG. 2D is a partially enlarged view of the plastic lens barrel, the first optical lens element and the light-absorbing portion according to the 2nd example in FIG. 2A.

FIG. 2C is another partially enlarged view of the imaging lens assembly 20 according to the 2nd example in FIG. 2A. FIG. 2D is a partially enlarged view of the plastic lens barrel 210, the first optical lens element 221 and the light-absorbing portion 230 according to the 2nd example in FIG. 2A. In FIGS. 2B to 2D, the light-absorbing portion 230 has an uneven thickness, and includes at least one annular arc surface; in detail, according to the 2nd example, which is an annular arc surface 231. In detail, because a few deviations will be occurred during a coating process, errors in the roundness or the concentricity of the light-absorbing layer 230 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 230 is a little different from the ideal shape of the proper circle.

At least one portion of the light-absorbing portion 230 can be coated on the annular step structure 2213, and at least another one portion of the light-absorbing portion 230 can be connected to the minimum opening of the plastic lens barrel 210, wherein the light-absorbing portion 230 can be accumulated via a structure of the annular step structure 2213 to promote the optical density. Moreover, the light-absorbing portion 230 is disposed on an object side of the object-side outer surface 212 of the plastic lens barrel 210, and is connected to the plastic lens barrel 210. The light-absorbing portion 230 overlaps the peripheral surface of the at least one of the optical lens elements along the direction perpendicular to the optical axis X, and the light-absorbing portion 230 surrounds the effective optical surface. In detail, according to the 2nd example, the light-absorbing portion 230 overlaps the effective optical surface 2211 and the peripheral surface 2212 of the first optical lens element 221.

A diaphragm of the imaging lens assembly 20 is defined via the annular step structure 2213, or the light-absorbing portion 230 can be the diaphragm of the imaging lens assembly 20, and the bundle of incident light is determined via the annular step structure 2213 or the light-absorbing portion 230. In detail, according to the 2nd example, the diaphragm of the imaging lens assembly 20 is determined via the annular step structure 2213, and the light-absorbing portion 230 is the diaphragm of the imaging lens assembly 20. Therefore, it is favorable for enhancing the imaging quality.

The light-absorbing portion 230 along the direction perpendicular to the optical axis X can include at least one portion not contacted with the plastic lens barrel 210. Via a forward disposition of the first optical lens element 221, the laterally incident non-imaging light can be blocked, and a space of the imaging lens assembly 20 is not limited to a structure of the plastic lens barrel 210.

A surface of the light-absorbing portion 230 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 20 according to the 2nd example has the higher efficiency of blocking the stray light.

In FIG. 2B, an object side of the light-absorbing portion 230 coated on the inclined surface 2212b and the plastic lens barrel 210 can be connected to each other. In detail, the light-absorbing portion 230 is interposed between the inclined surface 2212b and the plastic lens barrel 210, and the plastic lens barrel 210, the light-absorbing portion 230 and the inclined surface 2212b are arranged in order along the direction parallel to the optical axis X and overlap to each other. Therefore, it is favorable for sustaining the harder environmental test.

In detail, the light-absorbing portion 230 is originally liquid, and the curing light-absorbing portion 230 has the adhesion to be a retaining element. Also, an amount of light of the imaging lens assembly 20 can be controlled via the light-absorbing portion 230. Therefore, a design of the light-absorbing portion 230 as a through aperture is favorable for the compact size of the imaging lens assembly 20. Furthermore, a light blocking element can be conserved, a manufacturing process of the plastic lens barrel 210 can be simplified, and it is simultaneously favorable for blocking the non-imaging light from a periphery of the first optical lens element 221.

In FIG. 2C, the first optical lens element 221 can include a first axial assembling structure 2214, and the second optical lens element 222 can include a second axial assembling structure 2221 corresponding to the first axial assembling structure 2214, wherein the first axial assembling structure 2214 and the second axial assembling structure 2221 are connected to each other. Furthermore, the first axial assembling structure 2214 and the second axial assembling structure 2221 are for supporting two adjacent optical lens elements to promote the concentricity between the optical lens elements. In detail, according to the 2nd example, the two adjacent optical lens elements are the first optical lens element 221 and the second optical lens element 222. Therefore, it is favorable for enhancing the resolution and the assembling yield.

In detail, a glue-accommodating space 214 is included between the plastic lens barrel 210 and the first optical lens element 221. Therefore, an overflowing condition can be prevented.

Figure 2E:
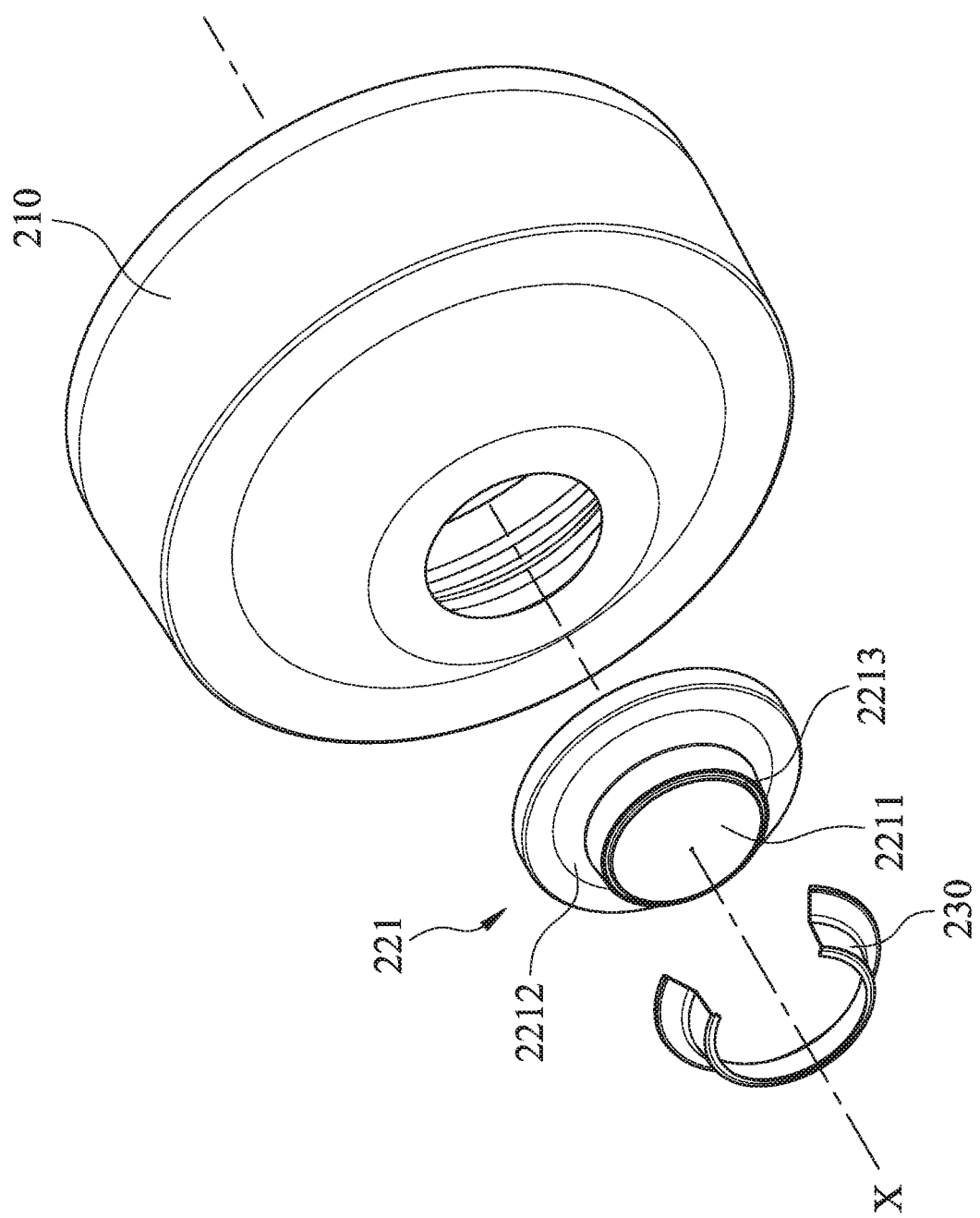
FIG. 2E is a partially exploded view of the imaging lens assembly according to the 2nd example in FIG. 2A.

FIG. 2E is a partially exploded view of the imaging lens assembly 20 according to the 2nd example in FIG. 2A. In FIG. 2E, the at least one of the optical lens elements (in detail, according to the 2nd example, which is the first optical lens element 221) can be a plastic lens element, and the peripheral surface 2212 of the at least one of the optical lens elements (in detail, according to the 2nd example, which is the first optical lens element 221) and a portion of the light-absorbing portion 230 overlapping the peripheral surface 2212 of the at least one of the optical lens elements (in detail, according to the 2nd example, which is the first optical lens element 221) along the direction perpendicular to the optical axis X are without a gate trace.

Figure 2F:
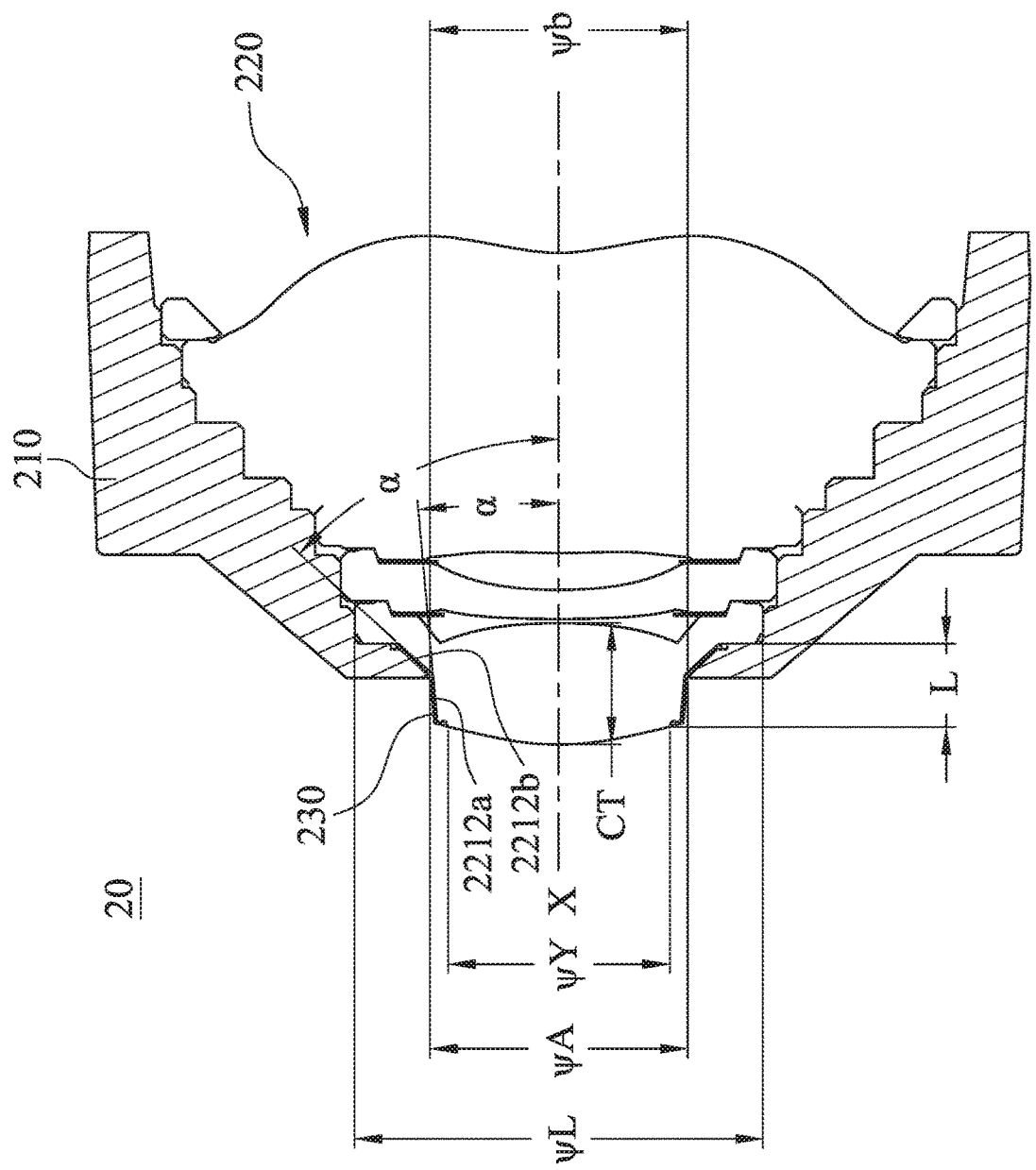
FIG. 2F is a schematic view of parameters according to the 2nd example in FIG. 2A.

FIG. 2F is a schematic view of parameters according to the 2nd example in FIG. 2A. In FIG. 2F, an angle α between the inclined surface 2212a and the optical axis X is 5 degrees, and the angle α between the inclined surface 2212b and the optical axis X is 48 degrees.

In FIGS. 2D and 2F, according to the 2nd example, when a diameter of the entrance pupil diameter is EPD, a diameter of the minimum opening of the plastic lens barrel 210 is ψb, a maximum diameter of the at least one portion of the light-absorbing portion 230 not overlapping the plastic lens barrel 210 and close to an image side of the imaging lens assembly 20 is ψA, a total length of the light-absorbing portion 230 along the direction parallel to the optical axis X is L, an outer diameter of the effective optical surface 2211 is ψY, a maximum outer diameter of the at least one of the optical lens elements (in detail, according to the 2nd example, which is the first optical lens element 221) is ψL, a thickness of the at least one of the optical lens elements (in detail, according to the 2nd example, which is the first optical lens element 221) at the optical axis X is CT, the following conditions of the Table 2 are satisfied.

TABLE 2

| 2nd example | | | |
|---|---|---|---|
| EPD (mm) | 1.62 | ψY (mm) | 1.62 |
| ψb (mm) | 1.881 | ψL (mm) | 2.978 |
| EPD/ψb | 0.861 | ψY/ψL | 0.544 |
| ψA (mm) | 1.881 | ψL/ψb | 1.583 |
| EPD/ψA | 0.861 | CT (mm) | 0.89 |
| L (mm) | 0.612 | ψY/CT | 1.820 |

According to the 2nd example, it should be mentioned that ψY=EPD, and ψA=ψb.

3rd Example

Figure 3A:
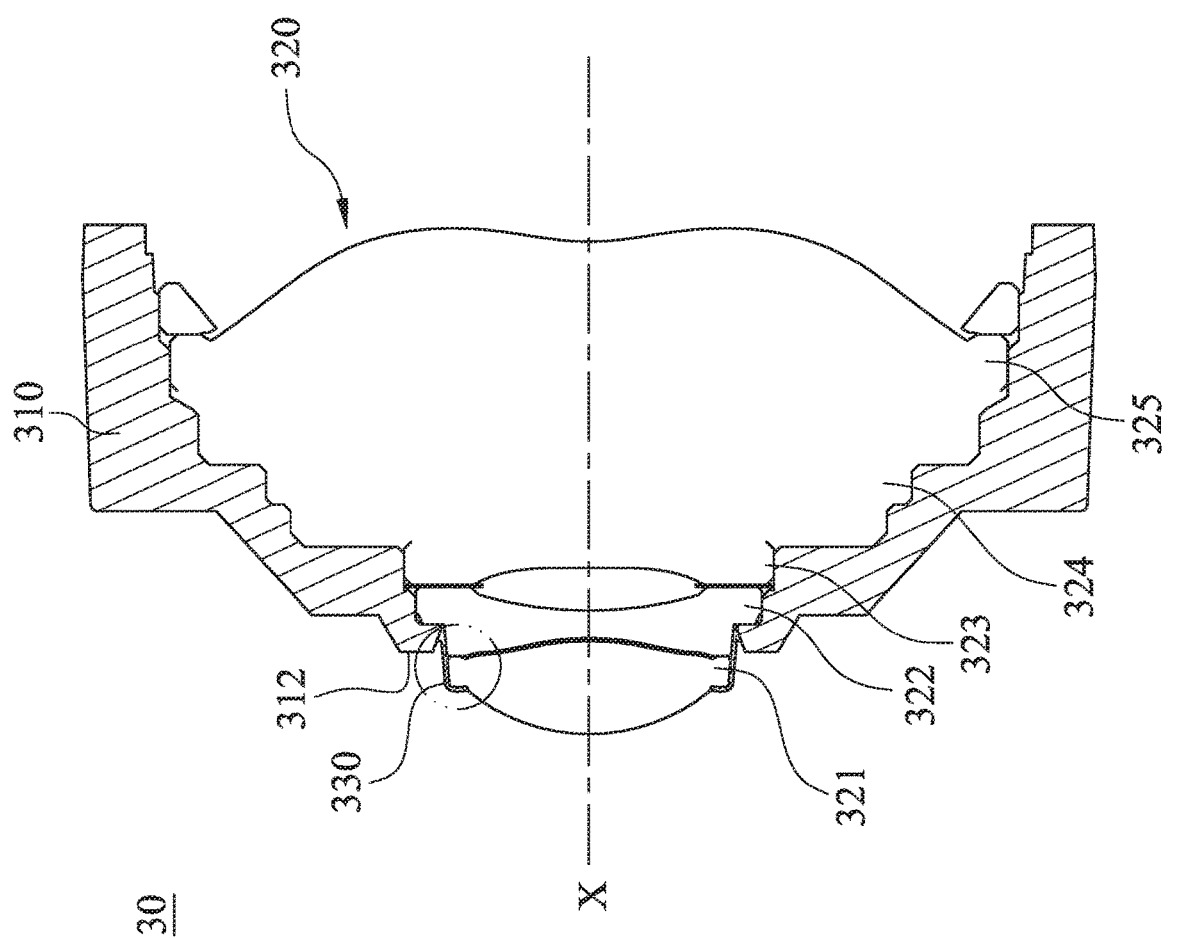
FIG. 3A is a schematic view of an imaging lens assembly according to the 3rd example of the present disclosure.

FIG. 3A is a schematic view of an imaging lens assembly 30 according to the 3rd example of the present disclosure. In FIG. 3A, the imaging lens assembly 30 has an optical axis X, and includes a plastic lens barrel 310, an optical lens element set 320 and a light-absorbing portion 330. In detail, the light-absorbing portion 330 is a light-absorbing layer, and can also be a blackening plastic surface structure. The light-absorbing portion 330 can be directly observed from an appearance of the imaging lens assembly 30 without extra disassembling the imaging lens assembly 30.

The optical lens element set 320 includes a plurality of optical lens elements. In detail, according to the 3rd example, the optical lens element set 320, in order from an object side to an image side, includes a first optical lens element 321, a second optical lens element 322, a third optical lens element 323, a fourth optical lens element 324 and a fifth optical lens element 325, wherein the first optical lens element 321 is closest to the object side of the optical lens element set 320, the second optical lens element 322 is disposed on an image side of the first optical lens element 321, and optical features such as structures, surface shapes and so on of the third optical lens element 323, the fourth optical lens element 324 and the fifth optical lens element 325 can be disposed according to different imaging demand, and the optical features are not important to the present disclosure, and will not disclose details thereof herein.

Figure 3B:
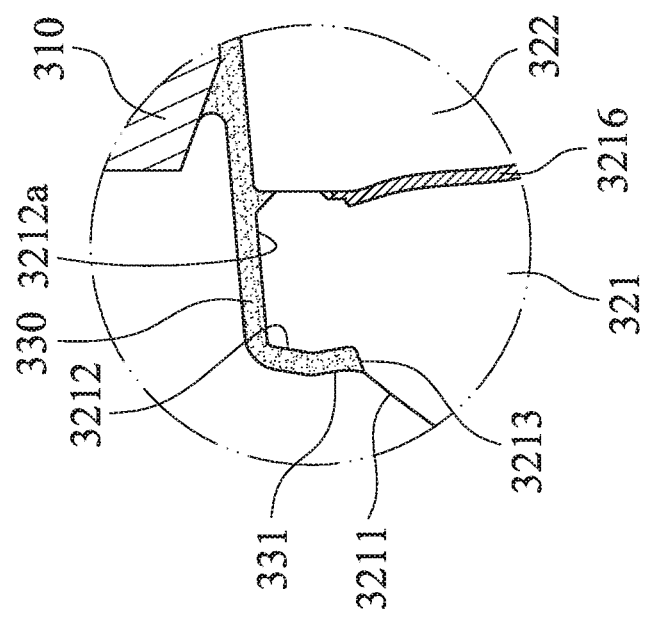
FIG. 3B is a partially enlarged view of the imaging lens assembly according to the 3rd example in FIG. 3A.

FIG. 3B is a partially enlarged view of the imaging lens assembly 30 according to the 3rd example in FIG. 3A. In FIG. 3B, at least one of the optical lens elements (in detail, according to the 3rd example, which is the first optical lens element 321) includes an effective optical surface 3211, a peripheral surface 3212 and an annular step structure 3213, wherein the effective optical surface 3211 faces towards an object side of the imaging lens assembly 30, the peripheral surface 3212 surrounds the effective optical surface 3211, and the annular step structure 3213 is connected to the effective optical surface 3211 and the peripheral surface 3212.

Figure 3C:
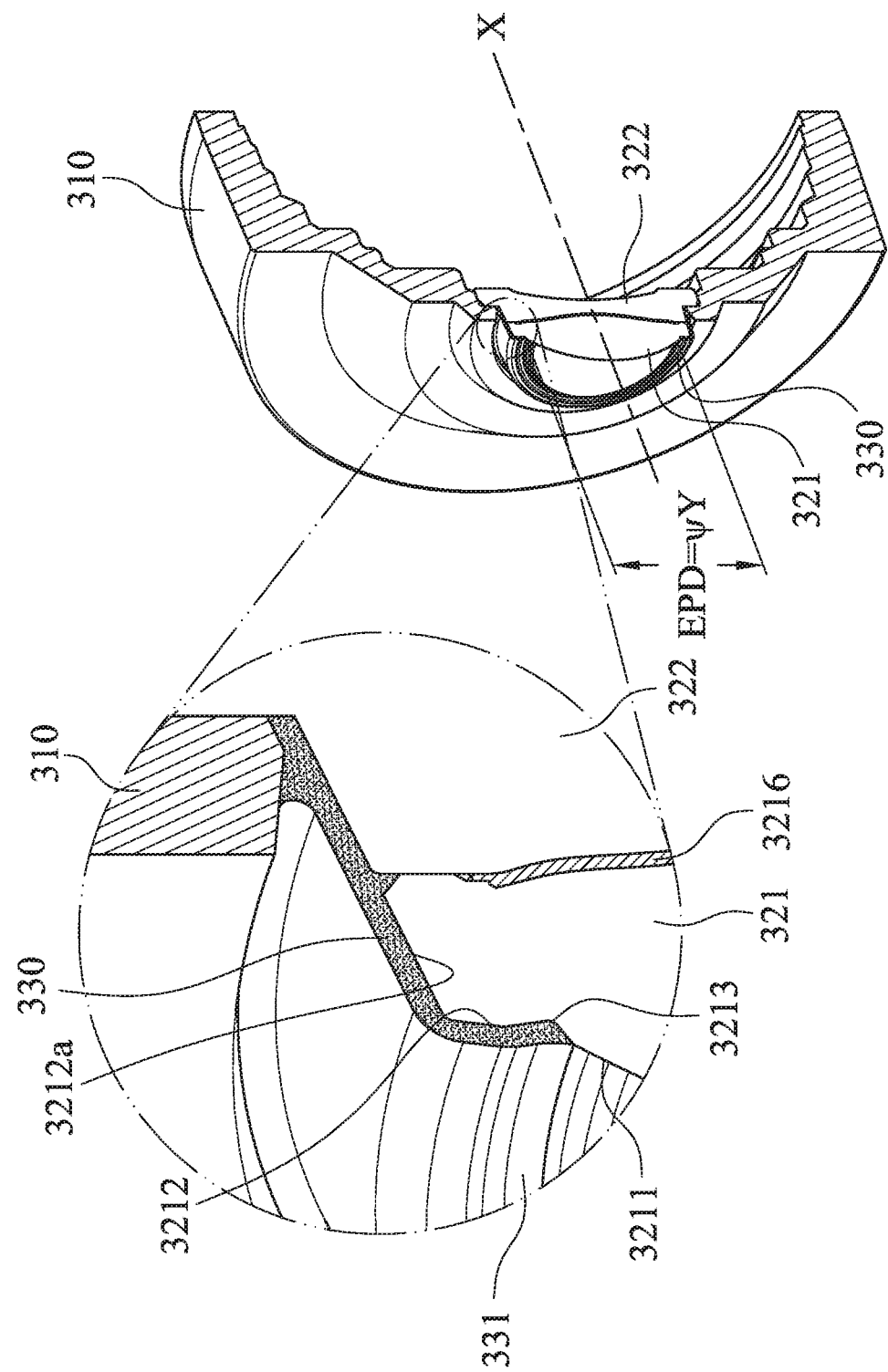
FIG. 3C is a partially enlarged view of the plastic lens barrel, the first optical lens element, the second optical lens element and the light-absorbing portion according to the 3rd example in FIG. 3A.

FIG. 3C is a partially enlarged view of the plastic lens barrel 310, the first optical lens element 321, the second optical lens element 322 and the light-absorbing portion 330 according to the 3rd example in FIG. 3A. In FIGS. 3A to 3C, the first optical lens element 321 and the second optical lens element 322 can be cemented into a cemented lens element. In detail, a cement material 3216 is included between the first optical lens element 321 and the second optical lens element 322. Therefore, the aberration of the imaging lens assembly 30 can be reduced, and the stability can be promoted.

The peripheral surface 3212 includes at least one inclined surface; in detail, according to the 3rd example, the peripheral surface 3212 includes a inclined surface 3212a, and the light-absorbing portion 330 is coated on the inclined surface 3212a. In detail, the peripheral surface 3212 is a surface from the annular step structure 3213 to an outermost surface of the first optical lens element 321, and every surface satisfied a range of oblique angle from the annular step structure 3213 to the outermost periphery of the first optical lens element 321 can be the inclined surface. The inclined surface 3212a faces towards the object side of the imaging lens assembly 30, a mold design of the inclined surface 3212a is favorable for releasing and demolding, and the feasibility of the light-absorbing portion 330 coated on the first optical lens element 321 can be simultaneously provided.

The peripheral surface 3212 has any two areas with different distances from the optical axis X, and the any two areas do not face to each other at a direction perpendicular to the optical axis X. Therefore, the light-absorbing portion 330 can be determined without a groove structure.

The annular step structure 3213 is for defining an entrance pupil diameter of the imaging lens assembly 30. In detail, the effective optical surface 3211 is a smooth surface, and the annular step structure 3213 can have a matte surface. Therefore, the effective optical surface 3211 and the annular step structure 3213 can be for determining an area of the effective optical surface 3211, and for defining the entrance pupil diameter.

In FIGS. 3B to 3C, the light-absorbing portion 330 has an uneven thickness, and includes at least one annular arc surface; in detail, according to the 3rd example, which is an annular arc surface 331. In detail, because a few deviations will be occurred during a coating process, errors in the roundness or the concentricity of the light-absorbing portion 330 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 330 is a little different from the ideal shape of the proper circle.

At least one portion of the light-absorbing portion 330 can be coated on the annular step structure 3213, and at least another one portion of the light-absorbing portion 330 can be connected to a minimum opening of the plastic lens barrel 310, wherein the light-absorbing portion 330 can be accumulated via a structure of the annular step structure 3213 to promote the optical density. Moreover, the light-absorbing portion 330 is disposed on an object side of an object-side outer surface 312 of the plastic lens barrel 310, and is connected to the plastic lens barrel 310. The light-absorbing portion 330 overlaps the peripheral surface of the at least one of the optical lens elements along the direction perpendicular to the optical axis X, and the light-absorbing portion 330 surrounds the effective optical surface. In detail, according to the 3rd example, the light-absorbing portion 330 overlaps the effective optical surface 3211 and the peripheral surface 3212 of the first optical lens element 321.

A diaphragm of the imaging lens assembly 30 is defined via the annular step structure 3213, or the light-absorbing portion 330 can be the diaphragm of the imaging lens assembly 30, and the bundle of incident light is determined via the annular step structure 3213 or the light-absorbing portion 330. In detail, according to the 3rd example, the diaphragm of the imaging lens assembly 30 is determined via the annular step structure 3213, and the light-absorbing portion 330 is the diaphragm of the imaging lens assembly 30. Therefore, it is favorable for enhancing the imaging quality.

The light-absorbing portion 330 along the direction perpendicular to the optical axis X can include at least one portion not contacted with the plastic lens barrel 310. Via a forward disposition of the first optical lens element 321, the laterally incident non-imaging light can be blocked, and a space of the imaging lens assembly 30 is not limited to a structure of the plastic lens barrel 310.

According to the 3rd example, the light-absorbing portion 330 extends to the second optical lens element 322, and the light-absorbing portion 330 is for retaining the first optical lens element 321 to the second optical lens element 322 and the plastic lens barrel 310. Therefore, the complicated blocking structure and the receiving structure of the plastic lens barrel 310 can be replaced.

A surface of the light-absorbing portion 330 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 30 according to the 3rd example has the higher efficiency of blocking the stray light.

In detail, the light-absorbing portion 330 is originally liquid, and the curing light-absorbing portion 330 has the adhesion to be a retaining element. Also, an amount of light of the imaging lens assembly 30 can be controlled via the light-absorbing portion 330. Therefore, a design of the light-absorbing portion 330 as a through aperture is favorable for the compact size of the imaging lens assembly 30. Furthermore, a light blocking element can be conserved, a manufacturing process of the plastic lens barrel 310 can be simplified, and it is simultaneously favorable for blocking the non-imaging light from a periphery of the first optical lens element 321.

Figure 3D:
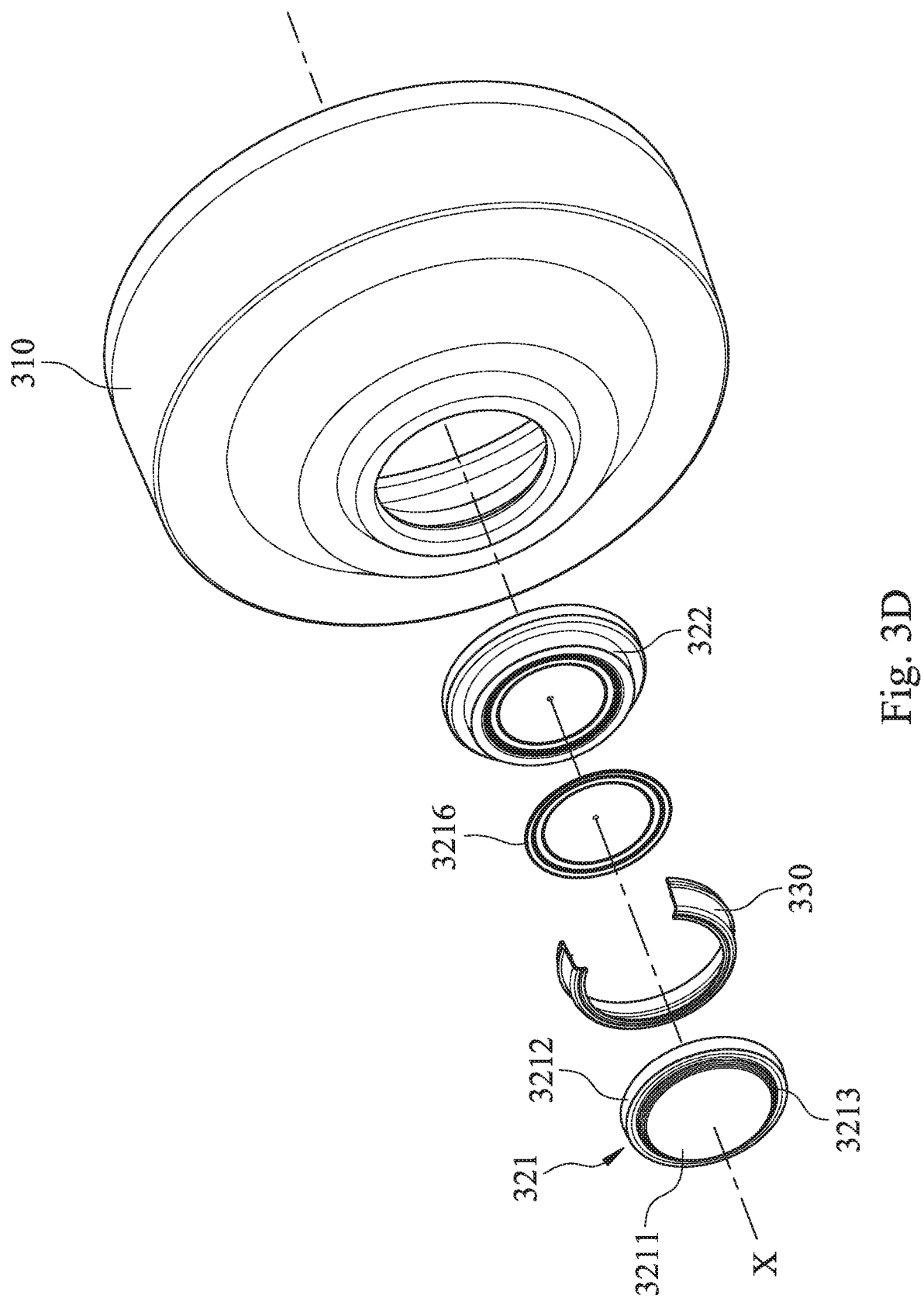
FIG. 3D is a partially exploded view of the imaging lens assembly according to the 3rd example in FIG. 3A.

FIG. 3D is a partially exploded view of the imaging lens assembly 30 according to the 3rd example in FIG. 3A. In FIG. 3D, the at least one of the optical lens elements (in detail, according to the 3rd example, which is the first optical lens element 321) can be a plastic lens element, and the peripheral surface 3212 of the at least one of the optical lens elements (in detail, according to the 3rd example, which is the first optical lens element 321) and a portion of the light-absorbing portion 330 overlapping the peripheral surface 3212 of the at least one of the optical lens elements (in detail, according to the 3rd example, which is the first optical lens element 321) along the direction perpendicular to the optical axis X are without a gate trace.

Figure 3E:
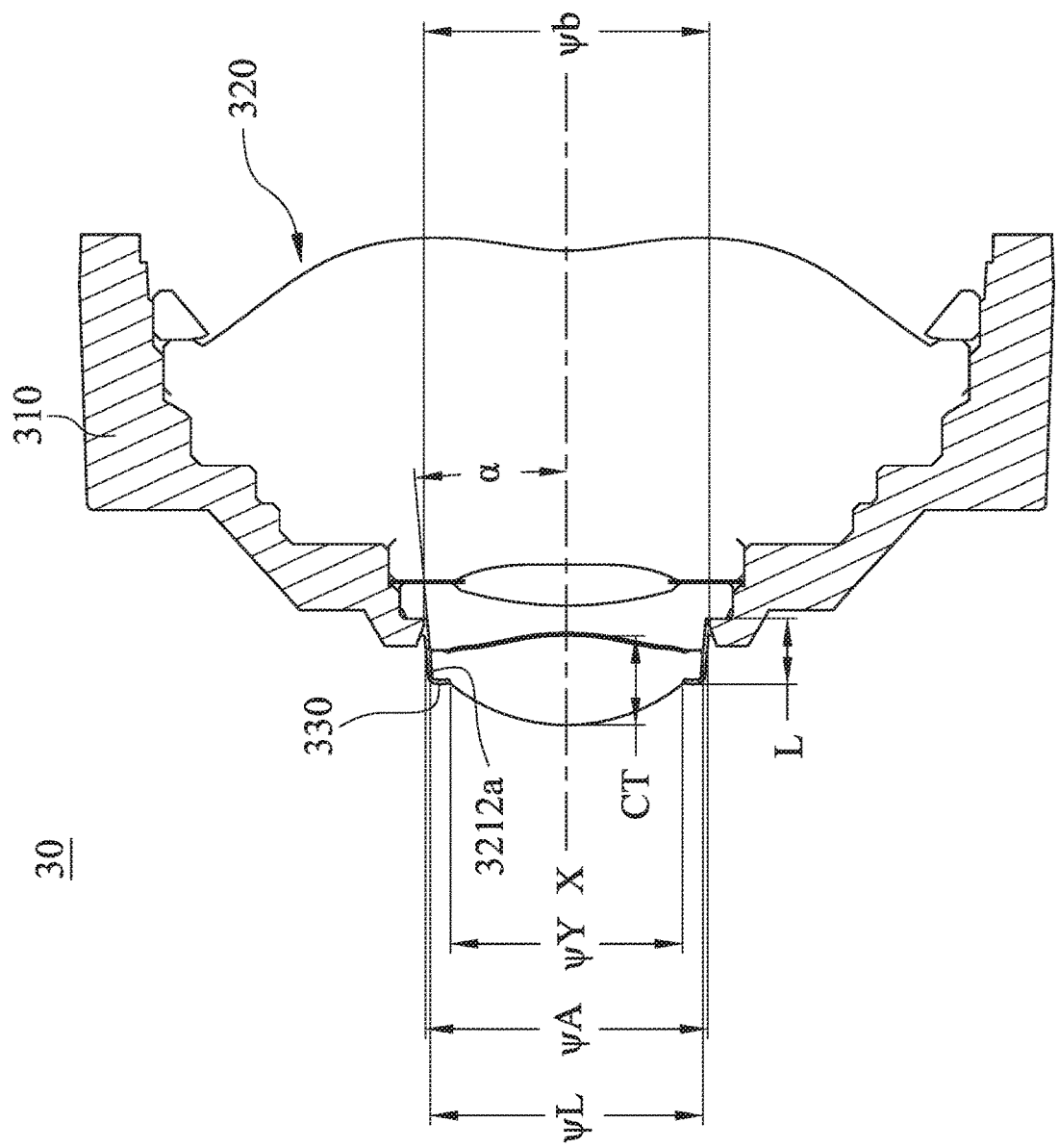
FIG. 3E is a schematic view of parameters according to the 3rd example in FIG. 3A.

FIG. 3E is a schematic view of parameters according to the 3rd example in FIG. 3A. In FIG. 3E, an angle α between the inclined surface 3212a and the optical axis X is 5 degrees.

In FIGS. 3C and 3E, according to the 3rd example, when a diameter of the entrance pupil diameter is EPD, a diameter of the minimum opening of the plastic lens barrel 310 is ψb, a maximum diameter of the at least one portion of the light-absorbing portion 330 not overlapping the plastic lens barrel 310 and close to an image side of the imaging lens assembly 30 is ψA, a total length of the light-absorbing portion 330 along a direction parallel to the optical axis X is L, an outer diameter of the effective optical surface 3211 is ψY, a maximum outer diameter of the at least one of the optical lens elements (in detail, according to the 3rd example, which is the first optical lens element 321) is ψL, a thickness of the at least one of the optical lens elements (in detail, according to the 3rd example, which is the first optical lens element 321) at the optical axis X is CT, the following conditions of the Table 3 are satisfied.

TABLE 3

| 3rd example | | | |
|---|---|---|---|
| EPD (mm) | 1.70 | ψY (mm) | 1.70 |
| ψb (mm) | 2.091 | ψL (mm) | 1.995 |
| EPD/ψb | 0.813 | ψY/ψL | 0.852 |
| ψA (mm) | 2.065 | ψL/ψb | 0.954 |
| EPD/ψA | 0.823 | CT (mm) | 0.653 |
| L (mm) | 0.48 | ψY/CT | 2.603 |

According to the 3rd example, it should be mentioned that ψY=EPD, and ψA=ψb.

4th Example

Figure 4A:
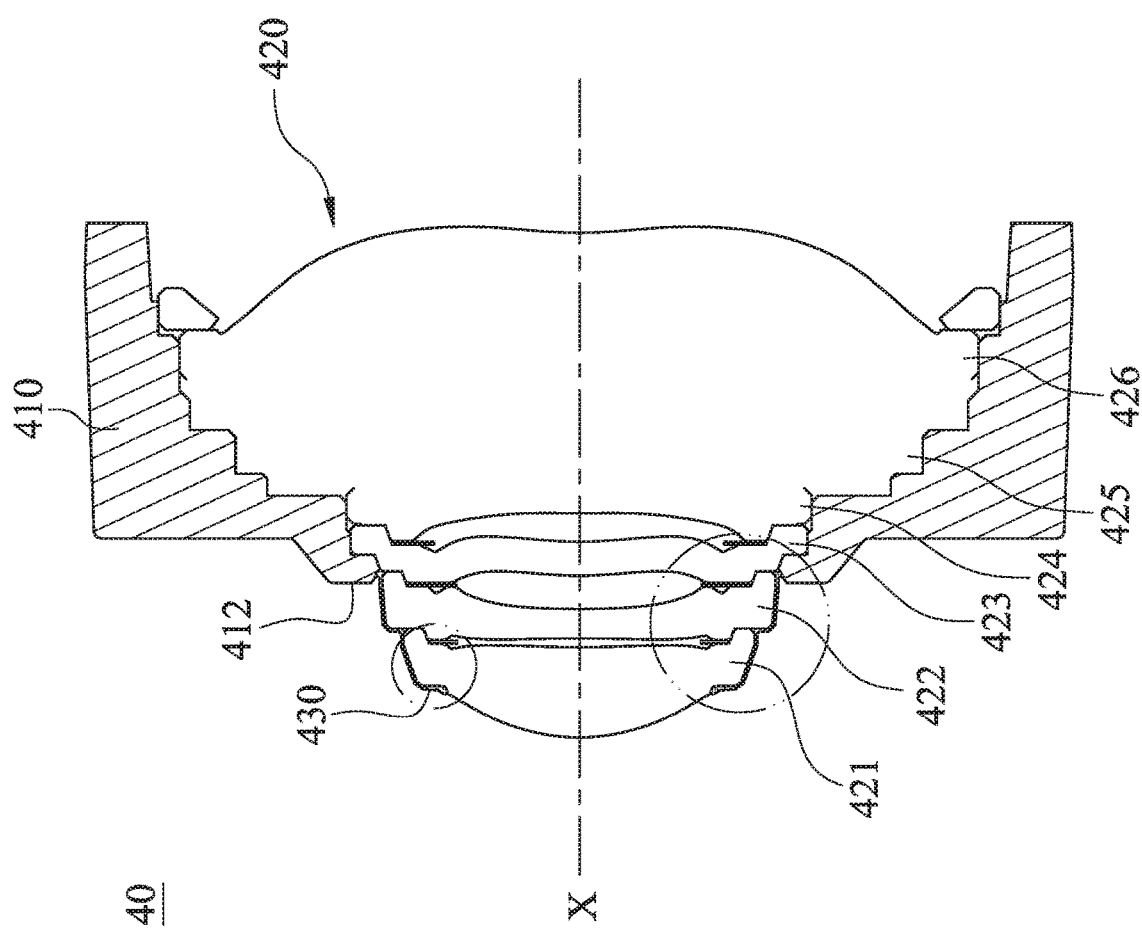
FIG. 4A is a schematic view of an imaging lens assembly according to the 4th example of the present disclosure.

FIG. 4A is a schematic view of an imaging lens assembly 40 according to the 4th example of the present disclosure. In FIG. 4A, the imaging lens assembly 40 has an optical axis X, and includes a plastic lens barrel 410, an optical lens element set 420 and a light-absorbing portion 430. In detail, the light-absorbing portion 430 is a light-absorbing layer, and can also be a blackening plastic surface structure. The light-absorbing portion 430 can be directly observed from an appearance of the imaging lens assembly 40 without extra disassembling the imaging lens assembly 40.

The optical lens element set 420 includes a plurality of optical lens elements. In detail, according to the 4th example, the optical lens element set 420, in order from an object side to an image side, includes a first optical lens element 421, a second optical lens element 422, a third optical lens element 423, a fourth optical lens element 424, a fifth optical lens element 425 and a sixth optical lens element 426, wherein the first optical lens element 421 is closest to the object side of the optical lens element set 420, the second optical lens element 422 is disposed on an image side of the first optical lens element 421, and optical features such as structures, surface shapes and so on of the fourth optical lens element 424, the fifth optical lens element 425 and the sixth optical lens element 426 can be disposed according to different imaging demand, and the optical features are not important to the present disclosure, and will not disclose details thereof herein.

Figure 4C:
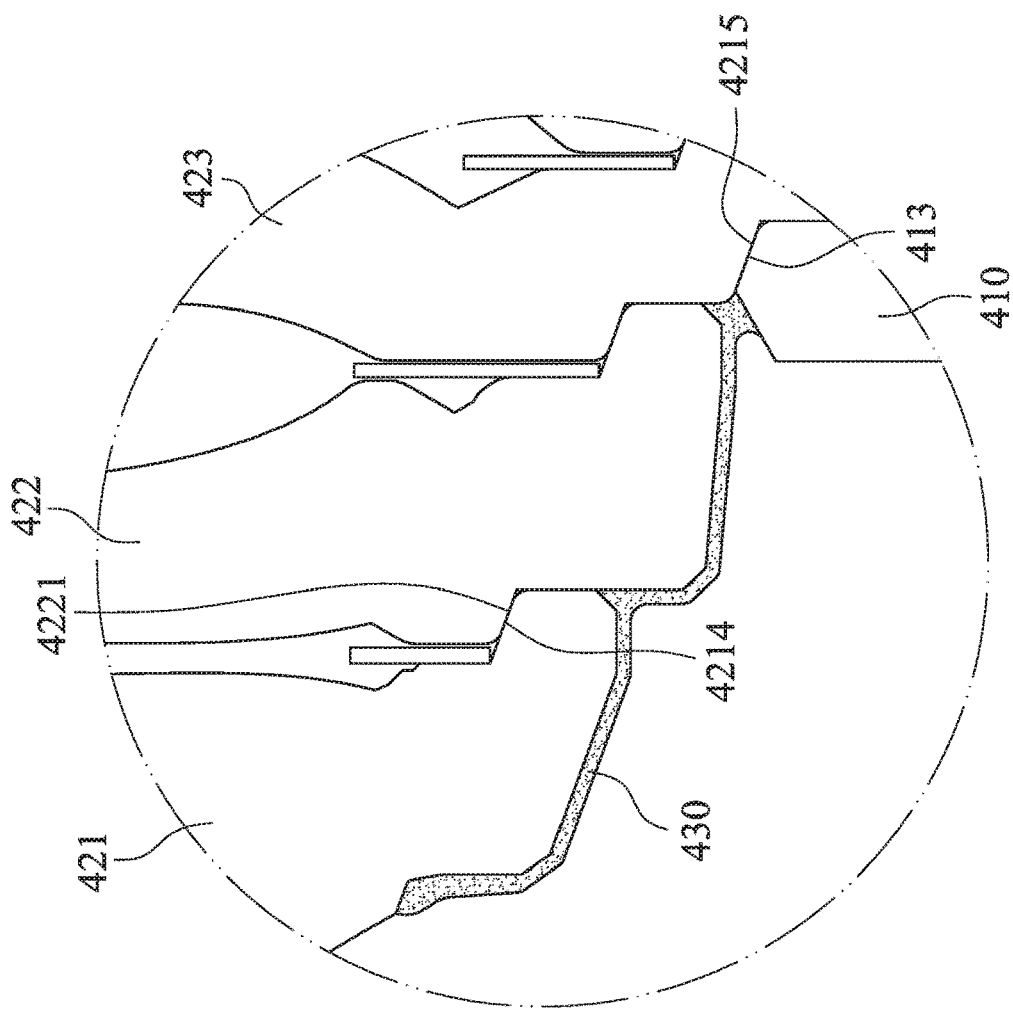
FIG. 4C is another partially enlarged view of the imaging lens assembly according to the 4th example in FIG. 4A.
Figure 4B:
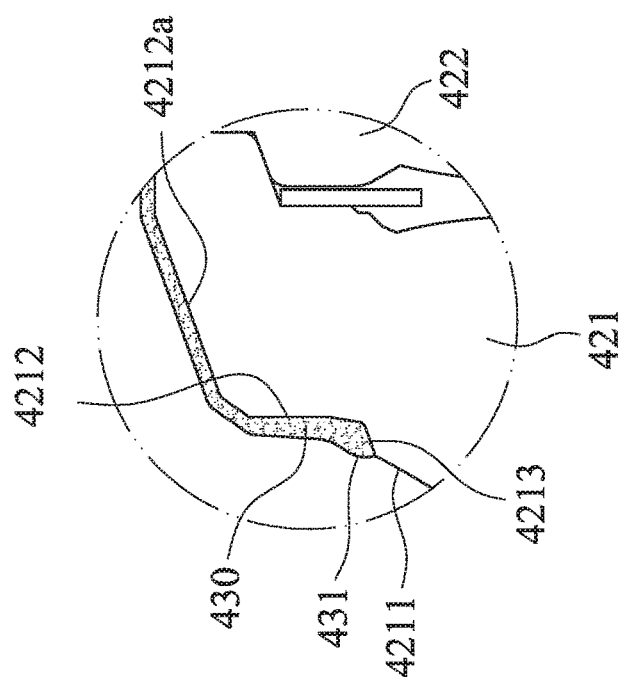
FIG. 4B is a partially enlarged view of the imaging lens assembly according to the 4th example in FIG. 4A.

FIG. 4B is a partially enlarged view of the imaging lens assembly 40 according to the 4th example in FIG. 4A. In FIG. 4B, at least one of the optical lens elements (in detail, according to the 4th example, which is the first optical lens element 421) includes an effective optical surface 4211, a peripheral surface 4212 and an annular step structure 4213, wherein the effective optical surface 4211 faces towards an object side of the imaging lens assembly 40, the peripheral surface 4212 surrounds the effective optical surface 4211, and the annular step structure 4213 is connected to the effective optical surface 4211 and the peripheral surface 4212. There is a height difference between the peripheral surface 4212 and the effective optical surface 4211, and the height difference is connected to the peripheral surface 4212 and the effective optical surface 4211 via the annular step structure 4213.

The peripheral surface 4212 includes at least one inclined surface; in detail, according to the 4th example, the peripheral surface 4212 includes a inclined surface 4212a, and the light-absorbing portion 430 is coated on the inclined surface 4212a. In detail, the peripheral surface 4212 is a surface from the annular step structure 4213 to an outermost surface of the first optical lens element 421, and every surface satisfied a range of oblique angle from the annular step structure 4213 to the outermost periphery of the first optical lens element 421 can be the inclined surface. The inclined surface 4212a faces towards the object side of the imaging lens assembly 40, a mold design of the inclined surface 4212a is favorable for releasing and demolding, and the feasibility of the light-absorbing portion 430 coated on the first optical lens element 421 can be simultaneously provided.

The peripheral surface 4212 has any two areas with different distances from the optical axis X, and the any two areas do not face to each other at a direction perpendicular to the optical axis X. Therefore, the light-absorbing portion 430 can be determined without a groove structure.

The annular step structure 4213 is for defining an entrance pupil diameter of the imaging lens assembly 40. In detail, the effective optical surface 4211 is a smooth surface, and the annular step structure 4213 can have a matte surface. Therefore, the effective optical surface 4211 and the annular step structure 4213 can be for determining an area of the effective optical surface 4211, and for defining the entrance pupil diameter.

Figure 4D:
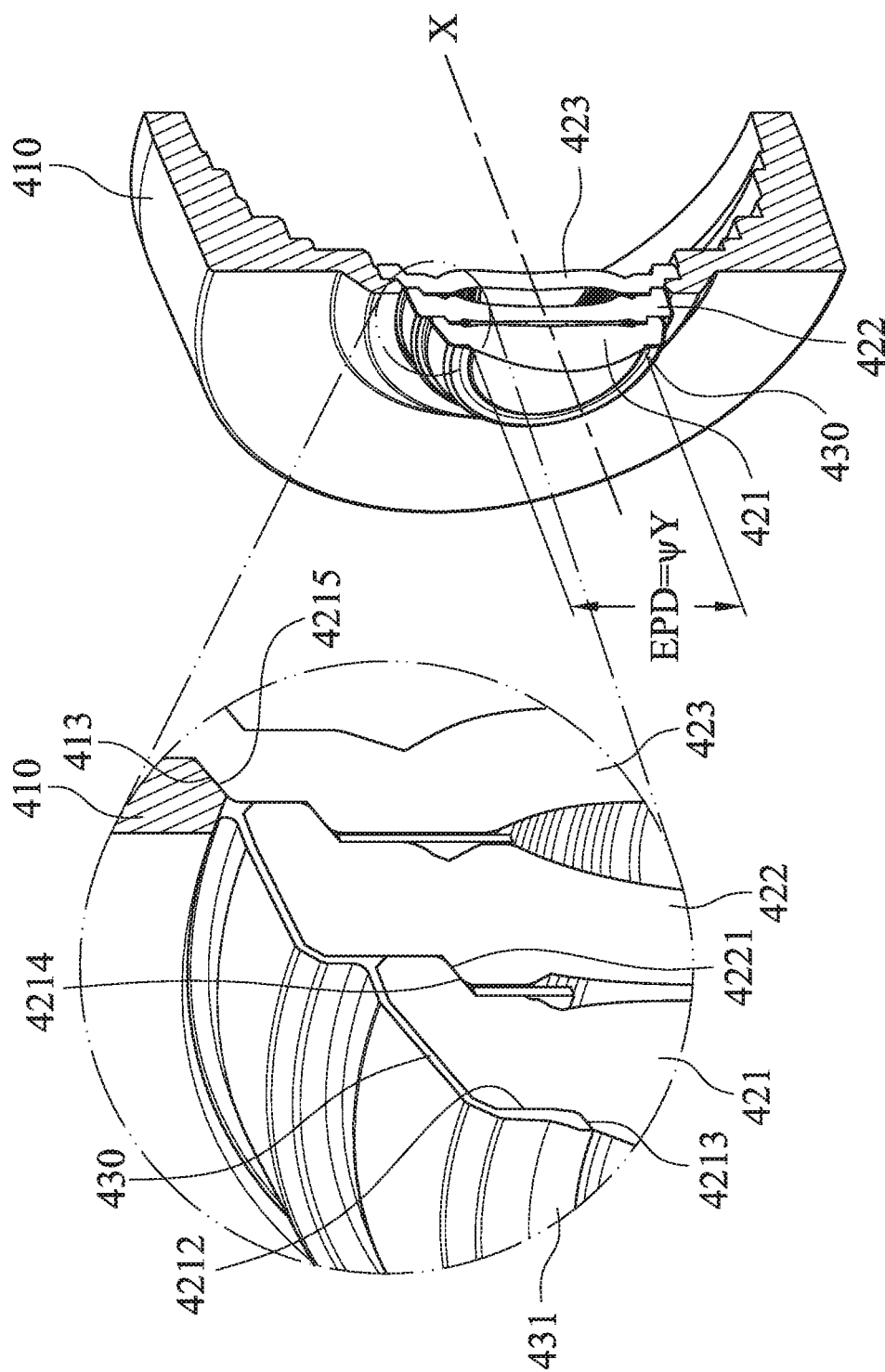
FIG. 4D is a partially enlarged view of the plastic lens barrel, the first optical lens element, the second optical lens element, the third optical lens element and the light-absorbing portion according to the 4th example in FIG. 4A.

FIG. 4C is another partially enlarged view of the imaging lens assembly 40 according to the 4th example in FIG. 4A. FIG. 4D is a partially enlarged view of the plastic lens barrel 410, the first optical lens element 421, the second optical lens element 422, the third optical lens element 423 and the light-absorbing portion 430 according to the 4th example in FIG. 4A. In FIGS. 4B to 4D, the light-absorbing portion 430 has an uneven thickness, and includes at least one annular arc surface; in detail, according to the 4th example, which is an annular arc surface 431. In detail, because a few deviations will be occurred during a coating process, errors in the roundness or the concentricity of the light-absorbing portion 430 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 430 is a little different from the ideal shape of the proper circle.

At least one portion of the light-absorbing portion 430 can be coated on the annular step structure 4213, and at least another one portion of the light-absorbing portion 430 can be connected to a minimum opening of the plastic lens barrel 410, wherein the light-absorbing portion 430 can be accumulated via a structure of the annular step structure 4213 to promote the optical density. Moreover, the light-absorbing portion 430 is disposed on an object side of the object-side outer surface 412 of the plastic lens barrel 410, and is connected to the plastic lens barrel 410. The light-absorbing portion 430 overlaps the peripheral surface of the at least one of the optical lens elements along the direction perpendicular to the optical axis X, and the light-absorbing portion 430 surrounds the effective optical surface. In detail, according to the 4th example, the light-absorbing portion 430 overlaps the effective optical surface 4211 and the peripheral surface 4212 of the first optical lens element 421.

A diaphragm of the imaging lens assembly 40 is defined via the annular step structure 4213, or the light-absorbing portion 430 can be the diaphragm of the imaging lens assembly 40, and the bundle of incident light is determined via the annular step structure 4213 or the light-absorbing portion 430. In detail, according to the 4th example, the diaphragm of the imaging lens assembly 40 is determined via the annular step structure 4213, and the light-absorbing portion 430 is the diaphragm of the imaging lens assembly 40. Therefore, it is favorable for enhancing the imaging quality.

The light-absorbing portion 430 along the direction perpendicular to the optical axis X can include at least one portion not contacted with the plastic lens barrel 410. Via a forward disposition of the first optical lens element 421, the laterally incident non-imaging light can be blocked, and a space of the imaging lens assembly 40 is not limited to a structure of the plastic lens barrel 410.

According to the 4th example, the light-absorbing portion 430 extends to the second optical lens element 422, and the light-absorbing portion 430 is for retaining the first optical lens element 421 to the second optical lens element 422 and the plastic lens barrel 410. Therefore, the complicated blocking structure and the receiving structure of the plastic lens barrel 410 can be replaced.

A surface of the light-absorbing portion 430 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 40 according to the 4th example has the higher efficiency of blocking the stray light.

In detail, the light-absorbing portion 430 is originally liquid, and the curing light-absorbing portion 430 has the adhesion to be a retaining element. Also, an amount of light of the imaging lens assembly 40 can be controlled via the light-absorbing portion 430. Therefore, a design of the light-absorbing portion 430 as a through aperture is favorable for the compact size of the imaging lens assembly 40. Furthermore, a light blocking element can be conserved, a manufacturing process of the plastic lens barrel 410 can be simplified, and it is simultaneously favorable for blocking the non-imaging light from a periphery of the first optical lens element 421.

In FIG. 4C, the first optical lens element 421 can include a first axial assembling structure 4214, and the second optical lens element 422 can include a second axial assembling structure 4221 corresponding to the first axial assembling structure 4214, wherein the first axial assembling structure 4214 and the second axial assembling structure 4221 are connected to each other. Furthermore, the first axial assembling structure 4214 and the second axial assembling structure 4221 are for supporting two adjacent optical lens elements to promote the concentricity between the optical lens elements. In detail, according to the 4th example, the two adjacent optical lens elements are the first optical lens element 421 and the second optical lens element 422. Therefore, it is favorable for enhancing the resolution and the assembling yield.

At least one of the optical lens elements of the optical lens element set 420 can include a third axial assembling structure 4215. In detail, according to the 4th example, the third optical lens element 423 includes the third axial assembling structure 4215, and the plastic lens barrel 410 can include a fourth axial assembling structure 413 corresponding to the third axial assembling structure 4215, wherein the third axial assembling structure 4215 and the fourth axial assembling structure 413 are connected to each other. Therefore, it is favorable for promoting the coaxiality of the optical lens element and the plastic lens barrel 410, and increasing the structural stability.

Figure 4E:
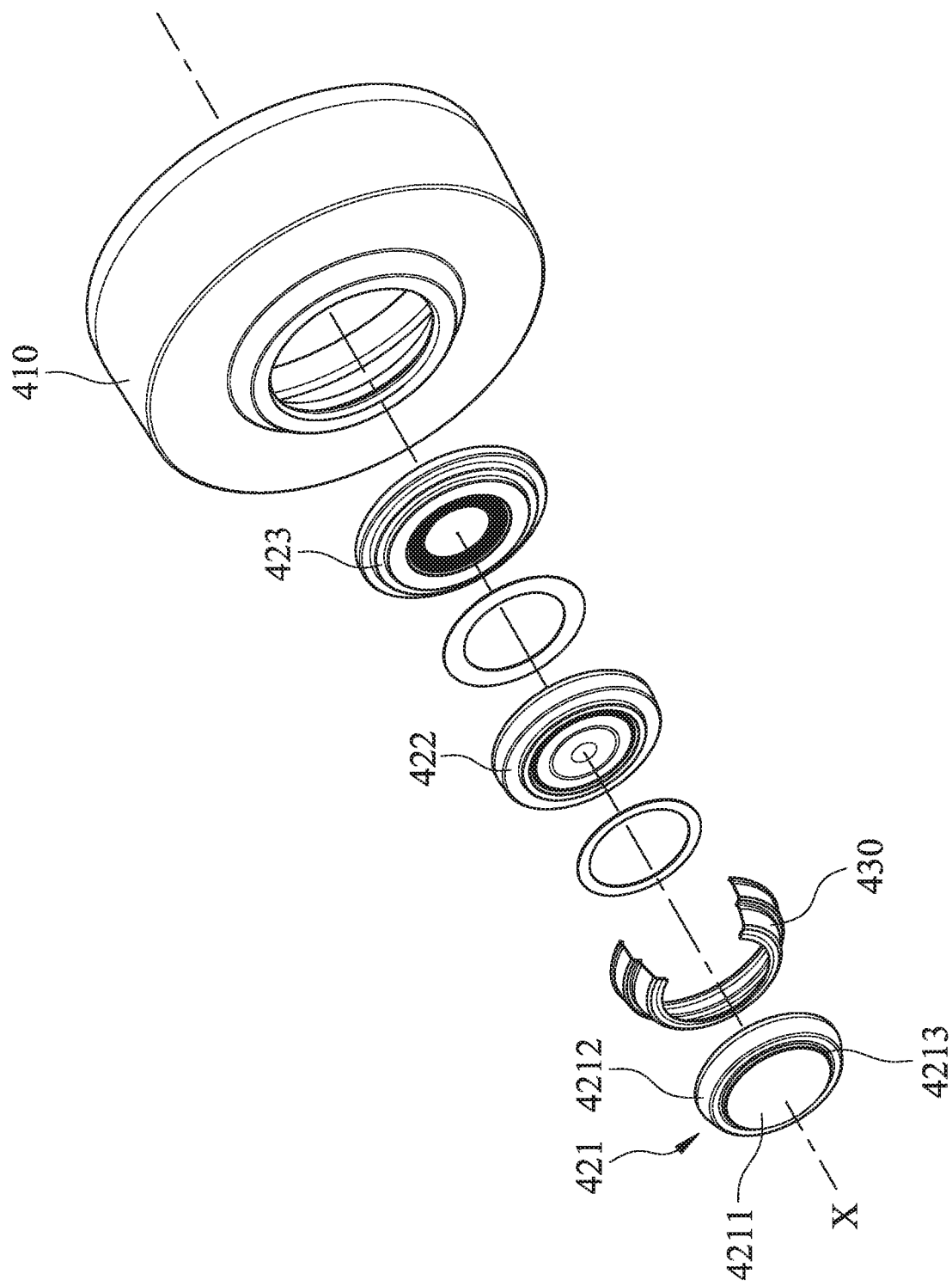
FIG. 4E is a partially exploded view of the imaging lens assembly according to the 4th example in FIG. 4A.

FIG. 4E is a partially exploded view of the imaging lens assembly 40 according to the 4th example in FIG. 4A. In FIG. 4E, the at least one of the optical lens elements (in detail, according to the 4th example, which is the first optical lens element 421) can be a plastic lens element, and the peripheral surface 4212 of the at least one of the optical lens elements (in detail, according to the 4th example, which is the first optical lens element 421) and a portion of the light-absorbing portion 430 overlapping the peripheral surface 4212 of the at least one of the optical lens elements (in detail, according to the 4th example, which is the first optical lens element 421) along the direction perpendicular to the optical axis X are without a gate trace.

Figure 4F:
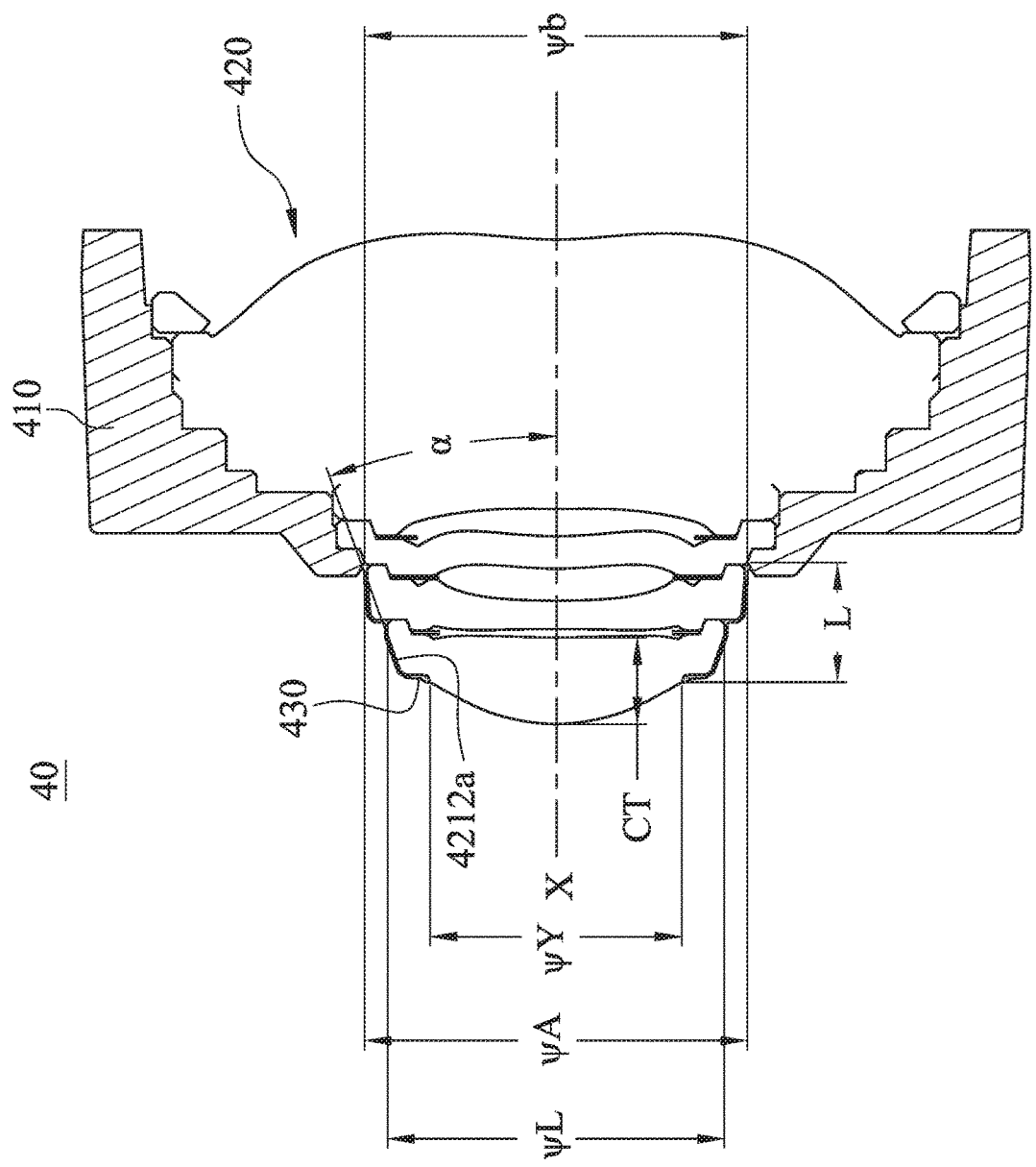
FIG. 4F is a schematic view of parameters according to the 4th example in FIG. 4A.

FIG. 4F is a schematic view of parameters according to the 4th example in FIG. 4A. In FIG. 4F, an angle α between the inclined surface 4212a and the optical axis X is 20 degrees.

In FIGS. 4D and 4F, according to the 4th example, when a diameter of the entrance pupil diameter is EPD, a diameter of the minimum opening of the plastic lens barrel 410 is $\psi b$, a maximum diameter of the at least one portion of the light-absorbing portion 430 not overlapping the plastic lens barrel 410 and close to an image side of the imaging lens assembly 40 is $\psi A$, a total length of the light-absorbing portion 430 along a direction parallel to the optical axis X is L, an outer diameter of the effective optical surface 4211 is $\psi Y$, a maximum outer diameter of the at least one of the optical lens elements (in detail, according to the 4th example, which is the first optical lens element 421) is $\psi L$, a thickness of the at least one of the optical lens elements (in detail, according to the 4th example, which is the first optical lens element 421) at the optical axis X is CT, the following conditions of the Table 4 are satisfied.

TABLE 4

| 4th example | | | |
|---|---|---|---|
| EPD (mm) | 1.87 | $\psi Y$ (mm) | 1.87 |
| $\psi b$ (mm) | 2.84 | $\psi L$ (mm) | 2.5 |
| EPD/$\psi b$ | 0.658 | $\psi Y/\psi L$ | 0.748 |
| $\psi A$ (mm) | 2.84 | $\psi L/\psi b$ | 0.880 |
| EPD/$\psi A$ | 0.658 | CT (mm) | 0.646 |
| L (mm) | 0.889 | $\psi Y$/CT | 2.895 |

According to the 4th example, it should be mentioned that $\psi Y$=EPD, and $\psi A$=$\psi b$.

5th Example

Figure 5A:
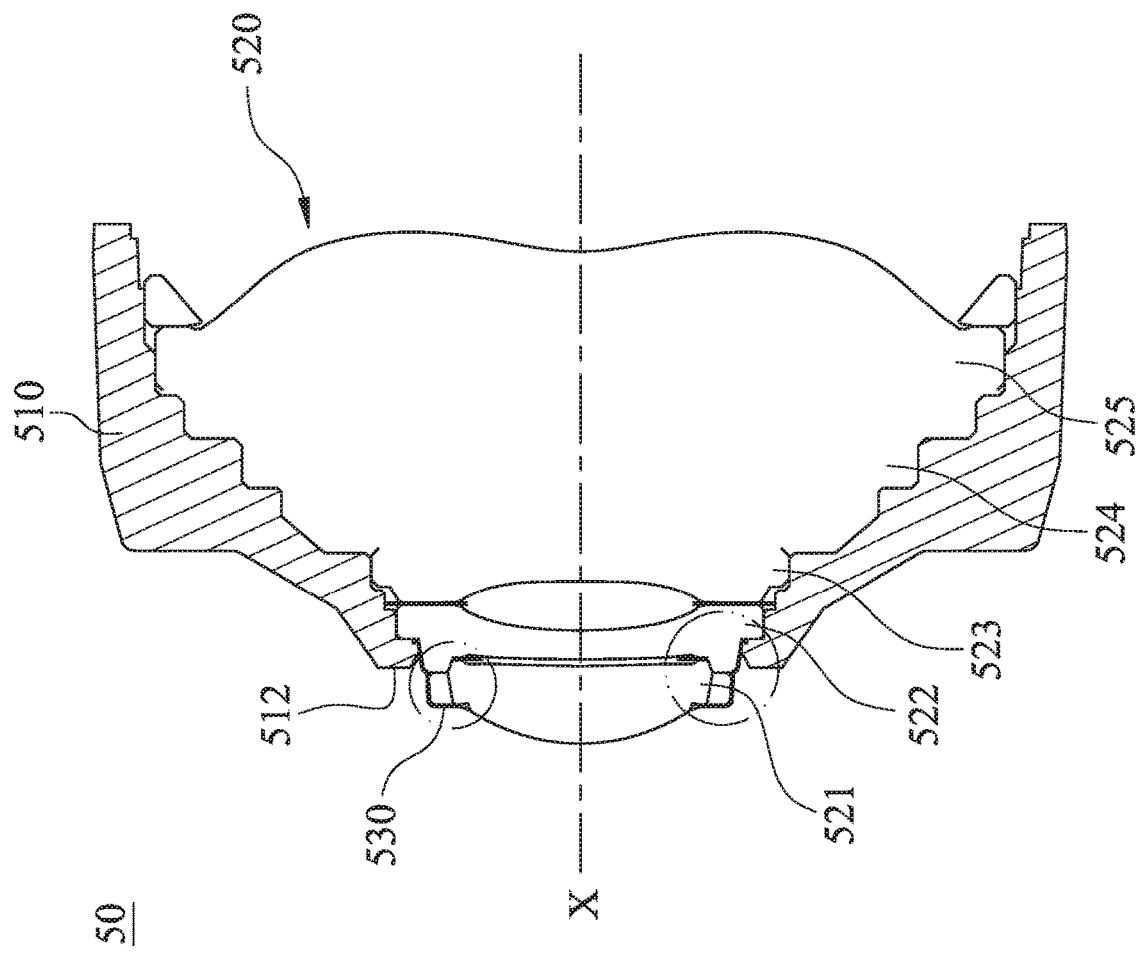
FIG. 5A is a schematic view of an imaging lens assembly according to the 5th example of the present disclosure.

FIG. 5A is a schematic view of an imaging lens assembly 50 according to the 5th example of the present disclosure. In FIG. 5A, the imaging lens assembly 50 has an optical axis X, and includes a plastic lens barrel 510, an optical lens element set 520 and a light-absorbing portion 530. In detail, the light-absorbing portion 530 is a light-absorbing layer, and can also be a blackening plastic surface structure. The light-absorbing portion 530 can be directly observed from an appearance of the imaging lens assembly 50 without extra disassembling the imaging lens assembly 50.

The optical lens element set 520 includes a plurality of optical lens elements. In detail, according to the 5th example, the optical lens element set 520, in order from an object side to an image side, includes a first optical lens element 521, a second optical lens element 522, a third optical lens element 523, a fourth optical lens element 524 and a fifth optical lens element 525, wherein the first optical lens element 521 is closest to the object side of the optical lens element set 520, the second optical lens element 522 is disposed on an image side of the first optical lens element 521, and optical features such as structures, surface shapes and so on of the third optical lens element 523, the fourth optical lens element 524 and the fifth optical lens element 525 can be disposed according to different imaging demand, and the optical features are not important to the present disclosure, and will not disclose details thereof herein.

Figure 5C:
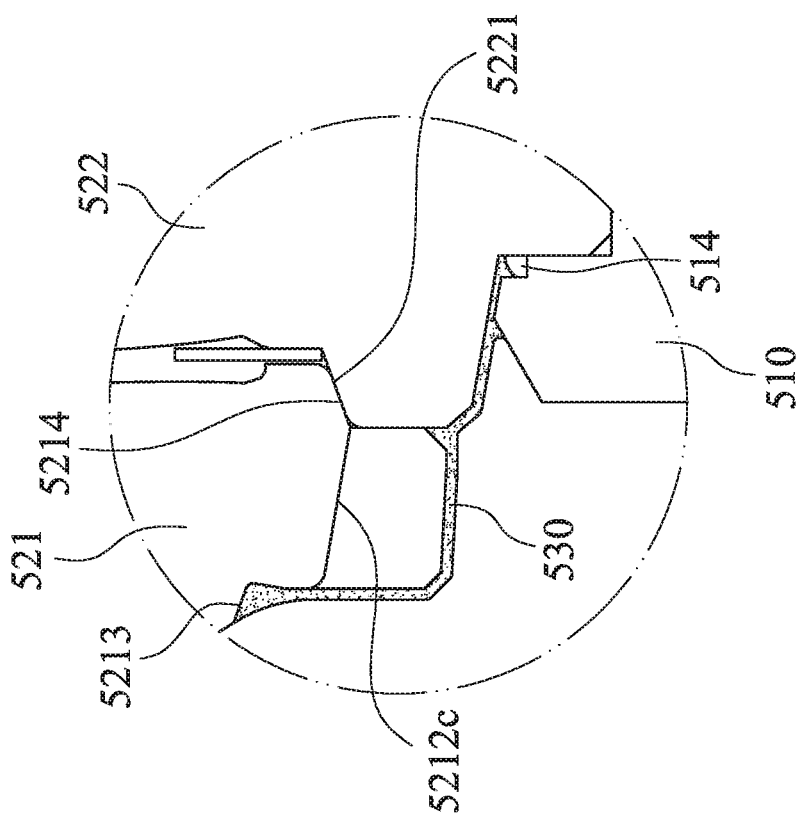
FIG. 5C is another partially enlarged view of the imaging lens assembly according to the 5th example in FIG. 5A.
Figure 5B:
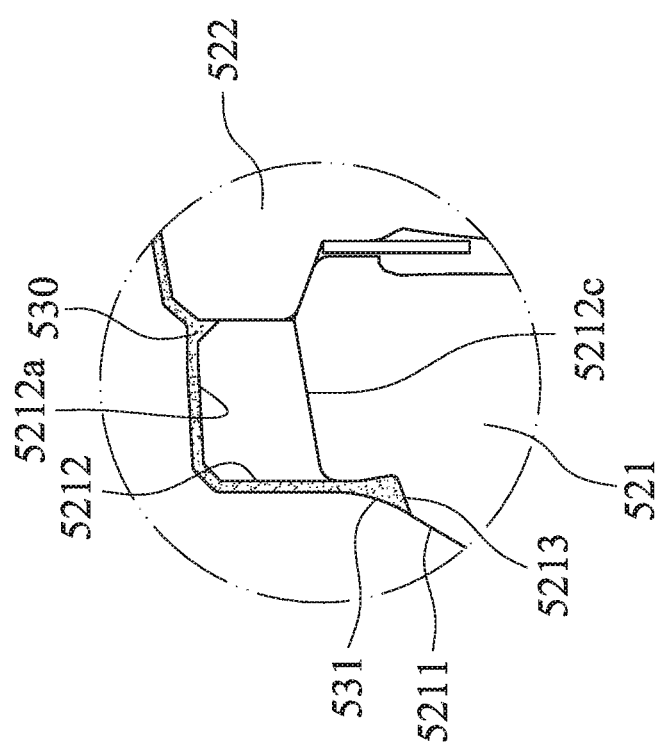
FIG. 5B is a partially enlarged view of the imaging lens assembly according to the 5th example in FIG. 5A.

FIG. 5B is a partially enlarged view of the imaging lens assembly 50 according to the 5th example in FIG. 5A. In FIG. 5B, at least one of the optical lens elements (in detail, according to the 5th example, which is the first optical lens element 521) includes an effective optical surface 5211, a peripheral surface 5212 and an annular step structure 5213, wherein the effective optical surface 5211 faces towards an object side of the imaging lens assembly 50, the peripheral surface 5212 surrounds the effective optical surface 5211, and the annular step structure 5213 is connected to the effective optical surface 5211 and the peripheral surface 5212.

The peripheral surface 5212 includes at least one inclined surface; in detail, according to the 5th example, the peripheral surface 5212 includes a inclined surface 5212a, and the light-absorbing portion 530 is coated on the inclined surface 5212a. In detail, the peripheral surface 5212 is a surface from the annular step structure 5213 to an outermost surface of the first optical lens element 521, and every surface satisfied a range of oblique angle from the annular step structure 5213 to the outermost periphery of the first optical lens element 521 can be the inclined surface. The inclined surface 5212a faces towards the object side of the imaging lens assembly 50, a mold design of the inclined surface 5212a is favorable for releasing and demolding, and the feasibility of the light-absorbing portion 530 coated on the first optical lens element 521 can be simultaneously provided.

The peripheral surface 5212 of the first optical lens element 521 can include at least one reduction structure reduced from an outermost periphery of the first optical lens element 521 to the effective optical surface 5211. In detail, according to the 5th example, a number of the reduction structures 5212c is two. The first optical lens element 521 with the reduction structures 5212c is an I-cut lens element structure, and the outermost periphery of the first optical lens element 521 is composed of two corresponding surfaces and two corresponding arc surfaces. Therefore, it is favorable for reducing a volume of the imaging lens assembly 50.

The peripheral surface 5212 has any two areas with different distances from the optical axis X, and the any two areas do not face to each other at a direction perpendicular to the optical axis X. Therefore, the light-absorbing portion 530 can be determined without a groove structure.

The annular step structure 5213 is for defining an entrance pupil diameter of the imaging lens assembly 50. In detail, the effective optical surface 5211 is a smooth surface, and the annular step structure 5213 can have a matte surface. Therefore, the effective optical surface 5211 and the annular step structure 5213 can be for determining an area of the effective optical surface 5211, and for defining the entrance pupil diameter.

Figure 5D:
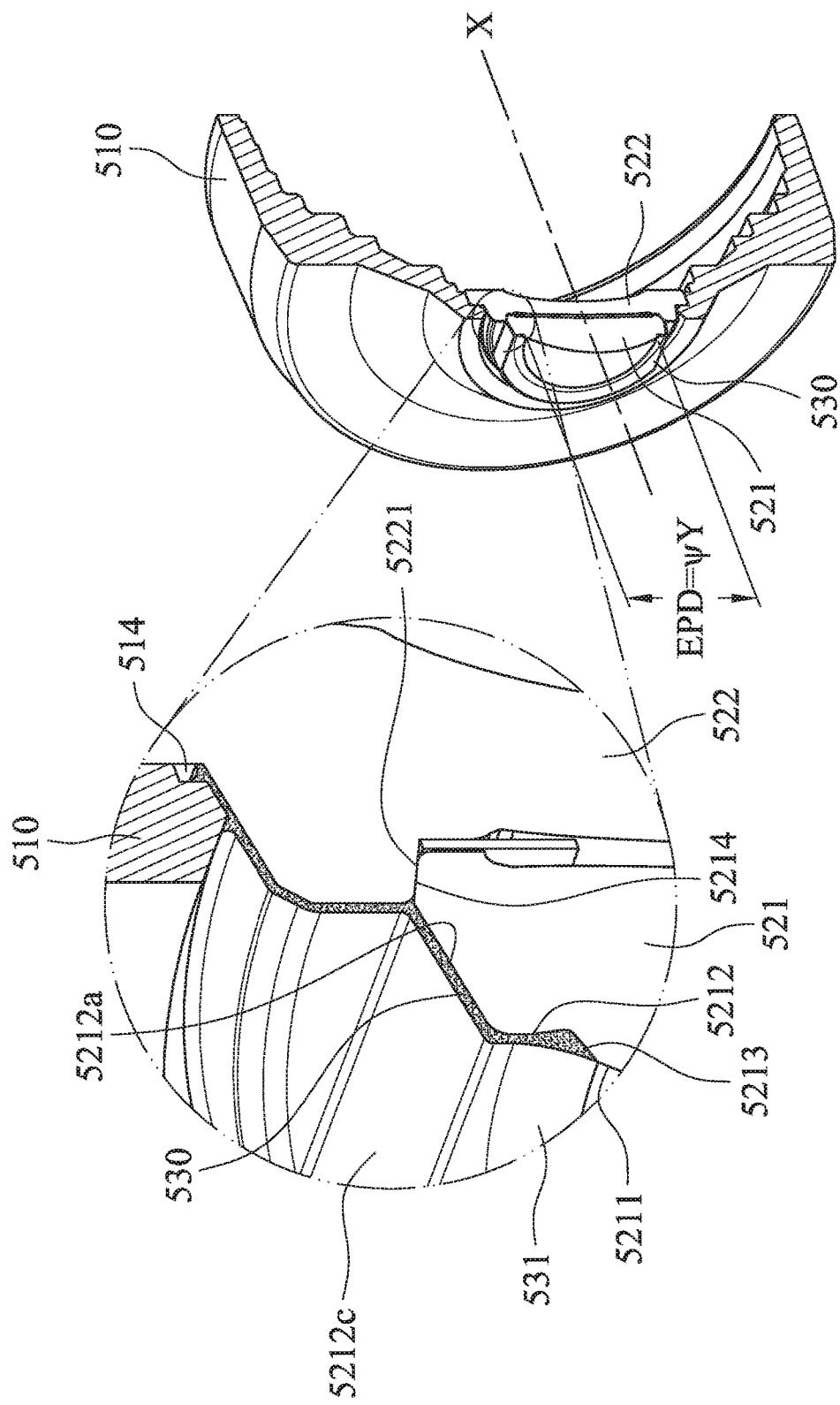
FIG. 5D is a partially enlarged view of the plastic lens barrel, the first optical lens element, the second optical lens element and the light-absorbing portion according to the 5th example in FIG. 5A.

FIG. 5C is another partially enlarged view of the imaging lens assembly 50 according to the 5th example in FIG. 5A. FIG. 5D is a partially enlarged view of the plastic lens barrel 510, the first optical lens element 521, the second optical lens element 522 and the light-absorbing portion 530 according to the 5th example in FIG. 5A. In FIGS. 5B to 5D, the light-absorbing portion 530 has an uneven thickness, and includes at least one annular arc surface; in detail, according to the 5th example, which is an annular arc surface 531. In detail, because a few deviations will be occurred during a coating process, errors in the roundness or the concentricity of the light-absorbing layer 530 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 530 is a little different from the ideal shape of the proper circle.

At least one portion of the light-absorbing portion 530 can be coated on the annular step structure 5213, and at least another one portion of the light-absorbing portion 530 can be connected to a minimum opening of the plastic lens barrel 510, wherein the light-absorbing portion 530 can be accumulated via a structure of the annular step structure 5213 to promote the optical density. Moreover, the light-absorbing portion 530 is disposed on an object side of the object-side outer surface 512 of the plastic lens barrel 510, and is connected to the plastic lens barrel 510. The light-absorbing portion 530 overlaps the peripheral surface of the at least one of the optical lens elements along the direction perpendicular to the optical axis X, and the light-absorbing portion 530 surrounds the effective optical surface. In detail, according to the 5th example, the light-absorbing portion 530 overlaps the effective optical surface 5211 and the peripheral surface 5212 of the first optical lens element 521.

A diaphragm of the imaging lens assembly 50 is defined via the annular step structure 5213, or the light-absorbing portion 530 can be the diaphragm of the imaging lens assembly 50, and the bundle of incident light is determined via the annular step structure 5213 or the light-absorbing portion 530. In detail, according to the 5th example, the diaphragm of the imaging lens assembly 50 is determined via the annular step structure 5213, and the light-absorbing portion 530 is the diaphragm of the imaging lens assembly 50. Therefore, it is favorable for enhancing the imaging quality.

The light-absorbing portion 530 along the direction perpendicular to the optical axis X can include at least one portion not contacted with the plastic lens barrel 510. Via a forward disposition of the first optical lens element 521, the laterally incident non-imaging light can be blocked, and a space of the imaging lens assembly 50 is not limited to a structure of the plastic lens barrel 510.

According to the 5th example, the light-absorbing portion 530 extends to the second optical lens element 522, and the light-absorbing portion 530 is for retaining the first optical lens element 521 to the second optical lens element 522 and the plastic lens barrel 510. Therefore, the complicated blocking structure and the receiving structure of the plastic lens barrel 510 can be replaced.

A surface of the light-absorbing portion 530 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 50 according to the 5th example has the higher efficiency of blocking the stray light.

In detail, the light-absorbing portion 530 is originally liquid, and the curing light-absorbing portion 530 has the adhesion to be a retaining element. Also, an amount of light of the imaging lens assembly 50 can be controlled via the light-absorbing portion 530. Therefore, a design of the light-absorbing portion 530 as a through aperture is favorable for the compact size of the imaging lens assembly 50. Furthermore, a light blocking element can be conserved, a manufacturing process of the plastic lens barrel 510 can be simplified, and it is simultaneously favorable for blocking the non-imaging light from a periphery of the first optical lens element 521.

In FIG. 5C, the first optical lens element 521 can include a first axial assembling structure 5214, and the second optical lens element 522 can include a second axial assembling structure 5221 corresponding to the first axial assembling structure 5214, wherein the first axial assembling structure 5214 and the second axial assembling structure 5221 are connected to each other. Furthermore, the first axial assembling structure 5214 and the second axial assembling structure 5221 are for supporting two adjacent optical lens elements to promote the concentricity between the optical lens elements. In detail, according to the 5th example, the two adjacent optical lens elements are the first optical lens element 521 and the second optical lens element 522. Therefore, it is favorable for enhancing the resolution and the assembling yield.

In detail, a glue-accommodating space 514 is included between the plastic lens barrel 510 and the second optical lens element 522. Therefore, an overflowing condition can be prevented.

Figure 5E:
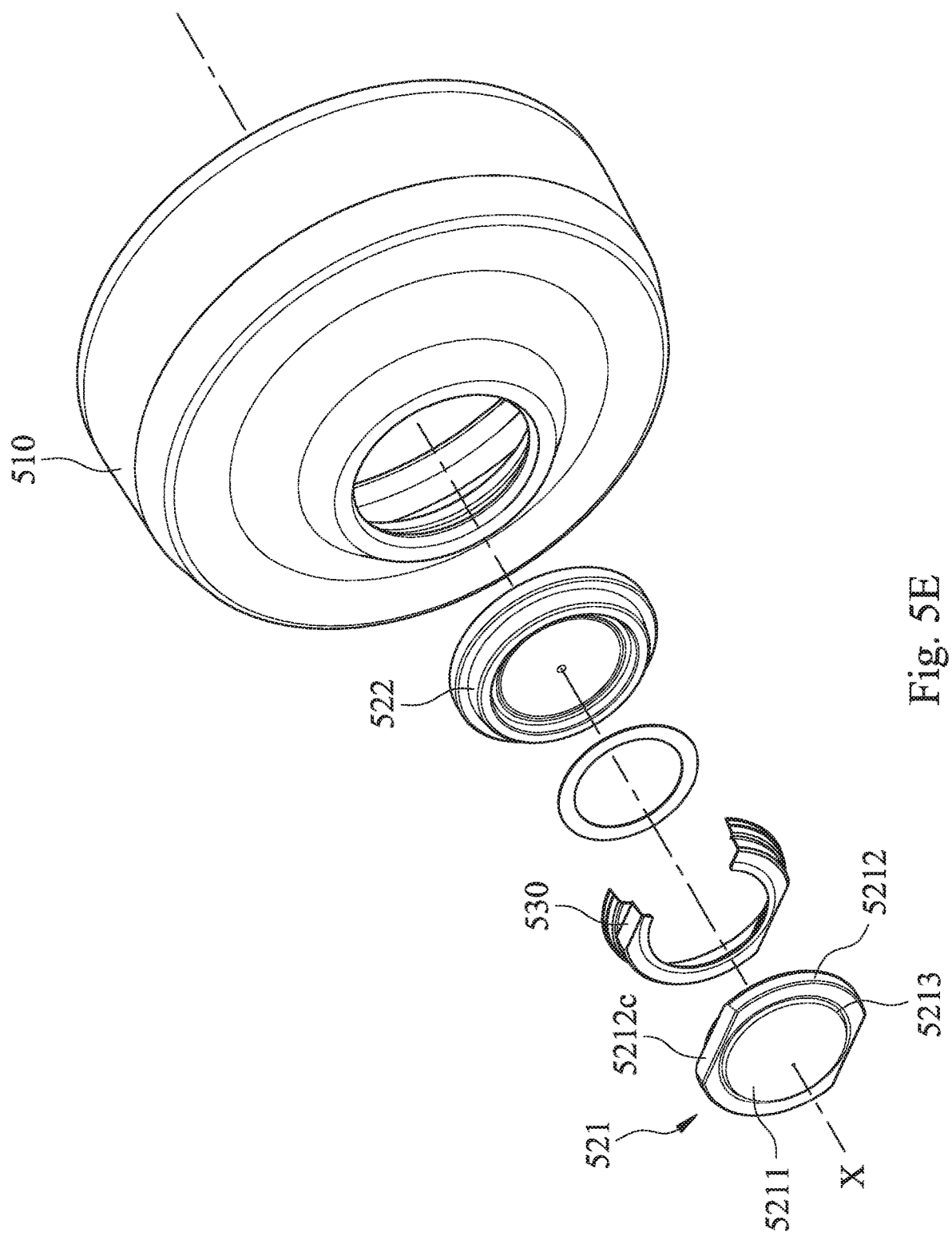
FIG. 5E is a partially exploded view of the imaging lens assembly according to the 5th example in FIG. 5A.

FIG. 5E is a partially exploded view of the imaging lens assembly 50 according to the 5th example in FIG. 5A. In FIG. 5E, the at least one of the optical lens elements (in detail, according to the 5th example, which is the first optical lens element 521) can be a plastic lens element, and the peripheral surface 5212 of the at least one of the optical lens elements (in detail, according to the 5th example, which is the first optical lens element 521) and a portion of the light-absorbing portion 530 overlapping the peripheral surface 5212 of the at least one of the optical lens elements (in detail, according to the 5th example, which is the first optical lens element 521) along the direction perpendicular to the optical axis X are without a gate trace.

Figure 5F:
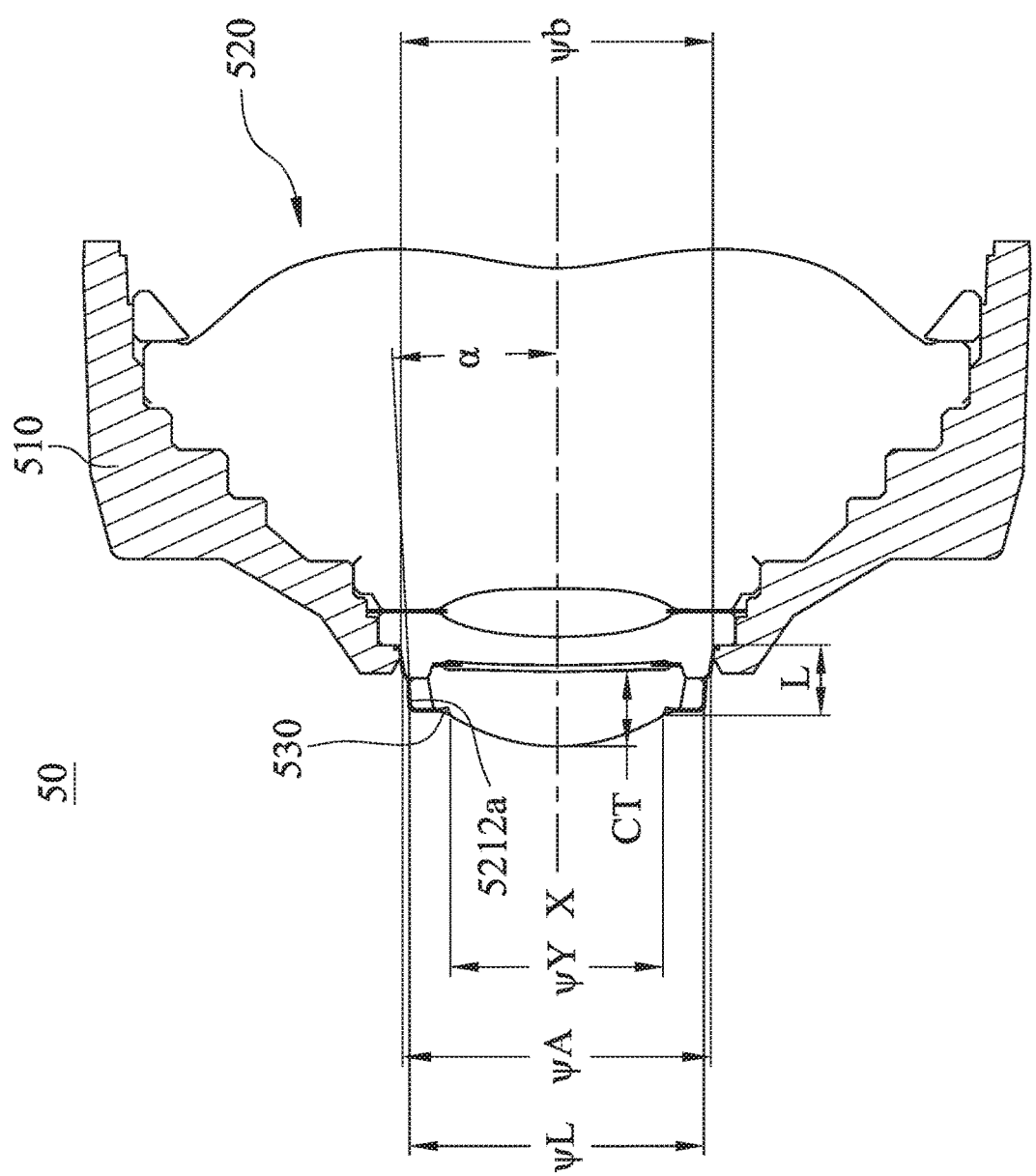
FIG. 5F is a schematic view of parameters according to the 5th example in FIG. 5A.

FIG. 5F is a schematic view of parameters according to the 5th example in FIG. 5A. In FIG. 5F, an angle α between the inclined surface 5212a and the optical axis X is 3 degrees.

In FIGS. 5D and 5F, according to the 5th example, when a diameter of the entrance pupil diameter is EPD, a diameter of the minimum opening of the plastic lens barrel 510 is ψb, a maximum diameter of the at least one portion of the light-absorbing portion 530 not overlapping the plastic lens barrel 510 and close to an image side of the imaging lens assembly 50 is ψA, a total length of the light-absorbing portion 530 along a direction parallel to the optical axis X is L, an outer diameter of the effective optical surface 5211 is ψY, a maximum outer diameter of the at least one of the optical lens elements (in detail, according to the 5th example, which is the first optical lens element 521) is ψL, a thickness of the at least one of the optical lens elements (in detail, according to the 5th example, which is the first optical lens element 521) at the optical axis X is CT, the following conditions of the Table 5 are satisfied.

TABLE 5

| 5th example | | | |
|---|---|---|---|
| EPD (mm) | 1.52 | ψY (mm) | 1.52 |
| ψb (mm) | 2.23 | ψL (mm) | 2.1 |
| EPD/ψb | 0.682 | ψY/ψL | 0.724 |
| ψA (mm) | 2.2 | ψL/ψb | 0.942 |
| EPD/ψA | 0.691 | CT (mm) | 0.538 |
| L (mm) | 0.501 | ψY/CT | 2.825 |

According to the 5th example, it should be mentioned that ψY=EPD.

6th Example

Figure 6A:
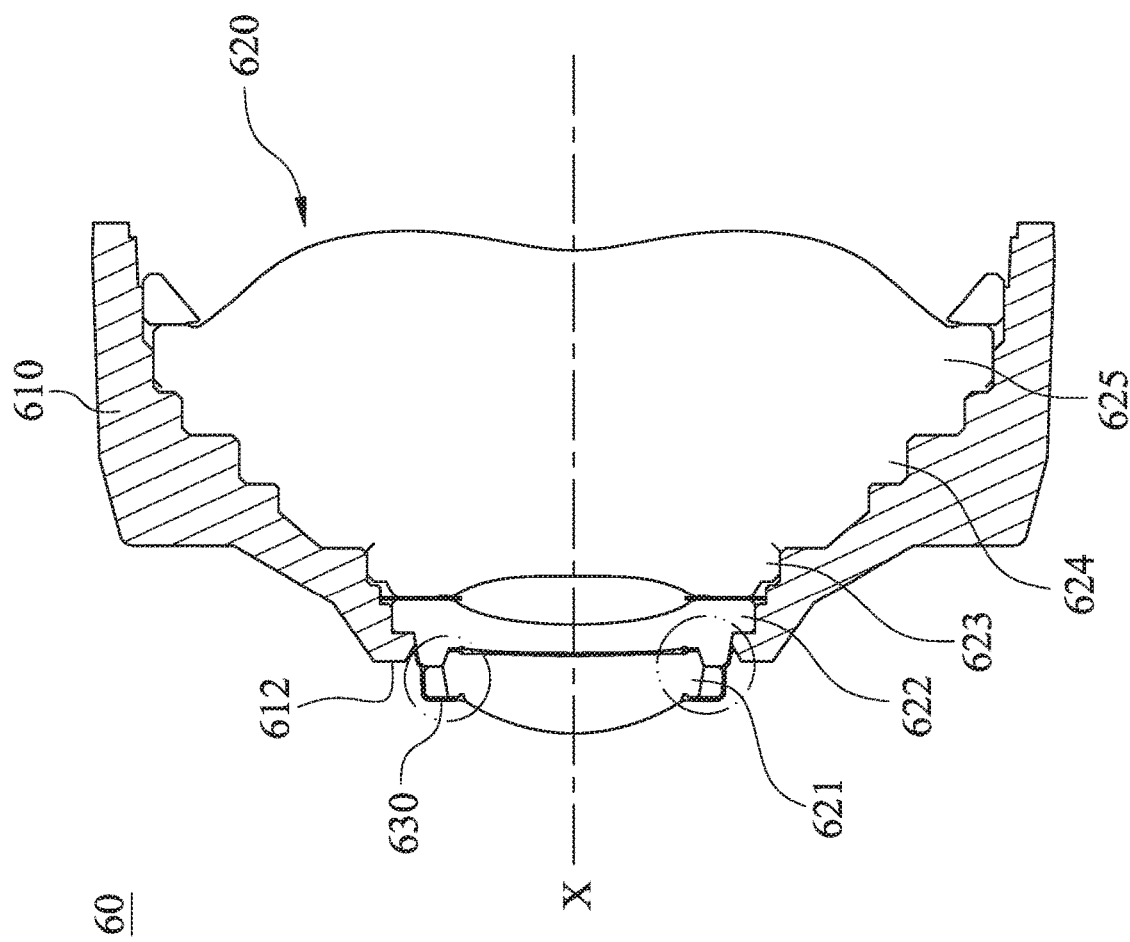
FIG. 6A is a schematic view of an imaging lens assembly according to the 6th example of the present disclosure.

FIG. 6A is a schematic view of an imaging lens assembly 60 according to the 6th example of the present disclosure. In FIG. 6A, the imaging lens assembly 60 has an optical axis X, and includes a plastic lens barrel 610, an optical lens element set 620 and a light-absorbing portion 630. In detail, the light-absorbing portion 630 is a light-absorbing layer, and can also be a blackening plastic surface structure. The light-absorbing portion 630 can be directly observed from an appearance of the imaging lens assembly 60 without extra disassembling the imaging lens assembly 60.

The optical lens element set 620 includes a plurality of optical lens elements. In detail, according to the 6th example, the optical lens element set 620, in order from an object side to an image side, includes a first optical lens element 621, a second optical lens element 622, a third optical lens element 623, a fourth optical lens element 624 and a fifth optical lens element 625, wherein the first optical lens element 621 is closest to the object side of the optical lens element set 620, the second optical lens element 622 is disposed on an image side of the first optical lens element 621, and optical features such as structures, surface shapes and so on of the third optical lens element 623, the fourth optical lens element 624 and the fifth optical lens element 625 can be disposed according to different imaging demand, and the optical features are not important to the present disclosure, and will not disclose details thereof herein.

Figure 6C:
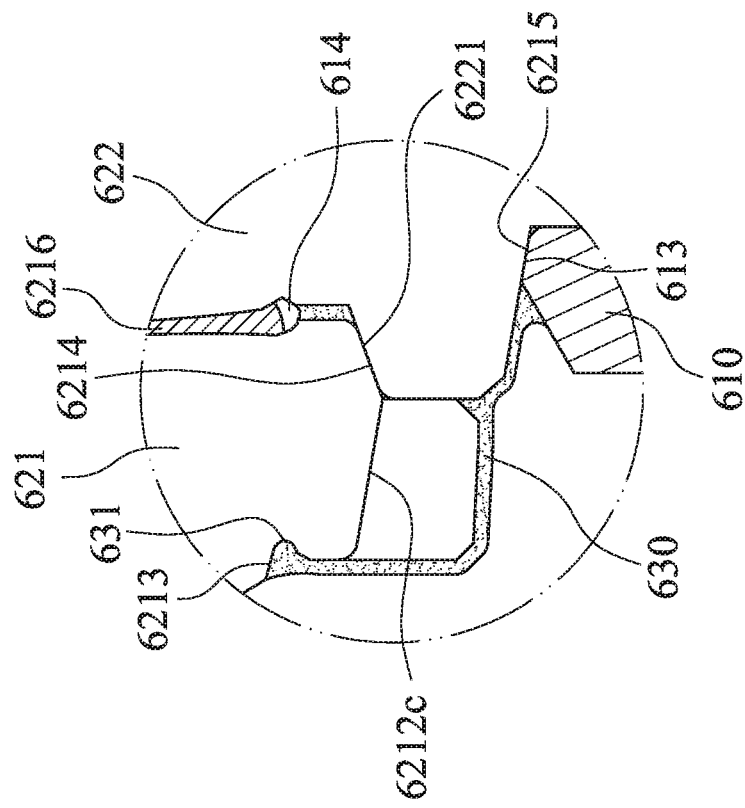
FIG. 6C is another partially enlarged view of the imaging lens assembly according to the 6th example in FIG. 6A.
Figure 6B:
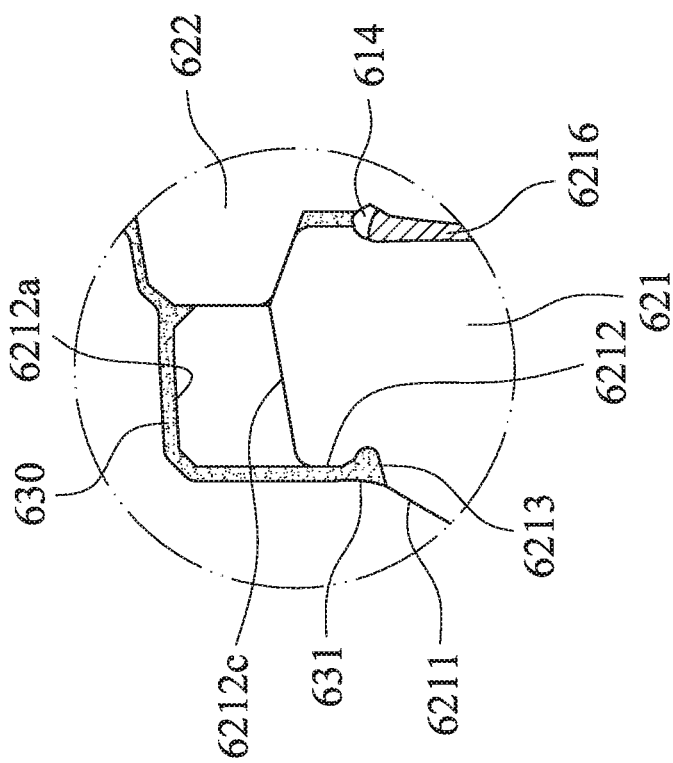
FIG. 6B is a partially enlarged view of the imaging lens assembly according to the 6th example in FIG. 6A.

FIG. 6B is a partially enlarged view of the imaging lens assembly 60 according to the 6th example in FIG. 6A. In FIG. 6B, at least one of the optical lens elements (in detail, according to the 6th example, which is the first optical lens element 621) includes an effective optical surface 6211, a peripheral surface 6212 and an annular step structure 6213, wherein the effective optical surface 6211 faces towards an object side of the imaging lens assembly 60, the peripheral surface 6212 surrounds the effective optical surface 6211, and the annular step structure 6213 is connected to the effective optical surface 6211 and the peripheral surface 6212.

Figure 6D:
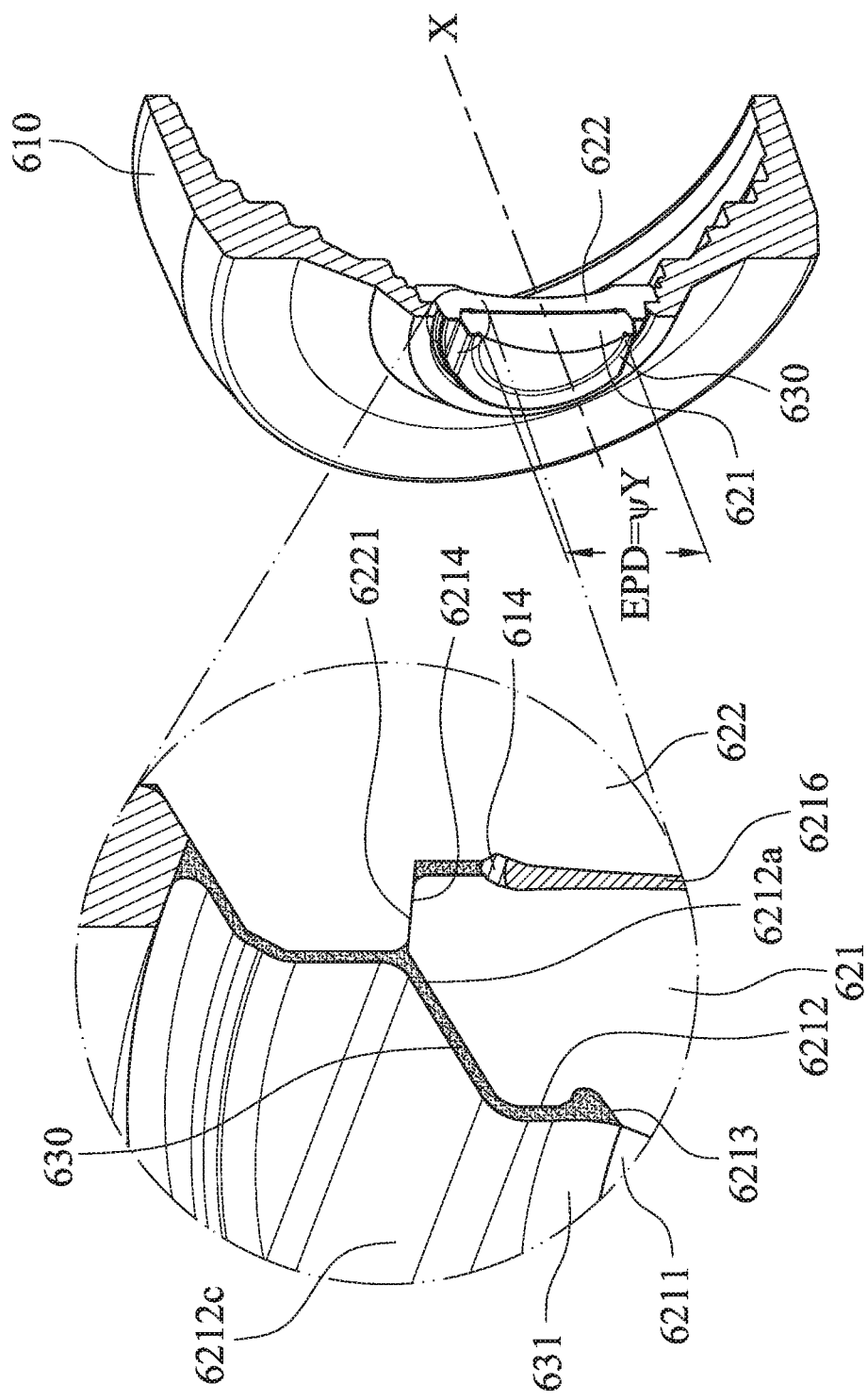
FIG. 6D is a partially enlarged view of the plastic lens barrel, the first optical lens element, the second optical lens element and the light-absorbing portion according to the 6th example in FIG. 6A.

FIG. 6C is another partially enlarged view of the imaging lens assembly 60 according to the 6th example in FIG. 6A. FIG. 6D is a partially enlarged view of the plastic lens barrel 610, the first optical lens element 621, the second optical lens element 622 and the light-absorbing portion 630 according to the 6th example in FIG. 6A. In FIGS. 6A to 6D, the first optical lens element 621 and the second optical lens element 622 are cemented into a cemented lens element. In detail, a cement material 6216 is included between the first optical lens element 621 and the second optical lens element 622. Therefore, the aberration of the imaging lens assembly 60 can be reduced, and the stability can be promoted.

The peripheral surface 6212 includes at least one inclined surface; in detail, according to the 6th example, the peripheral surface 6212 includes a inclined surface 6212a, and the light-absorbing portion 630 is coated on the inclined surface 6212a. In detail, the peripheral surface 6212 is a surface from the annular step structure 6213 to an outermost surface of the first optical lens element 621, and every surface satisfied a range of oblique angle from the annular step structure 6213 to the outermost periphery of the first optical lens element 621 can be the inclined surface. The inclined surface 6212a faces towards the object side of the imaging lens assembly 60, a mold design of the inclined surface 6212a is favorable for releasing and demolding, and the feasibility of the light-absorbing portion 630 coated on the first optical lens element 621 can be simultaneously provided.

The peripheral surface 6212 of the first optical lens element 621 can include at least one reduction structure reduced from an outermost periphery of the first optical lens element 621 to the effective optical surface 6211. In detail, according to the 6th example, a number of the reduction structures 6212c is two. The first optical lens element 621 with the reduction structures 6212c is an I-cut lens element structure, and the outermost periphery of the first optical lens element 621 is composed of two corresponding surfaces and two corresponding arc surfaces. Therefore, it is favorable for reducing a volume of the imaging lens assembly 60.

The peripheral surface 6212 has any two areas with different distances from the optical axis X, and the any two areas do not face to each other at a direction perpendicular to the optical axis X. Therefore, the light-absorbing portion 630 can be determined without a groove structure.

The annular step structure 6213 is for defining an entrance pupil diameter of the imaging lens assembly 60. In detail, the effective optical surface 6211 is a smooth surface, and the annular step structure 6213 can have a matte surface. Therefore, the effective optical surface 6211 and the annular step structure 6213 can be for determining an area of the effective optical surface 6211, and for defining the entrance pupil diameter.

In FIGS. 6B to 6D, the light-absorbing portion 630 has an uneven thickness, and includes at least one annular arc surface; in detail, according to the 6th example, which is an annular arc surface 631. In detail, because a few deviations will be occurred during a coating process, errors in the roundness or the concentricity of the light-absorbing portion 630 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 630 is a little different from the ideal shape of the proper circle.

At least one portion of the light-absorbing portion 630 can be coated on the annular step structure 6213, and at least another one portion of the light-absorbing portion 630 can be connected to a minimum opening of the plastic lens barrel 610, wherein the light-absorbing portion 630 can be accumulated via a structure of the annular step structure 6213 to promote the optical density. Moreover, the light-absorbing portion 630 is disposed on an object side of an object-side outer surface 612 of the plastic lens barrel 610, and is connected to the plastic lens barrel 610. The light-absorbing portion 630 overlaps the peripheral surface of the at least one of the optical lens elements along the direction perpendicular to the optical axis X, and the light-absorbing portion 630 surrounds the effective optical surface. In detail, according to the 6th example, the light-absorbing portion 630 overlaps the effective optical surface 6211 and the peripheral surface 6212 of the first optical lens element 621.

A diaphragm of the imaging lens assembly 60 is defined via the annular step structure 6213, or the light-absorbing portion 630 can be the diaphragm of the imaging lens assembly 60, and the bundle of incident light is determined via the annular step structure 6213 or the light-absorbing portion 630. In detail, according to the 6th example, the diaphragm of the imaging lens assembly 60 is determined via the annular step structure 6213, and the light-absorbing portion 630 is the diaphragm of the imaging lens assembly 60. Therefore, it is favorable for enhancing the imaging quality.

The light-absorbing portion 630 along the direction perpendicular to the optical axis X can include at least one portion not contacted with the plastic lens barrel 610. Via a forward disposition of the first optical lens element 621, the laterally incident non-imaging light can be blocked, and a space of the imaging lens assembly 60 is not limited to a structure of the plastic lens barrel 610.

According to the 6th example, the light-absorbing portion 630 extends to the second optical lens element 622, and the light-absorbing portion 630 is for retaining the first optical lens element 621 to the second optical lens element 622 and the plastic lens barrel 610. Therefore, the complicated blocking structure and the receiving structure of the plastic lens barrel 610 can be replaced.

A surface of the light-absorbing portion 630 is a rough surface, and a roughness of the rough surface is Ra, which is between 0.16 μm to 1.60 μm. The roughness Ra of 0.16 μm converted to a roughness VDI is about 4, and the roughness Ra of 1.60 μm converted to the roughness VDI is about 24. In general, the roughness Ra of the general optical lens element is about below 0.01 μm, the roughness Ra of the matte surface of the general plastic lens barrel is about 0.8 μm, and the roughness Ra of 0.8 μm converted to the roughness VDI is about 18. Therefore, the imaging lens assembly 60 according to the 6th example has the higher efficiency of blocking the stray light.

In detail, the light-absorbing portion 630 is originally liquid, and the curing light-absorbing portion 630 has the adhesion to be a retaining element. Also, an amount of light of the imaging lens assembly 60 can be controlled via the light-absorbing portion 630. Therefore, a design of the light-absorbing portion 630 as a through aperture is favorable for the compact size of the imaging lens assembly 60. Furthermore, a light blocking element can be conserved, a manufacturing process of the plastic lens barrel 610 can be simplified, and it is simultaneously favorable for blocking the non-imaging light from a periphery of the first optical lens element 621.

In FIG. 6C, the first optical lens element 621 can include a first axial assembling structure 6214, and the second optical lens element 622 can include a second axial assembling structure 6221 corresponding to the first axial assembling structure 6214, wherein the first axial assembling structure 6214 and the second axial assembling structure 6221 are connected to each other. Furthermore, the first axial assembling structure 6214 and the second axial assembling structure 6221 are for supporting two adjacent optical lens elements to promote the concentricity between the optical lens elements. In detail, according to the 6th example, the two adjacent optical lens elements are the first optical lens element 621 and the second optical lens element 622. Therefore, it is favorable for enhancing the resolution and the assembling yield.

At least one of the optical lens elements of the optical lens element set 620 can include a third axial assembling structure 6215. In detail, according to the 6th example, the second optical lens element 622 includes the third axial assembling structure 6215, and the plastic lens barrel 610 can include a fourth axial assembling structure 613 corresponding to the third axial assembling structure 6215, wherein the third axial assembling structure 6215 and the fourth axial assembling structure 613 are connected to each other. Therefore, it is favorable for promoting the coaxiality of the optical lens element and the plastic lens barrel 610, and increasing the structural stability.

In detail, a glue-accommodating space 614 is included between the plastic lens barrel 610 and the second optical lens element 622. Therefore, an overflowing condition can be prevented.

Figure 6E:
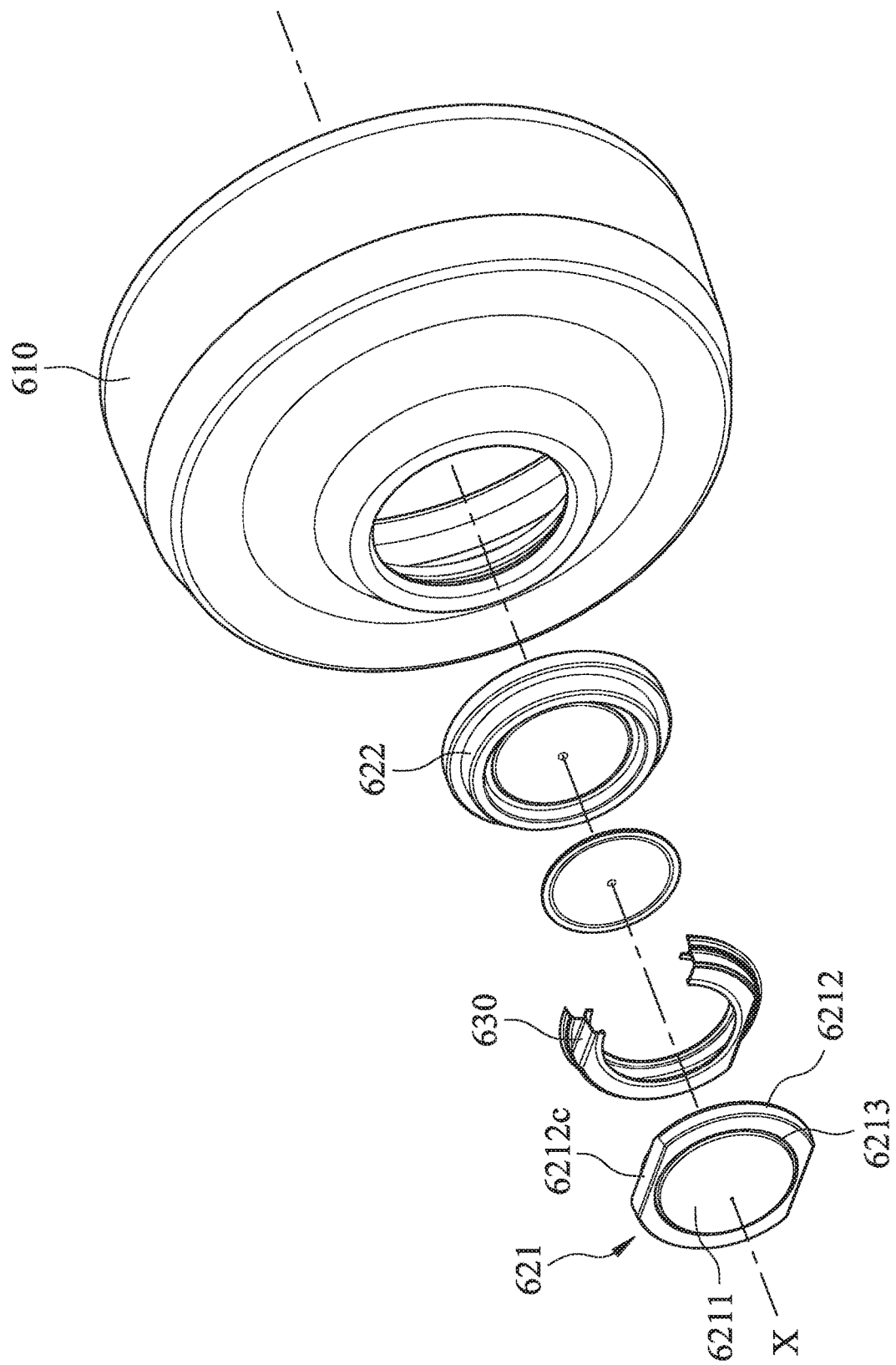
FIG. 6E is a partially exploded view of the imaging lens assembly according to the 6th example in FIG. 6A.

FIG. 6E is a partially exploded view of the imaging lens assembly 60 according to the 6th example in FIG. 6A. In FIG. 6E, the at least one of the optical lens elements (in detail, according to the 6th example, which is the first optical lens element 621) can be a plastic lens element, and the peripheral surface 6212 of the at least one of the optical lens elements (in detail, according to the 6th example, which is the first optical lens element 621) and a portion of the light-absorbing portion 630 overlapping the peripheral surface 6212 of the at least one of the optical lens elements (in detail, according to the 6th example, which is the first optical lens element 621) along the direction perpendicular to the optical axis X are without a gate trace.

Figure 6F:
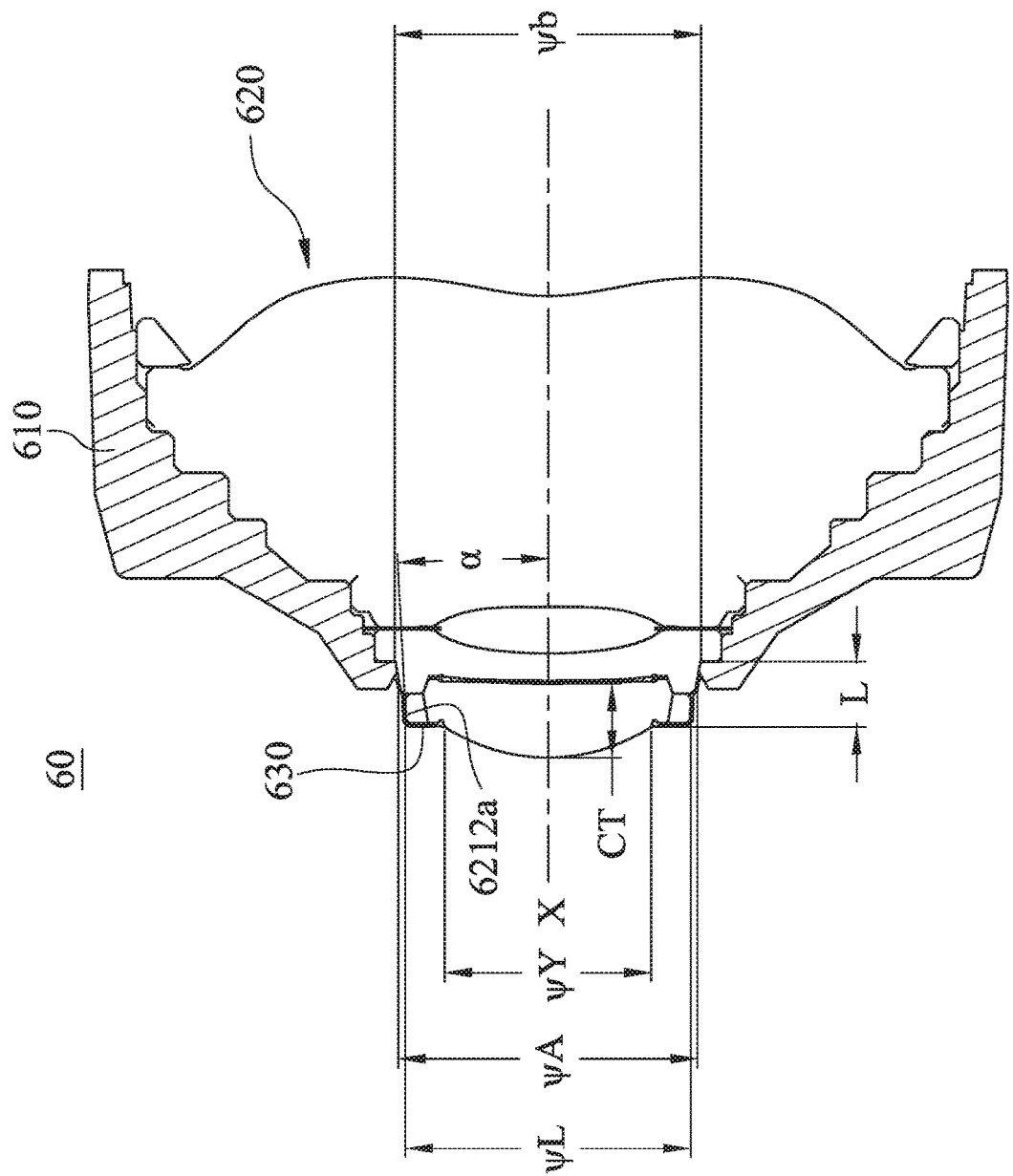
FIG. 6F is a schematic view of parameters according to the 6th example in FIG. 6A.

FIG. 6F is a schematic view of parameters according to the 6th example in FIG. 6A. In FIG. 6F, an angle α between the inclined surface 6212a and the optical axis X is 3 degrees.

In FIGS. 6D and 6F, according to the 6th example, when a diameter of the entrance pupil diameter is EPD, a diameter of the minimum opening of the plastic lens barrel 610 is ψb, a maximum diameter of the at least one portion of the light-absorbing portion 630 not overlapping the plastic lens barrel 610 and close to an image side of the imaging lens assembly 60 is ψA, a total length of the light-absorbing portion 630 along a direction parallel to the optical axis X is L, an outer diameter of the effective optical surface 6211 is ψY, a maximum outer diameter of the at least one of the optical lens elements (in detail, according to the 6th example, which is the first optical lens element 621) is ψL, a thickness of the at least one of the optical lens elements (in detail, according to the 6th example, which is the first optical lens element 621) at the optical axis X is CT, the following conditions of the Table 6 are satisfied.

TABLE 6

6th example

| | | | |
|---|---|---|---|
| EPD (mm) | 1.52 | ψY (mm) | 1.52 |
| ψb (mm) | 2.253 | ψL (mm) | 2.1 |
| EPD/ψb | 0.675 | ψY/ψL | 0.724 |
| ψA (mm) | 2.2 | ψL/ψb | 0.932 |
| EPD/ψA | 0.691 | CT (mm) | 0.544 |
| L (mm) | 0.481 | ψY/CT | 2.794 |

According to the 6th example, it should be mentioned that ψY=EPD.

7th Example

Figure 7A:
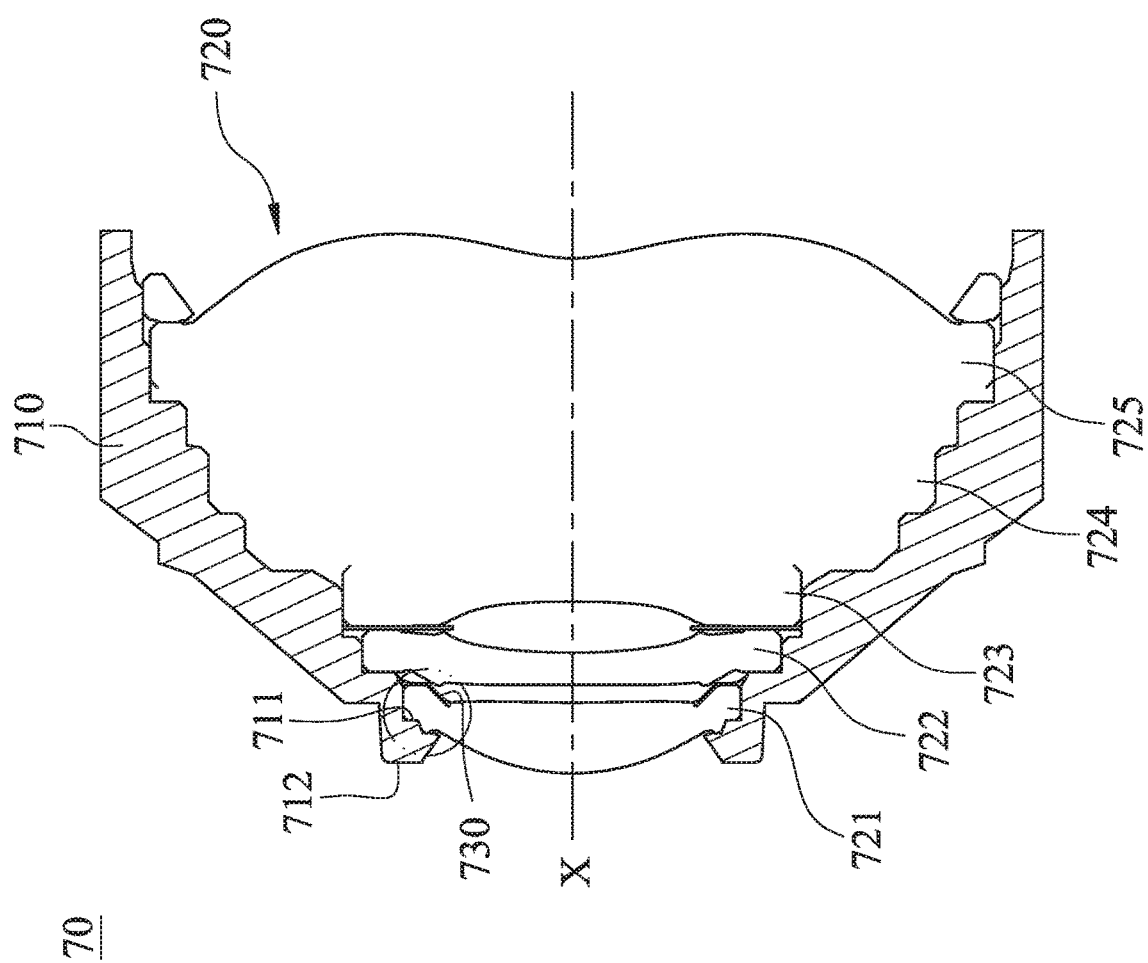
FIG. 7A is a schematic view of an imaging lens assembly according to the 7th example of the present disclosure.

FIG. 7A is a schematic view of an imaging lens assembly 70 according to the 7th example of the present disclosure. In FIG. 7A, the imaging lens assembly 70 has an optical axis X, and includes a plastic lens barrel 710, an optical lens element set 720 and a light-absorbing portion 730, wherein the optical lens element set 720 is disposed in the plastic lens barrel 710. In detail, the light-absorbing portion 730 is a light-absorbing layer.

The optical lens element set 720 includes a plurality of optical lens elements. In detail, according to the 7th example, the optical lens element set 720, in order from an object side to an image side, includes a first optical lens element 721, a second optical lens element 722, a third optical lens element 723, a fourth optical lens element 724 and a fifth optical lens element 725, wherein the first optical lens element 721 is closest to the object side of the optical lens element set 720, the second optical lens element 722 is disposed on an image side of the first optical lens element 721, and optical features such as structures, surface shapes and so on of the third optical lens element 723, the fourth optical lens element 724 and the fifth optical lens element 725 can be disposed according to different imaging demand, and the optical features are not important to the present disclosure, and will not disclose details thereof herein.

Figure 7B:
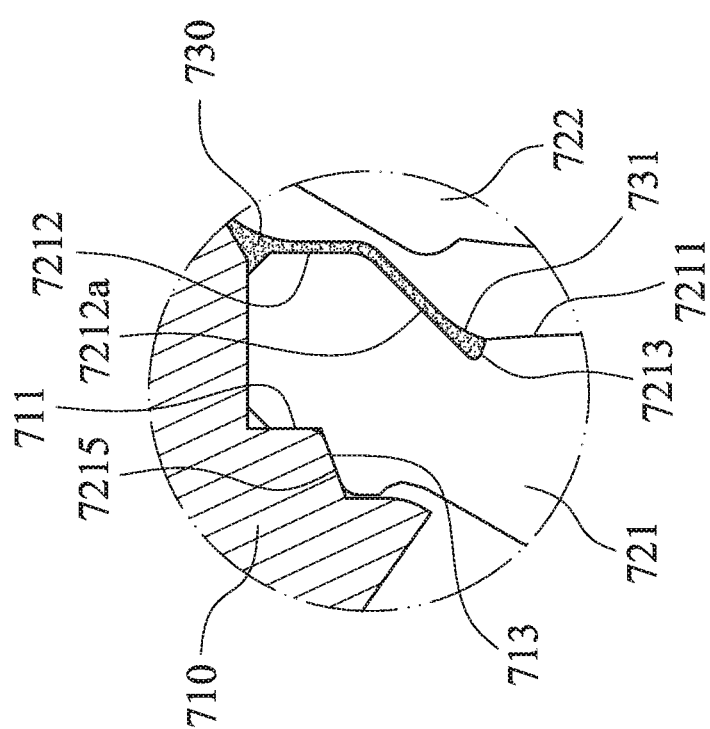
FIG. 7B is a partially enlarged view of the imaging lens assembly according to the 7th example in FIG. 7A.

FIG. 7B is a partially enlarged view of the imaging lens assembly 70 according to the 7th example in FIG. 7A. In FIG. 7B, at least one of the optical lens elements (in detail, according to the 7th example, which is the first optical lens element 721) includes an effective optical surface 7211, a peripheral surface 7212 and an annular step structure 7213, wherein the peripheral surface 7212 surrounds the effective optical surface 7211, and the annular step structure 7213 is connected to the effective optical surface 7211 and the peripheral surface 7212.

The peripheral surface 7212 includes at least one inclined surface; in detail, according to the 7th example, the peripheral surface 7212 includes a inclined surface 7212a, and the light-absorbing portion 730 is coated on the inclined surface 7212a. In detail, the peripheral surface 7212 is a surface from the annular step structure 7213 to an outermost surface of the first optical lens element 721, and every surface satisfied a range of oblique angle from the annular step structure 7213 to the outermost periphery of the first optical lens element 721 can be the inclined surface. The inclined surface 7212a faces towards the object side of the imaging lens assembly 70, a mold design of the inclined surface 7212a is favorable for releasing and demolding, and the feasibility of the light-absorbing portion 730 coated on the first optical lens element 721 can be simultaneously provided.

The peripheral surface 7212 has any two areas with different distances from the optical axis X, and the any two areas do not face to each other at a direction perpendicular to the optical axis X. Therefore, the light-absorbing portion 730 can be determined without a groove structure.

The effective optical surface 7211 is a smooth surface, and the annular step structure 7213 can have a matte surface. Therefore, the effective optical surface 7211 and the annular step structure 7213 can be for determining an area of the effective optical surface 7211, and for defining the entrance pupil diameter.

The plastic lens barrel 710 can include a minimum opening (not shown), an object-side receiving surface 711 and an object-side outer surface 712. The object-side receiving surface 711 receives to a portion of the peripheral surface 7212, and the object-side receiving surface 711 overlaps the peripheral surface 7212 at a direction parallel to the optical axis X. The object-side outer surface 712 and the object-side receiving surface 711 are relatively disposed, and the object-side receiving surface 711 overlaps the object-side outer surface 712 at the direction parallel to the optical axis X.

In FIG. 7B, the light-absorbing portion 730 has an uneven thickness, and includes at least one annular arc surface; in detail, according to the 7th example, which is an annular arc surface 731. In detail, because a few deviations will be occurred during a coating process, errors in the roundness or the concentricity of the light-absorbing portion 730 will be occurred, and a tolerance is generally between 0.001 mm to 0.03 mm. Further, the tolerance can be between 0 mm to 0.01 mm. Moreover, the capillarity is influenced via a roughness of the matte surface, and a coating range of the actual light-absorbing portion 730 is a little different from the ideal shape of the proper circle.

At least one portion of the light-absorbing portion 730 can be coated on the annular step structure 7213, and at least another one portion of the light-absorbing portion 730 can be connected to the minimum opening of the plastic lens barrel 710, wherein the light-absorbing portion 730 can be accumulated via a structure of the annular step structure 7213 to promote the optical density. Moreover, the light-absorbing portion 730 overlaps the peripheral surface of the at least one of the optical lens elements along the direction perpendicular to the optical axis X, and the light-absorbing portion 730 surrounds the effective optical surface. In detail, according to the 7th example, the light-absorbing portion 730 overlaps the effective optical surface 7211 and the peripheral surface 7212 of the first optical lens element 721.

A diaphragm of the imaging lens assembly 70 is defined via the annular step structure 7213, or the light-absorbing portion 730 can be the diaphragm of the imaging lens assembly 70, and the bundle of incident light is determined via the annular step structure 7213 or the light-absorbing portion 730. In detail, according to the 7th example, the diaphragm of the imaging lens assembly 70 is determined via the annular step structure 7213, and the light-absorbing portion 730 is the diaphragm of the imaging lens assembly 70. Therefore, it is favorable for enhancing the imaging quality.

A surface of the light-absorbing portion 730 is a rough surface, and a roughness of the rough surface is Ra, which is between 0.16 µm to 1.60 µm. The roughness Ra of 0.16 µm converted to a roughness VDI is about 4, and the roughness Ra of 1.60 µm converted to the roughness VDI is about 24. In general, the roughness Ra of the general optical lens element is about below 0.01 µm, the roughness Ra of the matte surface of the general plastic lens barrel is about 0.8 µm, and the roughness Ra of 0.8 µm converted to the roughness VDI is about 18. Therefore, the imaging lens assembly 70 according to the 7th example has the higher efficiency of blocking the stray light.

In detail, the light-absorbing portion 730 is originally liquid, and the curing light-absorbing portion 730 has the adhesion to be a retaining element. Also, an amount of light of the imaging lens assembly 70 can be controlled via the light-absorbing portion 730. Therefore, a design of the light-absorbing portion 730 as a through aperture is favorable for the compact size of the imaging lens assembly 70. Furthermore, a light blocking element can be conserved, a manufacturing process of the plastic lens barrel 710 can be simplified, and it is simultaneously favorable for blocking the non-imaging light from a periphery of the first optical lens element 721.

At least one of the optical lens elements of the optical lens element set 720 can include a third axial assembling structure 7215. In detail, according to the 7th example, the first optical lens element 721 includes the third axial assembling structure 7215, and the plastic lens barrel 710 can include a fourth axial assembling structure 713 corresponding to the third axial assembling structure 7215, wherein the third axial assembling structure 7215 and the fourth axial assembling structure 713 are connected to each other. Therefore, it is favorable for promoting the coaxiality of the optical lens element and the plastic lens barrel 710, and increasing the structural stability.

Figure 7C:
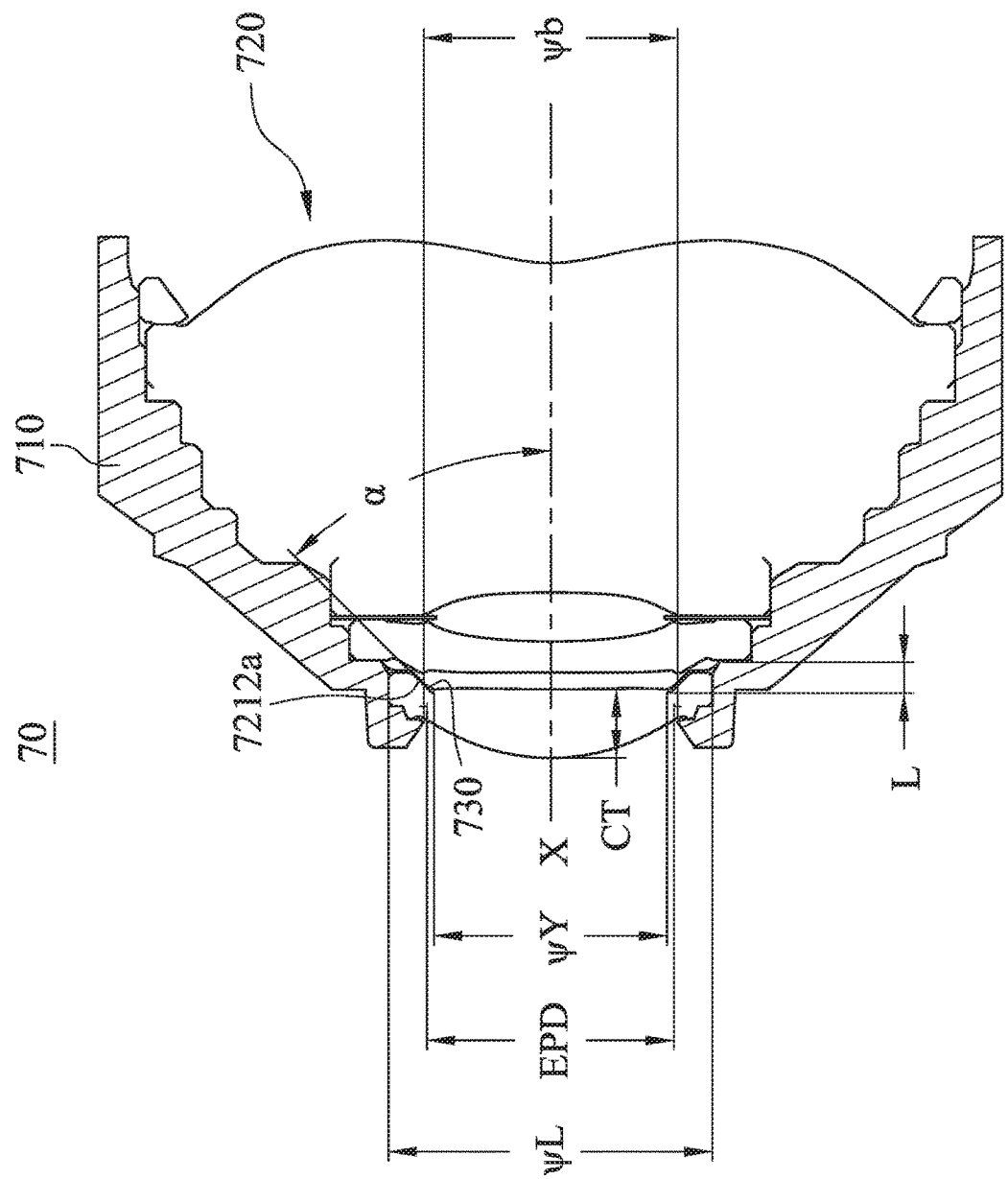
FIG. 7C is a schematic view of parameters according to the 7th example in FIG. 7A.

FIG. 7C is a schematic view of parameters according to the 7th example in FIG. 7A. In FIG. 7C, an angle α between the inclined surface 7212a and the optical axis X is 45 degrees.

In FIG. 7C, according to the 7th example, when a diameter of the entrance pupil diameter is EPD, a diameter of the minimum opening of the plastic lens barrel 710 is ψb, a total length of the light-absorbing portion 730 along the direction parallel to the optical axis X is L, an outer diameter of the effective optical surface 7211 is ψY, a maximum outer diameter of the at least one of the optical lens elements (in detail, according to the 7th example, which is the first optical lens element 721) is ψL, a thickness of the at least one of the optical lens elements (in detail, according to the 7th example, which is the first optical lens element 721) at the optical axis X is CT, the following conditions of the Table 7 are satisfied.

TABLE 7

| 7th example | | | |
|---|---|---|---|
| EPD (mm) | 1.77 | ψY (mm) | 2.32 |
| ψb (mm) | 1.82 | ψY/ψL | 0.720 |
| EPD/ψb | 0.973 | ψL/ψb | 1.275 |
| L (mm) | 0.22 | CT (mm) | 0.492 |
| ψY (mm) | 1.67 | ψY/CT | 3.394 |

8th Example

Figure 8A:
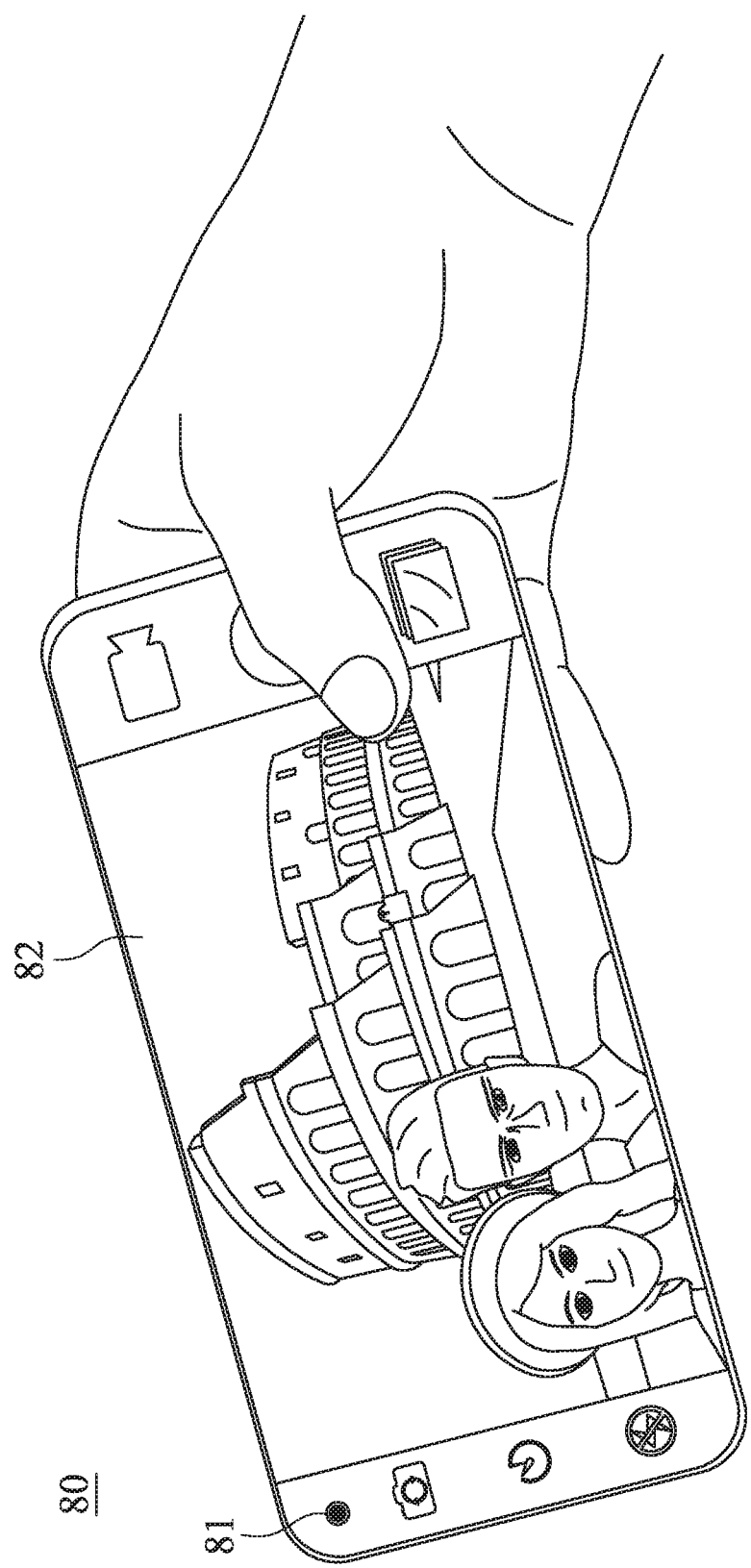
FIG. 8A is a schematic view of an electronic device according to the 8th example of the present disclosure.
Figure 8B:
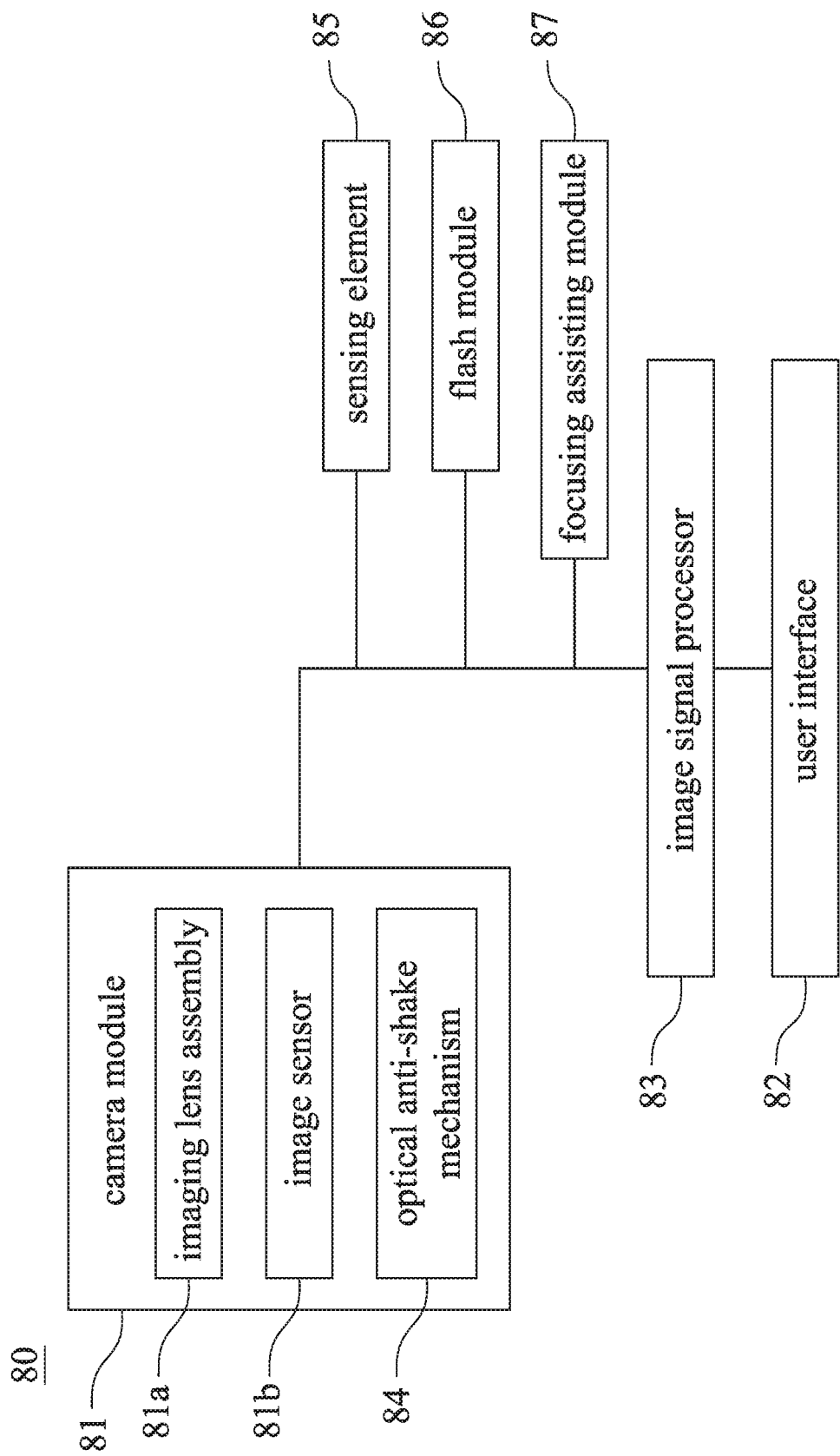
FIG. 8B is a block diagram of the electronic device according to the 8th example in FIG. 8A.

FIG. 8A is a schematic view of an electronic device 80 according to the 8th example of the present disclosure. FIG. 8B is a block diagram of the electronic device 80 according to the 8th example in FIG. 8A. In FIGS. 8A and 8B, the electronic device 80 is a smart phone, and includes a camera module 81 and a user interface 82. The camera module 81 includes an imaging lens assembly 81a and image sensor 81b, wherein the image sensor 81b is disposed on an image surface (not shown). The camera module 81 according to the 8th example is disposed on an area of side of the user interface 82, wherein the user interface 82 can be a touch screen or a display screen, but is not limited thereto.

The imaging lens assembly 81a can be one of the imaging lens assemblies according to the aforementioned 1st example to the 7th example, and the imaging lens assembly 81a includes a plastic lens barrel (not shown), an optical lens element set (not shown) and a light-absorbing portion (not shown), but is not limited thereto.

Moreover, users enter a shooting mode via the user interface 82 of the electronic device 80. At this moment, the imaging light is gathered on the image sensor 81b via the imaging lens assembly 81a, and an electronic signal about an image is output to an image signal processor (ISP) 83.

To meet a specification of a camera of the electronic device 80, the electronic device 80 can further include an optical anti-shake mechanism 84, which can be an optical image stabilization (OIS). Furthermore, the electronic device 80 can further include at least one auxiliary optical element (its reference numeral is omitted) and at least one sensing element 85. According to the 8th example, the auxiliary optical element is a flash module 86 and a focusing assisting module 87. The flash module 86 can be for compensating a color temperature, and the focusing assisting module 87 can be an infrared distance measurement component, a laser focus module, etc. The sensing element 85 can have functions for sensing physical momentum and kinetic energy, such as an accelerator, a gyroscope, a Hall Effect Element, to sense shaking or jitters applied by hands of the user or external environments. Accordingly, the imaging lens assembly 81a of the electronic device 80 equipped with an auto-focusing mechanism and the optical anti-shake mechanism 84 can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 80 can further include, but not be limited to, a display, a control unit, a storage unit, a random access memory (RAM), a read-only memory (ROM), or the combination thereof.

Figure 8C:
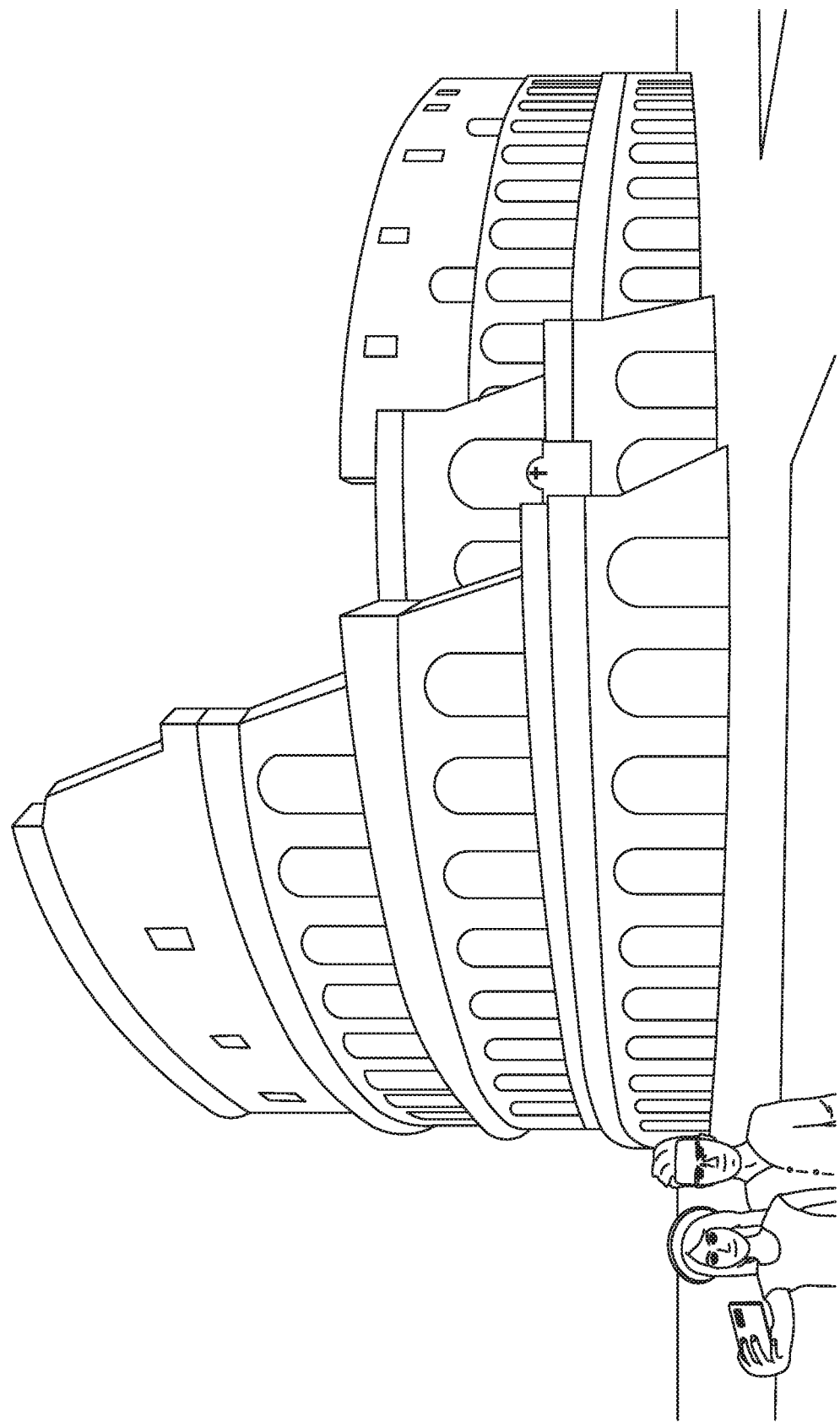
FIG. 8C is a schematic view of selfie scene according to the 8th example in FIG. 8A.
Figure 8D:
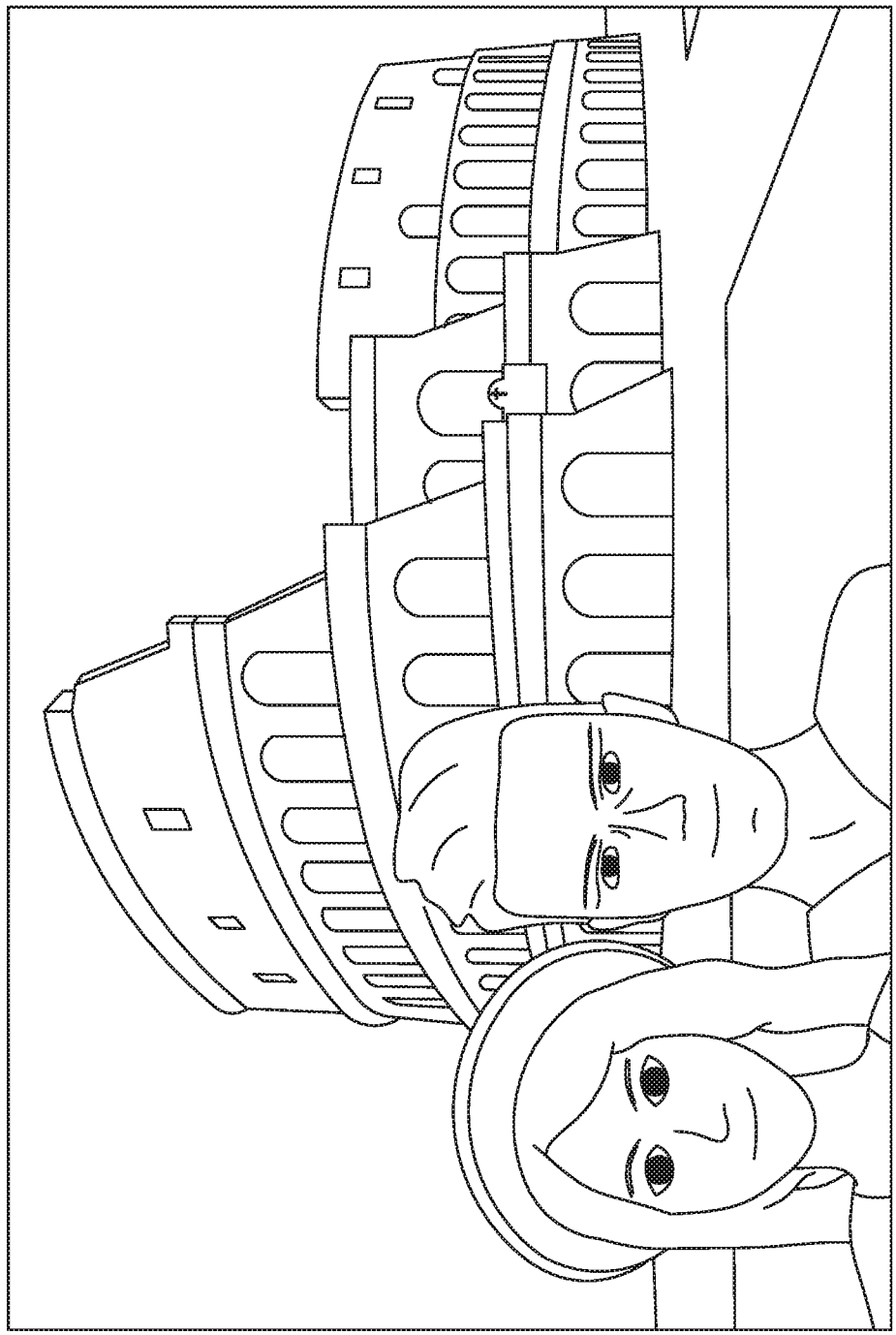
FIG. 8D is a schematic view of a captured image according to the 8th example in FIG. 8A.

FIG. 8C is a schematic view of selfie scene according to the 8th example in FIG. 8A. FIG. 8D is a schematic view of a captured image according to the 8th example in FIG. 8A. In FIGS. 8A to 8D, the imaging lens assembly 81a and the user interface 82 face towards the users. When proceeding selfie or live streaming, the users can watch a captured image and operate an interface at the same time, and the capture image as FIG. 8D can be obtained after shooting. Therefore, better shooting experience can be provided via the imaging lens assembly 81a of the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
a plastic lens barrel comprising a minimum opening;
an optical lens element set comprising a plurality of optical lens elements, wherein the optical lens elements comprise a first optical lens element closest to an object side of the optical lens element set, and the first optical lens element comprises:
an effective optical surface;
a peripheral surface surrounding the effective optical surface; and
an annular step structure connected to the effective optical surface and the peripheral surface, and for defining an entrance pupil diameter of the imaging lens assembly; and
a light-absorbing layer, wherein at least one portion of the light-absorbing layer is coated on the annular step structure, and at least another one portion of the light-absorbing layer is connected to the minimum opening of the plastic lens barrel;
wherein the light-absorbing layer is for retaining the first optical lens element on the plastic lens barrel;
wherein the light-absorbing layer extends from an inside to an outside of the plastic lens barrel along a direction parallel to an optical axis;
wherein at least portion of the peripheral surface extends to the outside of the plastic lens barrel along the direction parallel to the optical axis, the at least portion of the peripheral surface does not overlap the plastic lens barrel along a direction perpendicular to the optical axis, and the light-absorbing layer is disposed on the at least portion of the peripheral surface;
wherein the light-absorbing layer is a surface structure disposed on at least one of the optical lens elements completely, and the light-absorbing layer has an uneven thickness;

wherein a diameter of the entrance pupil diameter is EPD, a diameter of the minimum opening of the plastic lens barrel is ψb, a total length of the light-absorbing layer along the direction parallel to the optical axis is L, and the following conditions are satisfied:

0.4<EPD/ψb<1.0; and 0.2 mm<L<1.5 mm.

2. The imaging lens assembly of claim 1, wherein the light-absorbing layer is a diaphragm of the imaging lens assembly, and for determining a bundle of incident light.

3. The imaging lens assembly of claim 1, wherein the diameter of the entrance pupil diameter is EPD, the diameter of the minimum opening of the plastic lens barrel is ψb, and the following condition is satisfied:

0.45<EPD/ψb<0.98.

4. The imaging lens assembly of claim 1, wherein the diameter of the entrance pupil diameter is EPD, the diameter of the minimum opening of the plastic lens barrel is ψb, and the following condition is satisfied:

0.55<EPD/ψb<0.98.

5. The imaging lens assembly of claim 1, wherein the light-absorbing layer along the direction perpendicular to the optical axis comprises at least one portion not contacted with the plastic lens barrel.

6. The imaging lens assembly of claim 5, wherein a maximum diameter of the at least one portion of the light-absorbing layer not overlapping the plastic lens barrel and close to an image side of the imaging lens assembly is ψA, the diameter of the entrance pupil diameter is EPD, and the following condition is satisfied:

0.6<EPD/ψA≤1.

7. The imaging lens assembly of claim 6, wherein the maximum diameter of the at least one portion of the light-absorbing layer not overlapping the plastic lens barrel and close to the image side of the imaging lens assembly is ψA, the diameter of the entrance pupil diameter is EPD, and the following condition is satisfied:

0.75<EPD/ψA≤1.

8. The imaging lens assembly of claim 5, wherein the optical lens element set further comprises a second optical lens element disposed on an image side of the first optical lens element, the first optical lens element comprises a first axial assembling structure, and the second optical lens element comprises a second axial assembling structure corresponding to the first axial assembling structure, wherein the first axial assembling structure and the second axial assembling structure are connected to each other.

9. The imaging lens assembly of claim 8, wherein the at least one of the optical lens elements of the optical lens element set comprises a third axial assembling structure, the plastic lens barrel comprises a fourth axial assembling structure corresponding to the third axial assembling structure, wherein the third axial assembling structure and the fourth axial assembling structure are connected to each other.

10. The imaging lens assembly of claim 5, wherein the optical lens element set comprises a second optical lens element disposed on an image side of the first optical lens element, the light-absorbing layer extends to the second optical lens element, and the light-absorbing layer is for retaining the first optical lens element to the second optical lens element and the plastic lens barrel.

11. The imaging lens assembly of claim 5, wherein the optical lens element set comprises a second optical lens element disposed on an image side of the first optical lens element, and the first optical lens element and the second optical lens element are cemented into a cemented lens element.

12. The imaging lens assembly of claim 1, wherein a surface of the light-absorbing layer is a rough surface, and a roughness of the rough surface is Ra, which is between 0.16 μm to 1.60 μm.

13. A camera module, comprising:
the imaging lens assembly of claim 1; and
an image sensor disposed on an image surface of the imaging lens assembly.

14. An electronic device, comprising:
the camera module of claim 13.

15. An imaging lens assembly, comprising:
a plastic lens barrel;
an optical lens element set comprising a plurality of optical lens elements, wherein the optical lens elements comprise a first optical lens element closest to an object side of the optical lens element set, and the first optical lens element comprises:
an effective optical surface facing towards the object side;
a peripheral surface surrounding the effective optical surface; and
an annular step structure connected to the effective optical surface and the peripheral surface, and for defining an entrance pupil diameter of the imaging lens assembly; and
a light-absorbing layer, wherein at least one portion of the light-absorbing layer is coated on the annular step structure, and at least another one portion of the light-absorbing layer is connected to the plastic lens barrel;
wherein the light-absorbing layer is for retaining the first optical lens element on the plastic lens barrel;
wherein the light-absorbing layer extends from an inside to an outside of the plastic lens barrel along a direction parallel to an optical axis;
wherein at least portion of the peripheral surface extends to the outside of the plastic lens barrel along the direction parallel to the optical axis, the at least portion of the peripheral surface does not overlap the plastic lens barrel along a direction perpendicular to the optical axis, and the light-absorbing layer is disposed on the at least portion of the peripheral surface;
wherein the light-absorbing layer is a surface structure disposed on at least one of the optical lens elements completely, and the light-absorbing layer has an uneven thickness;
wherein the peripheral surface comprises at least one inclined surface, the light-absorbing layer is coated on the at least one inclined surface, an angle between the at least one inclined surface and the optical axis is a, a total length of the light-absorbing layer along the direction parallel to the optical axis is L, and the following conditions are satisfied:

1 degree<α<50 degrees; and 0.2 mm<L<1.5 mm.

16. The imaging lens assembly of claim 15, wherein a diameter of the entrance pupil diameter is EPD, a diameter of a minimum opening of the plastic lens barrel is ψb, and the following condition is satisfied:

0.45<EPD/ψb<0.98.

17. The imaging lens assembly of claim 15, wherein an object side of the light-absorbing layer coated on the at least one inclined surface and the plastic lens barrel are connected to each other.

18. The imaging lens assembly of claim 15, wherein the optical lens element set comprises a second optical lens element disposed on an image side of the first optical lens element, the light-absorbing layer extends to the second optical lens element, and the light-absorbing layer is for retaining the first optical lens element to the second optical lens element and the plastic lens barrel.

19. The imaging lens assembly of claim 18, wherein the first optical lens element and the second optical lens element are cemented into a cemented lens element.

20. The imaging lens assembly of claim 18, wherein the first optical lens element comprises a first axial assembling structure, and the second optical lens element comprises a second axial assembling structure corresponding to the first axial assembling structure, wherein the first axial assembling structure and the second axial assembling structure are connected to each other.

21. The imaging lens assembly of claim 15, wherein the angle between the at least one inclined surface and the optical axis is a, and the following condition is satisfied:

3 degrees≤α<35 degrees.

22. The imaging lens assembly of claim 15, wherein the total length of the light-absorbing layer along the direction parallel to the optical axis is L, and the following condition is satisfied:

0.4 mm<L<1.4 mm.

23. The imaging lens assembly of claim 22, wherein the light-absorbing layer along the direction perpendicular to the optical axis comprises at least one portion not contacted with the plastic lens barrel.

24. The imaging lens assembly of claim 23, wherein a maximum diameter of the at least one portion of the light-absorbing layer not overlapping the plastic lens barrel and close to an image side of the imaging lens assembly is ψA, a diameter of the entrance pupil diameter is EPD, and the following condition is satisfied:

0.6<EPD/ψA≤1.

25. The imaging lens assembly of claim 24, wherein the maximum diameter of the at least one portion of the light-absorbing layer not overlapping the plastic lens barrel and close to the image side of the imaging lens assembly is ψA, the diameter of the entrance pupil diameter is EPD, and the following condition is satisfied:

0.75<EPD/ψA≤1.

26. The imaging lens assembly of claim 15, wherein the peripheral surface of the first optical lens element comprises at least one reduction structure reduced from an outermost periphery of the first optical lens element to the effective optical surface.

27. An imaging lens assembly, comprising:
a plastic lens barrel;
an optical lens element set comprising a plurality of optical lens elements, wherein at least one of the optical lens elements comprises:
an effective optical surface;
a peripheral surface surrounding the effective optical surface; and
an annular step structure connected to the effective optical surface and the peripheral surface, for defining a diaphragm of the imaging lens assembly, and for determining a bundle of incident light; and
a light-absorbing layer, wherein at least one portion of the light-absorbing layer is coated on the annular step structure, and at least another one portion of the light-absorbing layer is connected to the plastic lens barrel;
wherein the light-absorbing layer is for retaining the at least one of the optical lens elements on the plastic lens barrel;
wherein the light-absorbing layer has an uneven thickness, and comprises at least one annular arc surface;
wherein the light-absorbing layer extends from an inside to an outside of the plastic lens barrel along a direction parallel to an optical axis;
wherein at least portion of the peripheral surface extends to the outside of the plastic lens barrel along the direction parallel to the optical axis, the at least portion of the peripheral surface does not overlap the plastic lens barrel along a direction perpendicular to the optical axis, and the light-absorbing layer is disposed on the at least portion of the peripheral surface;
wherein the light-absorbing layer is a surface structure disposed on the at least one of the optical lens elements completely;
wherein an outer diameter of the effective optical surface is $\psi Y$, a maximum outer diameter of the at least one of the optical lens elements is $\psi L$, a total length of the light-absorbing layer along the direction parallel to the optical axis is L, and the following conditions are satisfied:

$0.5 < \psi Y/\psi L < 0.95$; and $0.2 \text{ mm} < L < 1.5 \text{ mm}$.

28. The imaging lens assembly of claim 27, wherein the maximum outer diameter of the at least one of the optical lens elements is $\psi L$, a diameter of a minimum opening of the plastic lens barrel is $\psi b$, and the following condition is satisfied:

$0.7 < L/\psi b < 2.0$.

29. The imaging lens assembly of claim 27, wherein the outer diameter of the effective optical surface is $\psi Y$, a thickness of the at least one of the optical lens elements at the optical axis is CT, and the following condition is satisfied:

$1.0 < \psi Y/CT < 3.6$.

30. The imaging lens assembly of claim 27, wherein the at least one of the optical lens elements comprises a third axial assembling structure, the plastic lens barrel comprises a fourth axial assembling structure corresponding to the third axial assembling structure, wherein the third axial assembling structure and the fourth axial assembling structure are connected to each other.

31. The imaging lens assembly of claim 27, wherein the peripheral surface has any two areas with different distances from the optical axis, and the any two areas do not face to each other at the direction perpendicular to the optical axis.

32. The imaging lens assembly of claim 27, wherein the light-absorbing layer along the direction perpendicular to the optical axis comprises at least one portion not contacted with the plastic lens barrel, wherein a maximum diameter of the at least one portion of the light-absorbing layer not overlapping the plastic lens barrel and close to an image side of the imaging lens assembly is $\psi A$, a diameter of an entrance pupil diameter is EPD, and the following condition is satisfied:

$0.6 < EPD/\psi A \le 1$.

33. The imaging lens assembly of claim 27, wherein the light-absorbing layer along the direction perpendicular to the optical axis comprises at least one portion not contacted with the plastic lens barrel, wherein a maximum diameter of the at least one portion of the light-absorbing layer not overlapping the plastic lens barrel and close to an image side of the imaging lens assembly is $\psi A$, a diameter of an entrance pupil diameter is EPD, and the following condition is satisfied:

$0.75 < EPD/\psi A \le 1$.

34. An imaging lens assembly, which has an optical axis, comprising:
an optical lens element set comprising a plurality of optical lens elements, wherein at least one of the optical lens elements comprises:
an effective optical surface facing towards an object side; and
a peripheral surface surrounding the effective optical surface;
a plastic lens barrel, comprising:
an object-side receiving surface receiving to a portion of the peripheral surface, and the object-side receiving surface overlapping the peripheral surface at a direction parallel to the optical axis; and
an object-side outer surface, the object-side outer surface and the object-side receiving surface relatively disposed, and the object-side receiving surface overlapping the object-side outer surface at the direction parallel to the optical axis; and
a light-absorbing portion disposed on an object side of the object-side outer surface of the plastic lens barrel, connected to the plastic lens barrel, the light-absorbing portion overlapping the peripheral surface of the at least one of the optical lens elements along a direction perpendicular to the optical axis, and the light-absorbing portion surrounding the effective optical surface;
wherein the light-absorbing portion extends from an inside to an outside of the plastic lens barrel along the direction parallel to the optical axis;
wherein at least portion of the peripheral surface extends to the outside of the plastic lens barrel along the direction parallel to the optical axis, the at least portion of the peripheral surface does not overlap the plastic lens barrel along the direction perpendicular to the optical axis, and the light-absorbing portion is disposed on the at least portion of the peripheral surface;
wherein the light-absorbing portion is a surface structure disposed on the at least one of the optical lens elements completely, and the light-absorbing portion has an uneven thickness;
wherein a maximum diameter of at least one portion of the light-absorbing portion not overlapping the plastic lens barrel and close to an image side of the imaging lens assembly is $\psi A$, a diameter of an entrance pupil diameter is EPD, a total length of the light-absorbing portion along the direction parallel to the optical axis is L, and the following conditions are satisfied:

$0.75 < EPD/\psi A \le 1$; and $0.2 \text{ mm} < L < 1.5 \text{ mm}$.

35. The imaging lens assembly of claim 34, wherein the at least one of the optical lens elements is a plastic lens element, and the peripheral surface of the at least one of the optical lens elements and a portion of the light-absorbing portion overlapping the peripheral surface of the at least one of the optical lens elements along the direction perpendicular to the optical axis are without a gate trace.

36. The imaging lens assembly of claim 34, wherein the peripheral surface comprises at least one inclined surface, an angle between the at least one inclined surface and the optical axis is a, and the following condition is satisfied:

1 degree<α<50 degrees.

37. The imaging lens assembly of claim 34, wherein the maximum diameter of the at least one portion of the light-absorbing portion not overlapping the plastic lens barrel and close to the image side of the imaging lens assembly is ψA, the diameter of the entrance pupil diameter is EPD, and the following condition is satisfied:

0.85<$EPD/\psi A$≤1.

* * * * *